US00RE36935E

United States Patent [19]

Haneda et al.

[11] E Patent Number: Re. 36,935

[45] Reissued Date of Patent: Oct. 31, 2000

[54] MULTIPLEX IMAGE REPRODUCING APPARATUS

[75] Inventors: Satoshi Haneda; Hisashi Shoji, both of Hachioji; Seiichiro Hiratsuka, Tokyo, all of Japan

[73] Assignee: Konica Corporation, Japan

[21] Appl. No.: 08/523,757

[22] Filed: Sep. 5, 1995

Related U.S. Patent Documents

Reissue of:

[64] Patent No.: 4,679,929
Issued: Jul. 14, 1987
Appl. No.: 06/868,020
Filed: May 29, 1986

U.S. Applications:

[63] Continuation of application No. 07/697,540, May 2, 1991, abandoned, which is a continuation of application No. 07/380,299, Jul. 12, 1989, abandoned, which is a division of application No. 06/656,582, Oct. 1, 1984, Pat. No. 4,599,285.

[30] Foreign Application Priority Data

| | | | |
|---|---|---|---|
| Oct. 3, 1983 | [JP] | Japan | 58-183152 |
| Oct. 4, 1983 | [JP] | Japan | 58-184381 |
| Oct. 7, 1983 | [JP] | Japan | 58-187000 |
| Oct. 7, 1983 | [JP] | Japan | 58-187001 |
| Dec. 17, 1983 | [JP] | Japan | 58-238295 |
| Dec. 17, 1983 | [JP] | Japan | 58-238296 |
| Jan. 26, 1984 | [JP] | Japan | 59-13167 |

[51] Int. Cl.[7] ..... G03G 15/01

[52] U.S. Cl. ..... 399/302; 399/303; 399/298; 430/54

[58] Field of Search ..... 430/52, 54; 355/244, 355/245, 246, 265, 326 R; 399/298, 302, 303

[56] References Cited

U.S. PATENT DOCUMENTS

| | | | |
|---|---|---|---|
| 3,775,106 | 11/1973 | Tamai et al. | 430/54 X |
| 3,893,418 | 7/1975 | Liebman et al. | 399/285 |
| 4,076,857 | 2/1978 | Kasper et al. | 430/103 |
| 4,257,701 | 3/1981 | Hirayama et al. | 399/5 |
| 4,308,821 | 1/1982 | Matsumoto et al. | 399/231 |
| 4,361,394 | 11/1982 | Sakai et al. | 347/131 |
| 4,395,476 | 7/1983 | Kanbe et al. | 430/102 |
| 4,515,462 | 5/1985 | Yoneda | 399/231 |
| 4,578,331 | 3/1986 | Ikeda et al. | 430/42 |
| 4,660,961 | 4/1987 | Kuramoto et al. | 399/6 |

FOREIGN PATENT DOCUMENTS

| | | | |
|---|---|---|---|
| 2944986 | 6/1980 | Germany . | |
| 3524159 | 1/1986 | Germany . | |
| 3531098 | 3/1986 | Germany . | |
| 5031824 | 7/1973 | Japan . | |
| 85827 | 7/1977 | Japan | G03G 15/01 |
| 2111868 | 7/1983 | United Kingdom . | |

OTHER PUBLICATIONS

Patent Abstracts of Japan, vol. 6, No. 22 (P–101) [900], Feb. 9, 1982; JPA–56–144,452; Nov. 10, 1981.

*Primary Examiner*—Bernard Codd
*Attorney, Agent, or Firm*—Jordan B. Bierman; Bierman, Muserlian and Lucas

[57] ABSTRACT

A method of reproducing multiplex images wherein an electrostatic image is formed on an image retainer by using a common electrostatic image forming device, the electrostatic image formed on the image retainer is developed, the steps of the above are repeated to superpose a plurality of toner images on the image retainer, and the toner images is transferred on a recording paper by one step. The developings other than the first time developing are carried out in such a manner that the surface of a developer layer on a developer feeding carrier does not contact with the surface of the toner image on the image retainer.

14 Claims, 34 Drawing Sheets

MULTIPLEX IMAGE REPRODUCING APPARATUS

Matter enclosed in heavy brackets [ ] appears in the original patent but forms no part of this reissue specification; matter printed in italics indicates the additions made by reissue.

[This is a division of Ser. No. 656,582 Filed: Oct. 1, 1984, now U.S. Pat. No. 4,599,285.] *This application is a continuation of application Ser. No. 07/697,540, filed May 2, 1991, now abandoned, which is a continuation of application Ser. No. 07/380,299, filed Jul. 12, 1989, now abandoned, which is a Reissue application of U.S. Pat. No. 4,679,929 issued Jul. 14, 1987, which was a division of Ser. No. 656,582, filed Oct. 1, 1984 and issued as U.S. Pat. No. 4,599,285, and claims the priority of Japanese 183152/83 filed Oct. 3, 1983, 184381/83 filed Oct. 4, 1983, 187000/83 filed Oct. 7, 1983, 187001/83 filed Oct. 7, 1983, 238295/83 filed Dec. 17, 1983, 238296/83 filed Dec. 17, 1983, and 13167/84 filed Jan. 26, 1984, as claimed in U.S. application 868,020, filed May 29, 1986, now issued as U.S. Pat. No. 4,679,929.*

BACKGROUND OF THE INVENTION

1. Field of the Invention

The present invention relates to an image reproducing method and, more particularly, to a multiplex image reproducing method of superposing toner images on an image retainer having a photoconductive photosensitive member by repeatedly retaining and developing electrostatic images on the image retainer.

2. Description of the Prior Art

As the above-specified image reproducing method, there are known in the art the methods which are disclosed in Japanese Patent Laid-Open Nos. 144452/81, 116553/83 and 116554/83.

In any of these methods, the image retainer has on its surface a layer of a photoconductive photosensitive material such as Se, and the development resorts to a reversal method in which there is applied to an electrostatic image having a lower potential than that of the background a toner for frictionally charging it with the same polarity. According to this method, there arises a problem that the photoconductive photosensitive surface layer is generally and relatively liable to have its electrostatic image retaining performance changed by the charging step and to be subjected to the "toner filming" or have its photosensitivity degraded. As compared with such a positive developing methods as in the ordinary electrophotographic reproducing machine, i.e., the developing method in which the electrostatic image has a higher potential than the background so that a toner charged with an opposite polarity is applied to that electrostatic image, moreover, the development by the reversal developing method has a problem that control of the toner application is so difficult that a sufficient development density cannot be attained or that a reproducing apparatus is liable to have its inside blotted by the toner scattered.

As the method in which an image retainer having a dielectric surface layer is used to retain an electrostatic image on the dielectric surface layer, on the other hand, there is known in the art a method using an electrostatic recording head, a method using a screen photosensitive member (as is disclosed in Japanese Patent Publication No. 34616/79) or a method using a screen control electrode (as in disclosed in Japanese Patent Laid-Open No. 137363/81). The electrostatic image retaining methods thus disclosed are superior in that the electrostatic image retainability and the toner image retainability required of the photosensitive member are separated of each other. In these methods, more specifically, it is deemed that the share of retaining the electrostatic image is borne by the electrostatic recording head, the screen photosensitive member or the screen control electrode, whereas the share of retaining the toner image is borne by the dielectric surface layer. Those methods are featured by that color data are retained consecutively and independently as the electrostatic image on the dielectric surface layer. However, the toner image formed on the dielectric layer cannot be other than a monochromatic one at all times.

This is because the developing method is conducted by the contact development so that a previous toner image is disturbed or color mixing occurs upon the development even if another electrostatic image could be recorded on the previously formed toner image.

As the method in which an image retainer having a magnetic surface layer is used to form a magnetic image on the magnetic layer, on the other hand, there is known in the art methods, which are disclosed in Japanese Patent Laid-Open Nos. 90342/75, 100732/76 and 106253/81. These reproducing methods resorting to that magnetic image is excellent in that the retainability of an electrostatic image by the corona discharge or the like and the retainability of a toner image required of the photosensitive member can be separated from each other. In the reproducing methods using the magnetic image, more specifically, it is deemed that retention of the magnetic image makes whole use of the inside of the magnetic layer while not having its surface state changed as is different from the photosensitive member, and that the share of the toner image retainability is borne by the surface of the magnetic layer. Those methods are featured by that the color data can be newly retained as the magnetic image independently of the toner image formed on the magnetic surface layer. However, the toner image retained on the magnetic layer cannot be other than a monochromatic one at all times.

The method disclosed in Japanese Patent Laid-Open No. 144452/81 retains a color image on an image retainer: by forming an electrostatic image on the surface of an image retainer, which has been charged by a charger, by first exposure means and developing it by first developing means; by forming an electrostatic image on the same charged surface by second exposure means and developing it by second developing means; and by forming an electrostatic image on the same charged surface by third exposure means and developing it by third developing means. The method thus specified has problems that the separate exposure means are required for the respective ones of the repeated formations of the electrostatic images to enlarge the size of the reproducing apparatus and to raise the cost of the same and that synchronizations of the exposure of the respective exposure means with the image retainer have relationships with the respective positions of the exposure means so that the synchronous control is troublesome to make it liable to invite color shift. Moreover, each of the development of that method is conducted by the forced method in which the electrostatic image having a lower potential at its exposed portion than that of the background has such toner applied thereto as is charged with the same polarity. In that forced developing method, the toner for effecting the charge at the same polarity as that of the charge of the image retainer is so used in the developer that it may not be applied to the background. As a result, the reversal developing method has a problem that although the toner is repulsed by the background potential so that it is reluctant to invite any fog, it is also reluctant to be applied to the electrostatic images so that a sufficient developed density can hardly be obtained.

Since the reversed image is obtained, according to this reversal developing method, color reproduction of a positive image cannot be effected so that the coloring is limited to the technique using the dot exposure of a printer or the like. In case it is intended to obtain a positive image when an ordinary original is to be reproduced, it is reversed, and the counter-measure for this reversal is difficult. Since the potential at the photosensitive layer of the exposed portion is at the same polarity as that of the developer although it is low, moreover, the reversal developing method has a problem that the developer is reluctant to be applied to the electrostatic images so that it is liable to be scattered to blot the inside of the reproducing apparatus.

On the other hand, the disclosed in Japanese Patent Laid-Open No. 144452/81 is one conducted under a non-contact jumping developing condition in which the second and later developments by the reversal developing method are conducted such that the layers of the developers formed by the developing means are not in contact with the surface of the image retainer. This method has problems that the development is reluctant to have a sufficient density and is liable to be blotted with the toner scattered unless a strong bias voltage is applied to the developing means to strongly apply the toner to the electrostatic images, and that, the strong bias voltage is applied to the developing means, it is liable to leak to the image retainer or the like, or toner of another color is liable to stick to the toner image developed before or the background.

The methods disclosed in Japanese Patent Laid-Open Nos. 116553/83 and 116554/83 are substantially the same as that in Japanese Patent Laid-Open No. 144452/81 in that the formations and developments of the electrostatic images are conducted by different means for the respective repetitions. As a result, those methods also have problems that the reproducing apparatus has its size enlarged to raise the cost, and that the synchronous control of the exposures of the respectie exposing means is so difficult as to invite the color shift. Here, the method disclosed in Japanese Patent Laid-Open No. 116554/83 is different from the method disclosed in Japanese Patent Laid-Open No. 144452 in that the respective developments by the reversal developing method are conducted under the contact developing condition, in which the developer layers formed by the developing means brush the surface of the image retainer, thereby to solve the problems of the reversal developing method that the sufficient developing density can hardly be obtained and that the toner is liable to be scattered. Moreover, the method disclosed in Japanese Patent Laid-Open No. 116553/83 is different from the same Japanese Patent Laid-Open No. 144452/81 in that, in the second and later retentions of the electrostatic images, too, the surface of the image retainer is recharged before exposure by the chargers, which are placed in front of the respective exposing means, so that toner in another color may not be applied during a later development to the portions having the toner adhered thereto after the previous development. Since the second and latter developments are conducted under the contact developing condition, however, those methods have a serious problem that the toner adhered after the previous development is liable to be shifted during the subsequent development or to be mixed into the developer of the subsequent developing means.

A prototype in which an electrostatic latent image is expressed in a multi-color image is concerned with a color image using an electrophotographic system. This system of the prior art separates the colors of an original through an optical filter and repeats the charging, exposing, developing and transferring steps by using the separated colors. In order that respective images of color particles such as yellow, magenta, cyan and black colors may be retained, more specifically, those steps are repeated four times by that system. There also exists the so-called "dichromatic developing method", in which electrostatic latent images of different polarities are formed on a common photosensitive member (or an image carrier) and are developed by particles of black and red colors. These multi-color image retaining methods are desirable, because they can add color data as compared with the data obtained from the dichromatic images, but have the following problems:

(1) Transfer to a transfer member is required at each development of each color to enlarge the size of the machine and to elongate the time period necessary for the image retention; and (2) It is necessary to ensure the accuracy of positional shifts resulting from the repetitions.

In view of these problems, there has been conducted a trial in which a plurality of toner images are developed in a superposed manner on a common photosensitive member so that the transfer step may be finished by one time to reduce the size of the machine.

As the developer to be used in this machine, on the other hand, there exists a two-component developer, which is composed of a toner and a carrier, and a one-component developer which is composed only of a toner. The one-component developer has some problems in the charge control of the toner but has advantages that no consideration is necessary into the concentration and agitation of the toner and the carrier, and that the size of the machine can be reduced.

The two-component developer requires control of the ratio of the toner to the carrier but has an advantage that it is easy to control the frictional charges of the toner particles. Since a magnetic material of black color need not be much contained in the toner particles, on the other hand, the two-component developer composed of a magnetic carrier and a non-magnetic toner can use a color toner having no color turbidity by the magnetic material so that a clean color image can be formed.

In the multiplex development, incidentally, it is sufficient to repeat several times the developments of the photosensitive member which has already been formed with the toner image. However, the multiplex development has problems that the toner image retained at a previous step on the photosensitive member is disturbed upon development of a subsequent step, and that the toner having already been applied to the photosensitive member is returned to a developing sleeve acting as a developer carrier until it steals into the developing means at a subsequent step, in which a developer in a color different from that of the developer of the previous step, thereby to cause color mixing. In order to obviate those problems, there is disclosed in Japanese Patent Laid-Open No. 144452/81, for example, means for superposing an a.c. component upon a developing bias while the photosensitive member being out of contact with the developer layer on the developing sleeve acting as the developer carrier for developing an electrostatic latent image, except the developing means for first forming the toner image on the photosensitive member. However, there arises a problem that the image can neither have a sufficient density nor be freed from the disturbance or color mixing.

SUMMARY OF THE INVENTION

The present invention has been conceived so as to solve the above problems which are concomitant with the image reproducing method of the prior art. A first object of the present invention is to a multiplex image reproducing method which is enabled to reduce the size of and the cost for a recording apparatus and to make easy and accurate the synchronous control of image exposures by using a common apparatus for repeatedly retaining electrostatic images. A second object of the present invention is to provide a multiplex image reproducing method which can facilitate control of the adhesion of toners to electrostatic images so that a sufficient developing density can be attained under a non-contact jumping developing condition to prevent any fog and the mixture and application of the toners in different colors not only in the case by the ordinary developing method for application the toners charged with an opposite polarity to the electrostatic images but also in the case by the forced developing method.

The present invention resides in a multiplex image reproducing method of the type, in which toner images are superposed on an image retainer having a photoconductive photosensitive surface layer by repeating the retentions and developments of electrostatic images on the image retainer, characterized in that the retentions of said electrostatic images are repeated by means of a common apparatus. The above-identified first object is achieved by the above-specified construction, and the above-identified second object is achieved by using in the developing means the two-component developer which contains a mixture of a toner and an insulating carrier.

Another object of the present invention is to provide a novel multiplex image reproducing method in which the retentions of electrostatic images are stabilized by using means for retaining the electrostatic images on a dielectric layer and in which a method of superposing developed images on the dielectric layer is devised.

The above-specified object of the present invention can be achieved by a multiplex image reproducing method of the type, in which a plurality of color toner images are superposed on an image retainer by repeating the retentions and developments of the electrostatic images on the image retainer, characterized in that the retentions of said electrostatic images are conducted on the dielectric surface layer.

Still another object of the present invention is to provide a multiplex image reproducing method of the type, in which a number of magnetic recording heads are juxtaposed to an image retainer formed of a magnetic layer and an insulating layer, if necessary, so that a number of magnetized regions may be formed on the magnetic layer of the image retainer thereby to write an image by sending an image signal current synchronized with the movement of the image retainer to the respective ones of said magnetic recording heads, while the image retainer being moved at a constant speed, whereby a toner image is obtained by applying a magnetic toner to the written image to develop it, characterized in that a plurality of toner images are formed in a superposed manner on the image retainer by repeating the image writing and developing operations. The developments are conducted under the condition in which the developer layers formed by the developing means are out of direct contact with the surface of the image retainer. Thus, there is no fear that the toner images once formed are damaged upon the subsequent development so that the plural toner images can be superposed.

Moreover, the color images can be recorded by using the plural toner images in combination with toners of different colors such as yellow, cyan, magenta and black colors.

A further object of the present invention is to provide a multiplex image reproducing method which can not only obtain positive images and negative images but also resort to the developing method, in which a developer charged with a polarity opposite to that of an electrostatic image is applied to the electrostatic image by the coulomb force, so that the application of the developer to the electrostatic image can be made sufficient while reducing scattering of the developer.

The above-specified object of the present invention can be achieved by a multiplex image reproducing method of the type, in which toner images are superposed on an image retainer by repeating the retentions and developments of electrostatic images upon the image retainer, characterized in that said electrostatic images are formed either by conducting image exposures after an image retainer formed with a transparent insulating surface layer on a photoconductive photosensitive layer has been charged primarily and secondarily or by uniformly exposing that image retainer after the image retainer has been subjected to an image exposure simultaneously with the secondary charge.

More specifically, the multiplex image reproducing method of the present invention is different especially in the retentions of the electrostatic images from those methods which are disclosed in Japanese Patent Laid-Open Nos. 144452/81, 116553/83 and 116554/83. In other words, the method of the present invention is characterized in that the image retainer is constructed to have the transparent insulating surface layer formed on the photoconductive photosensitive layer, and in that the electrostatic images are formed either by primarily and secondarily charging the image retainer and by subjecting the charged surface of the same to the image exposure or by conducting the image exposure simultaneously with the secondary charging treatment and by subsequently effecting the uniform exposure. The above problems invited in the multiplex image reproducing method by the reversal developing method of the prior art can be eliminated by using the above-specified method of retaining the electrostatic images.

A further object of the present invention is to provide a multiplex image reproducing method which can densely and finely reproduce a color image such as a landscape image, construct a reproducing apparatus in a small size and at a low cost, and facilitate the synchronous control of image exposures.

The above-specified object of the present invention can be achieved by a multiplex image reproducing method of the type, in which a plurality of color toner images are superposed on an image retainer by charging the surface of the image retainer, by conducting the image exposures at least repeatedly, and by conducting a development each time of the image exposure by developing means, characterized: in that said image exposures are conducted such that the spot position of a previous image exposure and the spot position of a subsequent image exposure are superposed as the spot distribution exposure; and in that the image exposures thus repeated are performed by means of a common apparatus.

A further object of the present invention is to provide a multiplex image reproducing method of reproducing images having a desirable density but neither disturbance nor color mixing by the use of a developer containing a plurality of components.

The above-specified object of the present invention can be achieved by a multiplex image reproducing method of the type, in which an image is retained on an image carrier by repeating a plurality of times both the step of forming a latent image on said image carrier and the step of developing said latent image by the use of a developer having a plurality components, characterized in that the following relationships are satisfied:

$$0.2 \leqq V_{AC}/(d \cdot f); \text{ and}$$

$$\{(V_{AC}/d)-1500\}/f \leqq 1.0,$$

wherein, at each developing step: the amplitude of the a.c. component of a developing bias is designated by $V_{AC}$(V); the frequency of the same by f (Hz); and the gap between said image carrier and a developer carrier for carrying said developer by d (mm).

More specifically, we, the Inventors, have researched the method of retaining an image by conducting the development of the same while the a.c. component being superposed on the developing bias, and have discovered that there is a region in which an image of high quality can be obtained without incurring any disturbance and color mixing of the image in accordance with the manner of selecting the developing conditions such as the a.c. bias or the frequency.

The present invention contemplates to provide a novel method which is based upon the above-specified discovery.

Moreover, the above-specified object of the present invention can be achieved by the multiplex image reproducing method of the type, in which an image is retained on an image carrier by repeating a plurality of times both the step of forming a latent image on said image carrier and the step of developing said latent image, characterized in that the following relationship is satisfied:

$$0.2 \leqq V_{AC}/(d \cdot f) \leqq 1.6,$$

wherein, at each developing step: the amplitude of the a.c. component of a developing bias is designated by $V_{AC}$ (V); the frequency of the same by f (Hz); and the gap between said image carrier and a developer carrier for carrying said developer by d (mm).

BRIEF DESCRIPTION OF THE DRAWINGS

FIG. 31 is a sectional view showing developing means and a photosensitive drum;

FIGS. 32 and 33 are diagrams showing changes in the image density when an a.c. current is changed;

FIG. 34 is a diagram showing the density characteristics when a field intensity and a frequency are changed;

FIGS. 35 and 37 are schematic views showing the essential portions of the multiplex image reproducing apparatus which are equipped with a plurality of developing means;

FIG. 36 is a chart showing changes in the surface potential of the photosensitive drum which is used in the multiplex image reproducing apparatus of FIG. 35; and FIG. 38 is a chart showing changes in the surface potential of the photosensitive drum which is used in the multiplex image reproducing apparatus of FIG. 37.

DESCRIPTION OF THE PREFERRED EMBODIMENTS

The present invention will be described in detail in the following in connection with the embodiments thereof with reference to the accompanying drawings.

Figure 1:
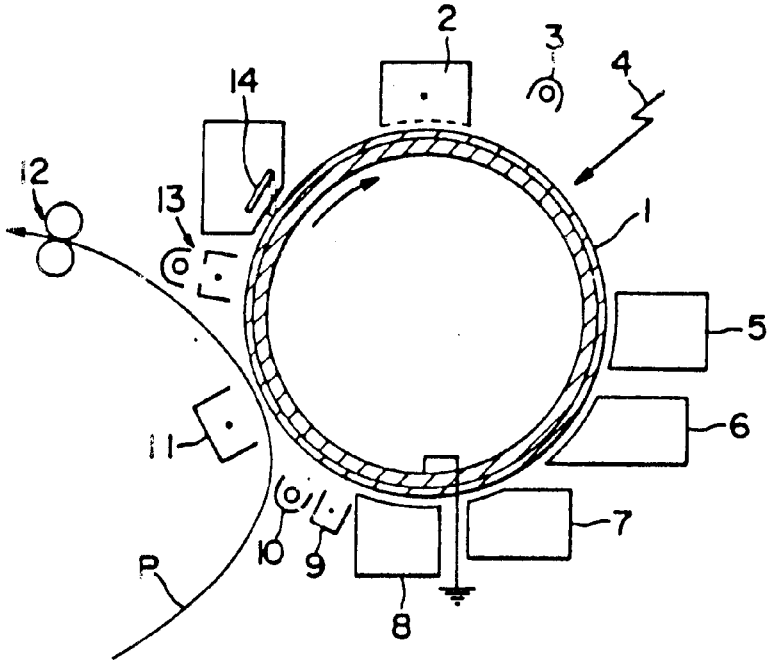
FIG. 1 is a schematic view showing the construction of one embodiment of the reproducing apparatus for practising the method of the present invention.
Figure 2:
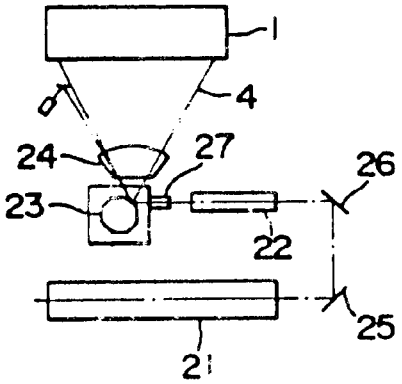
FIG. 2 is a schematic view showing the construction of a laser beam scanner for image exposure.
Figure 3:
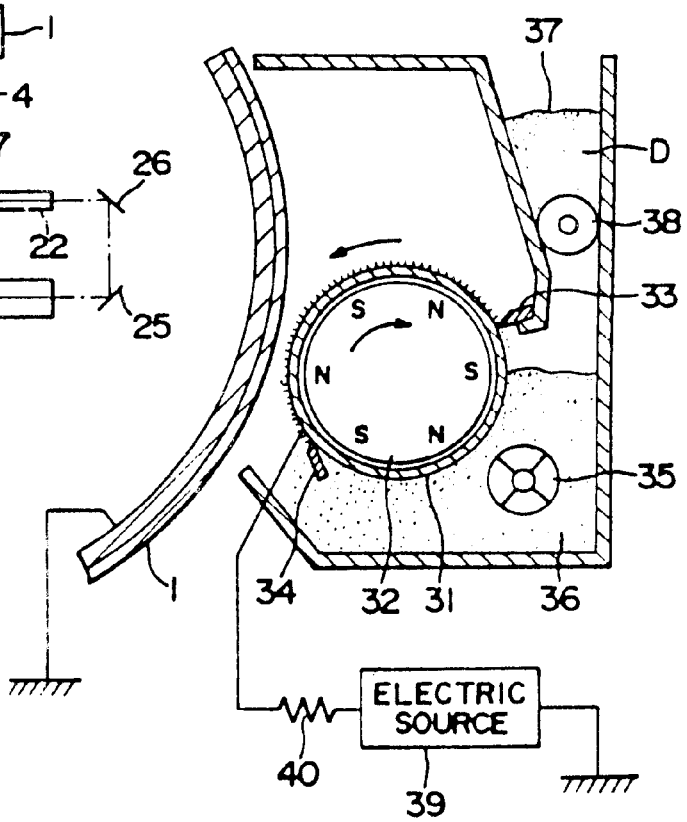
FIG. 3 is a partially sectional view showing one example of developing means.

FIG. 1 is a schematic view showing the construction of one example of recording apparatus for practising the method of the present invention; FIG. 2 is a schematic view showing a laser beam scanner for image exposure; FIG. 3 is a partially sectional view showing one example of developing means; and FIGS. 4 to 7 are flow charts for practising the method of the present invention, respectively.

Figure 7:
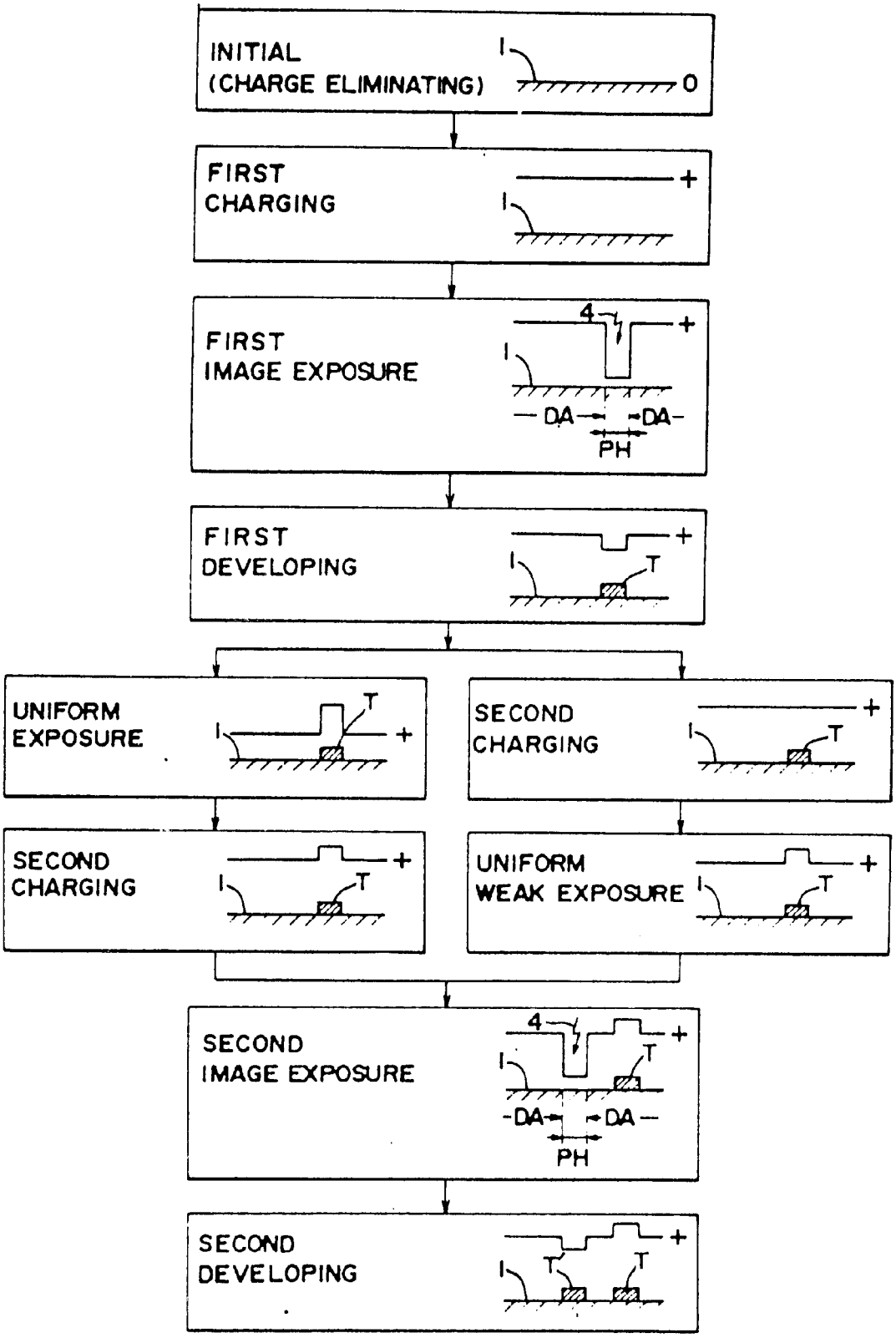

In the recording apparatus of FIG. 1: reference numeral 1 is a drum-shaped image retainer which is formed with a photoconductive photosensitive material such as Se and which is made rotatable in the direction of arrow; numeral 2 is a charger for uniformly charging the surface of the image retainer 1; numeral 3 is an exposing lamp for uniformly exposing to a weak optical ray the surface of the image retainer which is used in the example of the flow chart of FIG. 7; numeral 4 is an image exposing ray of color images of different colors; numerals 5 to 8 are developing means using as their developers toners of different colors such as yellow, magenta, cyan or black; numerals 9 and 10 are a pre-transfer charger and a pre-transfer exposing lamp which are provided, if necessary, respectively, so that a color image retained on the image retainer 1 with its plural color toner images being superposed may be easily transferred to a recording member P; numeral 11 is transfer means; numeral 12 is fixing means for fixing the toner images transferred to the recording member P; numeral 13 is charge eliminating means which is composed of a charge eliminator and/or a charge eliminating corona discharger; and numeral 14 is cleaning means having a cleaning blade or a fur brush which is adapted to come into contact with the surface of the image retainer 1 after transfer of the color images for eliminating the residual toners left on the surface and to leave the surface of the image retainer 1 by the time the surface having been subjected to a first development arrives.

Here, it is preferable to use as the charger 2 a corona discharger, as shown, which can apply such a stable charge as is hardly affected by a previous charge, especially in case the surface of the image retainer having already been charged is to be additionally charged. In case the drum-shaped image retainer 1 is used as in that reproducing apparatus, moreover, the image exposing ray 4 may be such an optical ray as has been prepared by filtering a slit ray separately for colors, for example, the optical ray of an ordinary monochromatic electrophotographic reproducing machine. In order to reproduce a clear color image, however, an optical ray prepared by the laser beam scanner, as shown in FIG. 2, is preferable.

The laser beam scanner of FIG. 2 is formed into the image exposing ray 1 for scanning the surface of the image retainer 4 at a constant speed by turning on or off the laser beam, which has emanated from a laser 21 such as a He—Ne laser, by means of an acoustic-optical modulator 22 to deflect by means of a mirror scanner 23 composed of a rotating polygonal or optagonal mirror thereby to guide it through a focusing f-0 lens 24. Incidentally, reference numerals 25 and 26 indicate mirrors, and numeral 27 indicates a lens for enlarging the diameter of a beam incident upon the focusing f-e lens 24 so as to reduce the diameter of the beam on the image retainer 1. If such a laser beam scanner as is shown in FIG. 2 is used for forming the image exposing ray 4, the electrostatic images can be easily retained with a shift for different colors, as will be described hereinafter, so that a clear color image can be reproduced. Despite of this fact, the image exposing ray 4 is not limited to the slit exposing ray or a dot exposing ray by the laser beam but may be one which is prepared by using an LED, a CRT, a liquid crystal or an optical fiber transmitter, for example. In the reproducing apparatus in which the image retainer can take a planar state such as a belt shape, moreover, the image exposing ray may be a flash light.

As the developing means 5 to 8, on the other hand, there can be preferably used those which have such a construction as is shown in FIG. 3.

In FIG. 3: reference numeral 31 indicates a developing sleeve which is made of a non-magnetic material such as aluminum or stainless steel; numeral 32 is a magnet which is equipped in the circumferential direction with a plurality of magnetic poles disposed inside of the developing sleeve 31; numeral 33 is a layer thickness regulating blade for regulating the thickness of a developer layer formed on the developing sleeve 31; numeral 34 is a scraper blade for scraping the developer layer after development from the surface of the developing sleeve 31; numeral 35 is an agitating rotor for agitating the developer in a developer reservoir 36; numeral 37 is a toner hopper; numeral 38 is a toner supply roller which is formed in its surface with a recess for receiving the toner to supply the toner from the toner hopper 37 to the developer reservoir 36; and numeral 39 is a power supply for applying a bias voltage containing a vibratory voltage component, as the case may be, to the developing sleeve 31 through a protecting resistor 40 to generate an electric field for controlling the movements of the toner between the developing sleeve 31 and the image retainer 1. FIG. 3 shows that the developing sleeve 31 and the magnet 32 are rotatable in the directions of arrows, respectively. It is, however, sufficient that the developing sleeve 31 and the magnet 32 be fixed, or that the developing sleeve 31 and the magnet 32 be rotatable in a common direction. In case the magnet 32 is fixed, it is customary to strengthen the magnetization or to dispose two magnetic poles of identical or different polarities adjacent to each other so that the density of the magnetic flux of the magnetic pole facing the image retainer 1 may be stronger than that of another magnetic pole.

In these developing means, the magnetic poles of the magnet 32 are usually magnetized to a density of magnetic flux of 500 to 5,000 gausses to attract the developer in the developer reservoir 36 to the surface of the developing sleeve 31 by that magnetic force so that the attracted developer is formed, while having its thickness regulated by the layer thickness regulating blade 33, into a developer layer. This developer layer is moved in the same direction as or in the opposite direction (although FIG. 3 shows the same direction) to the rotating direction of the image retainer 1, as indicated by the arrow, to develop the electrostatic image of the image retainer 1 in the developing region, in which the surface of the developing sleeve 31 faces the surface of the image retainer 1, whereas the residual is scraped away from the surface of the developing sleeve 31 by the scraper blade 34, until it is returned to the developer reservoir 36. Moreover, the development, e.g., at least the second or subsequent developments, which are repeated for superposing the color toner images, is preferred to be conducted under the non-contact jumping developing condition so that the toner caught by the image retainer 1 during the previous development may not be shifted by the later development. FIG. 3 shows the state in which the development is executed under the non-contact jumping developing condition.

Moreover, it is preferable to use in the developing means 5 to 8 the so-called "two-component developer" which is composed of a non-magnetic toner and a magnetic carrier and which is enabled to obtain a toner image of clear color without any necessity for containing a black or brown magnetic material in the toner and to easily effect the control of charging the toner. Specifically, the magnetic carrier may preferably be an insulating carrier which has a resistivity of $10^8\Omega$ cm or more or, preferably, $10^{13}$ or more and which is prepared either by dispersing and containing fine particles of a ferromagnetic or paramagnetic material such as tri-ion tetroxide γ-ferric oxide, chromium dioxide, manganese oxide, ferrite or manganese-copper alloy in a resin such as a styrene resin, a vinyl resin, an ethyl resin, a denaturated rosin resin, an acrylic resin, a polyamide resin, an epoxy resin or polyester resin, or by covering the surfaces of the particles of those magnetic materials with the above-specified resins. If that resistivity is low, there arises such a problem, in case the bias voltage is applied to the developing sleeve 31, that the charges are caused to migrate into the carrier particles so that they become liable to be trapped by the surface of the image retainer 1 and so that the bias voltage is not sufficiently applied. Especially, if the carriers are trapped by the image retainer 1, the color image has its tone adversely affected.

Incidentally, the resistivity is a vlaue which is obtained by tapping the particles in a container having an effective sectional area of 0.50 $cm^2$, by subsequently loading the tapped particles with a load of 1 $Kg/cm^2$, and by reading out a current value when a voltage for generating an electric field of [1.000] *1,000* V/cm is applied across the load and the bottom electrode.

If the carriers have an average particle diameter less than 5 μm, on the other hand, the magnetization obtainable becomes too weak. If the average particle diameter of the carriers exceeds 50 μm, there arise tendencies that the image is not improved, and that a breakdown and a discharge become liable to occur so that a high voltage cannot be applied. Therefore, the average particle diameter preferably has a value more than 5 μm and less than 50 μm, and a fluidizer such as hydrophobic silica is suitable added as an additive, if necessary.

The toner may preferably be prepared by adding a variety of pigments and, if necessary, a charge controlling agent to a resin to have an average particle diameter of 1 to 20 μm and may preferably have an average charge of 3 to 300 μc/g or, especially, 10 to 100 μc/g. If the toner has an average particle diameter smaller than 1 μm, it becomes reluctant to leave the carrier. If the average particle diameter exceeds 20 μm, on the other hand, the image has its resolution degraded.

As the toner in the method of the present invention, there is used a magnetic or non-magnetic one which is used as an ordinary toner and which is prepared by dispersing a coloring agent if necessary and a suitable amount of magnetic material in a known resin. As the resin, there can be enumerated a synthetic resin such as: phenol, polystyrene, alkyd, polyacryl or polyethylene; polycarbonate, polyester, polyamide, polyether, polyolefin, polystyrene, a styrene-acrylate copolymer, a styrene-methacrylate copolymer, an unsaturated styrene-ethylene monoolefin copolymer, styrene-vinylester copolymer, a styrene-vinylester copolymer, a styrene-vinylether copolymer, a styrene-acrylonitrile copolymer, a stryene-methacrylonitrile copolymer, a styrene-acrylamide copolymer, a styrene-halogated vinylidene copolymer or polyvinyl acetate; a binary, ternary or more copolymer of those; or a mixture of those copolymers.

As the coloring agent, in the other hand, there are enumerated a variety of inorganic pigments, an organic pigment, a direct dye, an acid dye, a basic dye, a mordant, an acid mordant dye, a dispersed dye, an oil-soluble dye and so on. As a black pigment, more specifically, there can be enumerated carbon black, acetylene black, lamp black, graphite, mineral black, anyline black, cyanine black and so on. As a yellow pigment, there can be enumerated chrome yellow, zinc yellow, barium chromate, cadmium yellow, lead cyanamide, calcium plumbate, Naphthol Yellow S, Hansa Yellow 10G, Hansa Yellow 5G, Hansa Yellow 3G, Hansa Yellow G, Hansa Yellow GR, Hansa Yellow A, Hansa Yellow RN, Hansa Yellow R, Pigment Yellow L, Benzine Yellow, Benzine Yellow G, Benzine Yellow GR, Permanent Yellow NCG, Vulcan Fast Yellow 5G, Vulcan Fast Yellow R, Tartrazine Yellow Lake, Quinoline Yellow Lake, Anthragen Yellow 6GL, Permanent Yellow FGL, Permanent Yellow H10G, Permanent Yellow HR, Anthrapyrimidine Yellow, and so on. As a red pigment, there can be enumerated a red iron oxide, red lead, silver vermilion, Cadmium Red, Permanent Red 4R, Para Red, polytungustophosphoriclacid, Fire Red, vermilion, Parachlor Orthonitroaniline Red, Lithol Fast Scarlet G. Brilliant Fast Scarlet, Brilliant Carmine BS, Permanent Red F2R, Permanent Red F4R, Permanent Red FRL, Permanent Red FRLL, Permanent Red F4RH, Fast Scarlet VD, Vulcan Fast Rubin B, eosine lake, Rhodamine Lake, Rhodamine Lake Y, Alyzarin lake, Thioindigo Red B, Thioindigo maroon, Permanent Red FGR, PV Carmine HR, and so on. As a blue pigment, there can be enumerated ultramarine, prussian blue, cobalt blue, Alkali Blue Lake, Peacock Blue Lake, Victoria Blue Lake, Metalless Phthalocyanine Blue, copper phthalocyanine, Fast Sky Blue, Indanthrene Blue RS, Indanthrene Blue BS, Indigo, and so on. As a yellow dye, there can be enumerated C.I. (i.e., Color Index) Direct Yellow 98, C.I. Direct Yellow 89 and C.I. Direct Yellow 88 (all of which are of direct type), C.I. Acid Yellow 1, C.I. Acid Yellow 3 and C.I. Acid Yellow 7 (all of which are of acid type), C.I. Basic Yellow 1, C.I. Basic Yellow 2 and C.I. Basic Yellow 11 (all of which are of basic type), C.I. Modern Yellow 26 (which is of mordant or acid mordant type), C.I. Disperse Yellow 1, C.I. Disperse Yellow 3 and C.I. Disperse Yellow 4 (all of which are of disperse type), C.I. Solvent Yellow 2, C.I. Solvent Yellow 6 and C.I. Solvent Yellow 14 (all of which are of oil soluble type), and so on. As a red dye, there can be enumerated C.I. Direct Red 1, C.I. Direct Red 2 and C.I. Direct Red 4 (all of which are of direct type), C.I. Acid Red 8, C.I. Acid Red 13 and C.I. Acid Red 14 (all of which are of acid type), C.I. Basic Red 2, C.I. Basic Red 14 and C.I. Basic Red 27 (all of which are of basic type), C.I. Modern Red 21 (which is of mordant or axid mordant type), C.I. Disperse Red 1, C.I. Disperse Red 4 and C.I. Disperse Red 5 (all of which are of disperse type), C.I. Solvent Red 1, C.I. Solvent Red 3 and C.I. Solvent Red 8 (all of which are of oil-soluble type), and so on. As a blue dye, there can be enumerated C.I. Direct Blue 1, C.I. Direct Blue 6 and C.I. Direct blue 22 (all of which are of direct type), C.I. Acid Blue 1, C.I. Acid Blue 7 and C.I. Acid Blue 22 (all of which are acid type), C.I. Basic Blue 7, C.I. Basic Blue 9 and C.I. Basic Blue 19 (all of which are of basic type), C.I. Modern Blue 48 (which is of mordant or acid mordant type), C.I. Disperse Blue 1, C.I. Disperse Blue 3 and C.I. Disperse Blue 5 (all of which are of disperse type), C.I. Solvent Blue 2, C.I. Solvent Blue 11 and C.I. Solvent Blue 12 (all of which are oil-soluble type), and so on. However, the coloring agent should not be limited to those thus far enumerated. Moreover, the colors of the toners should not be limited to the above-specified four but can be freely selected in accordance with the object of use.

As the magnetizing material for magnetizing the toner, there can be used a material which is similar to that used in the carrier. The amount of addition of the magnetic material is preferred to be smaller than 60 wt. % of the toner and especially preferred to be up to 30 wt. % so that the clearness of the color of the toner may not be deteriorated.

In order to improve the clearness of the color of the toner, moreover, it is possible to use a coloring magnetic material or a transparent magnetic material using a rare earth element. As a suitable one for the coloring magnetic material, there can be enumerated: for a red color, an iron oxide (e.g., a red oxide), a material prepared by covering the surface of Ni with a copper oxide, or a material prepared by causing Ni to absorb Cadmium Red; for a blue color, cobalt or its compound; and for a yellow color, aniron oxide or a material prepared by causing Ni to absorb Cadmium Yellow.

Moreover, it is quite natural that there can be applied to the above-specified toner a variety of known additives, which are usually used in the toner, such as a charge control agent.

On the other hand, the toner to be used in the present invention is preferred to have an average particle diameter of 1 to 20 μm and an average charge of 1 to 300 μc/g or, especially preferably, 3 to 30 μc/g. If the toner has an average particle diameter smaller than 1 μm, it becomes reluctant to leave the carrier. If the average particle diameter exceeds 20 $\mu$m, on the other hand, the resolution of the image is degraded.

If the developer composed of a mixture of the insulating carrier and the toner thus for described, it is possible to easily set the bias voltage, which is to be applied to the developing sleeve 31 of FIG. 3, without any fear of leakage such that the toner is sufficiently applied to the electrostatic image but without any fog. Incidentally, in order to make more effective the control of development and movement of the toner by the application of such bias voltage, the magnetic material to be used in the magnetic carrier may be contained in the toner within such a range as will not deteriorate the color clearness.

The descriptions made hereinbefore are directed the constructions of to the developing means and the developer which are preferably used in the method of the present invention. However, the present invention is not limited to them but may use such developing means and developer as are disclosed in Japanese Patent Laid-Open Nos. 30537/75, 18656 to 18659,80, 144452/81, 116553/83, and 116554/83. More preferably, there may be resorted to such a non-contact jumping developing condition by a two-component developer as is disclosed in Japanese Patent Laid-Open Nos. 57446/83, 96900 to 96903/83 and 97973/83.

By the use of the recording apparatus thus far described, the method of the present invention, as shown in FIGS. 4 to 7, can be put to practice. Incidentally, all of FIGS. 4 to 7 show the step at which the [development of FIG. 2] *latent image formation with the apparatus* has been conducted.

Figure 4:
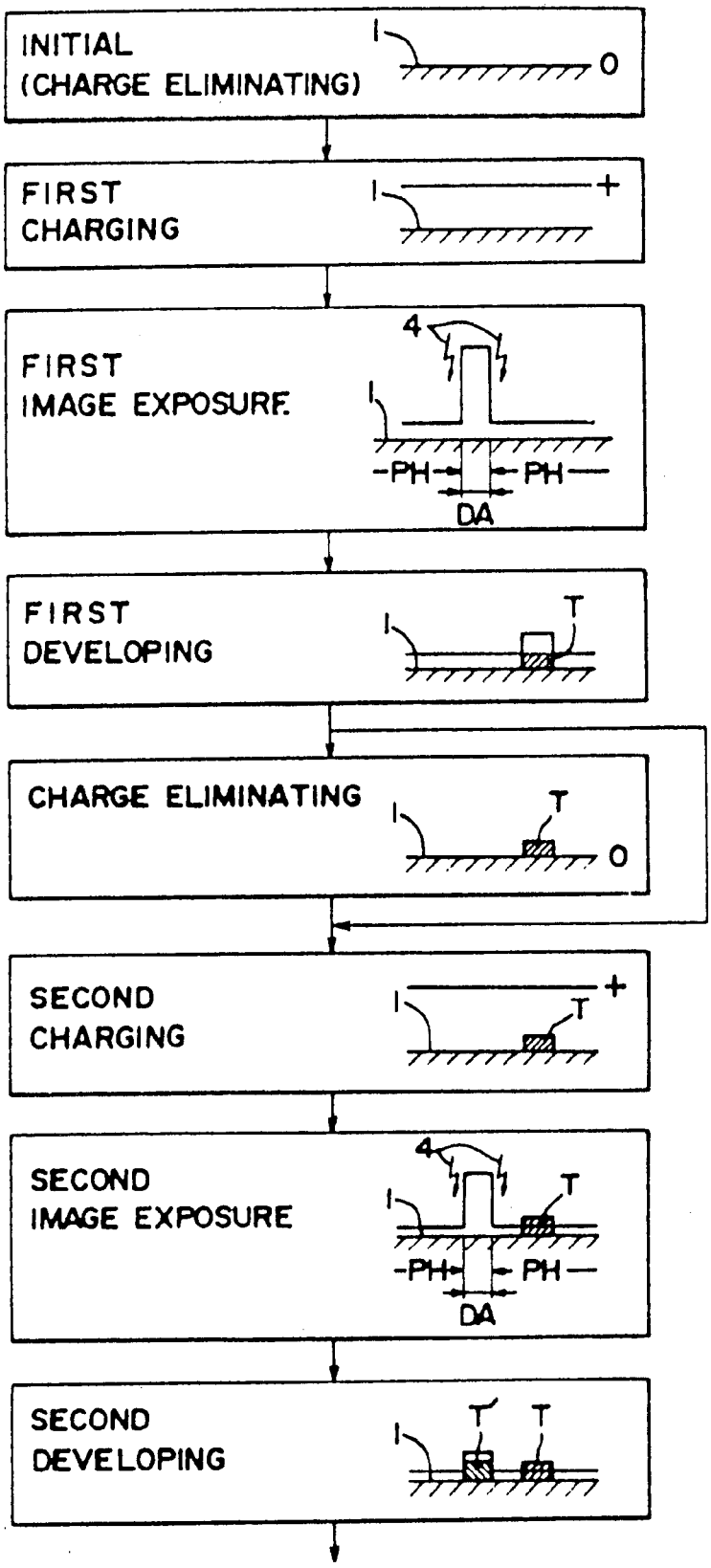
FIGS. 4 to 7 are flow charts for practising the methods of the present invention, respectively.

FIG. 4 shows an embodiment of the present invention, in which an exposed portion PH provides a background whereas an unexposed portion DA is formed with an electrostatic image by an electrostatic image retaining method and in which the development is conducted by applying to the electrostatic image a toner charged with an opposite polarity. This is the embodiment having one color image reproducing cycle comprising, according to the reproducing apparatus of FIG. 1, the steps of: uniformly conducting a first charge of the surface of the image retainer 1 in its initial state, in which the image retainer 1 is cleared of a charge by the charge eliminating means 13 and cleaned by the cleaning means 14 to a potential 0, at its one rotation by means of the charger 2; executing a first image exposure of the charged surface by means of the image exposing ray 4 of each of different colors so that the potential other than the electrostatic image portion may be substantially 0; conducting a first development of the electrostatic image, the resultant potential of which is substantially equal to that of the first charge, by means of such one of the developing means 5 to 8 as uses a developer having a color toner corresponding to the image exposing ray 4; uniformly eliminating the charge to return again the surface potential of the image retainer 1 to zero by means of the charge eliminating means 13 (or only its charge eliminating lamp) because the potential of the electrostatic image, which is dropped as a result that it traps the toner T charged with the opposite polarity, is still higher than that of the background; uniformly conducting a second charge again at a second rotation by means of the charger 2; conducting such a second image exposure of the secondly charged surface by means of the image exposing ray 4 having a color different from the previous one as will drop the potential at other than the electrostatic image portion substantially to zero; conducting a second development of the electrostatic image obtained with a toner T' by means of another developing means using a developer containing a color toner corresponding thereto; subsequently repeating third and fourth retentions and developments of the electrostatic image in a similar manner; operating the pre-transfer charger 9 and the pre-transfer exposing lamp 10 until the color image, which has been subjected to the fourth development so that the color toner images are superposed, moves therethrough after that color image has been retained; next transferring the color image to the member P, which is being fed in synchronism with the rotations of the image retainer 1, by means of the transfer means 11; fixing the color image transferred to the recording member P by means of the fixing means 12; eliminating the charge from the surface of the image retainer 1 having the transferred color image by means of charge eliminating means 13; and cleaning the charge-removed surface of the image retainer 1 by means of the cleaning means 14 until the initial state is restored to complete the one color image reproducing cycle. More specifically, the charging operation for each retention of the electrostatic image is performed by the charger 2, and the image exposure is performed by means of the common slit exposing means, which is equipped with filter switching means, or the common exposing means which is constructed of the laser beam scanner of FIG. 2, for example. This makes it unnecessary to use another image exposing means for retaining the electrostatic image at each time so that the reproducing apparatus can be constructed in a small size and at a low cost and so that the synchronous control of the retention of the electrostatic image at each time can be conducted with ease. Incidentally, the charge elimination by the charge eliminating means 13, which is interposed between a previous development and a subsequent charging operation, can be omitted.

Since the development is effected by the method of developing the electrostatic image with the toner charged with the opposite polarity, the embodiment of FIG. 4 being described can easily enhance the developed densities of the respective colors so that a clear color image can be easily reproduced. Incidentally, in order to avoid the color mixing, the d.c. biases at the developments may be set a consecutively higher levels at the later steps. In a matter to correspond to this setting, moreover, the charged potentials may be set at consecutively higher levels.

Figure 5:
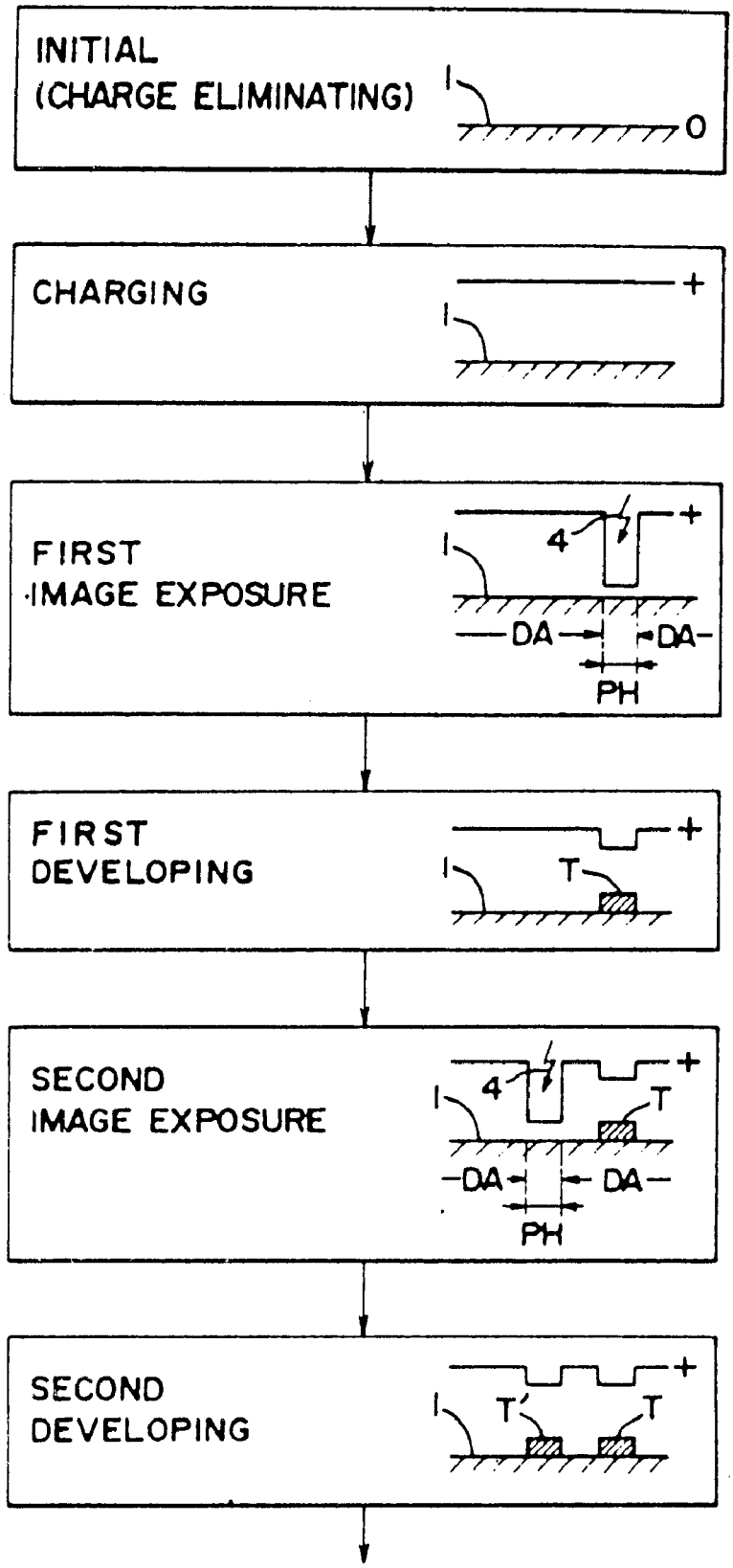
Figure 6:
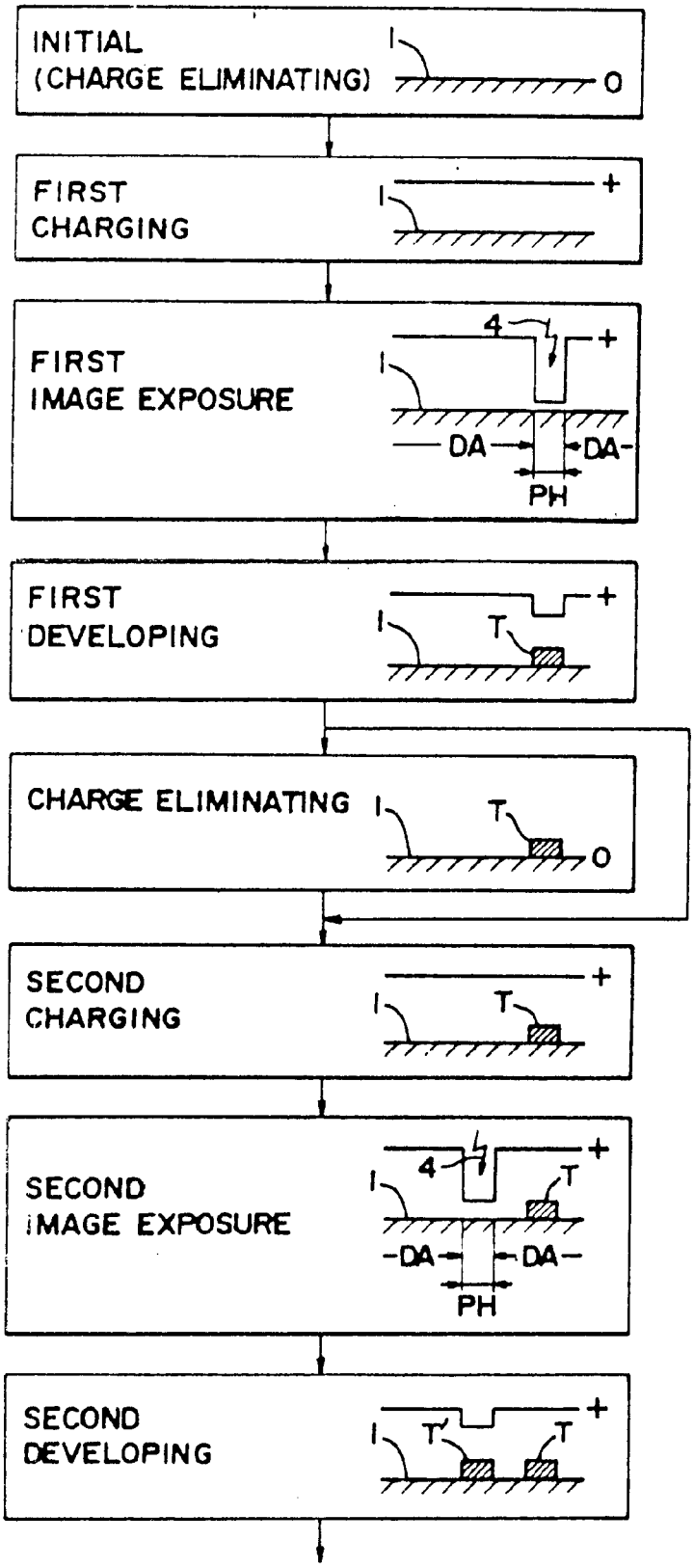

FIGS. 5 to 7 show other embodiments of the present invention, in which electrostatic images are retained by an electrostatic retaining method of forming the image exposed portion PH into an electrostatic image at a lower potential than the background portion and in which the developments are conducted by applying to the electrostatic images the toners for charging the same with the same polarity as that of the background potential.

The embodiment of FIG. 5 by the reproducing apparatus of FIG. 1 has one color image reproducing cycle comprising the steps of: uniformly charging the surface of the image 1 in the same initial state as that of FIG. 4 at its one rotation by means of the charger 2; projecting the image exposing rays 4 of different colors by the laser beam scanner of FIG. 2 onto the charged surface to conduct a first image exposure thereby to drop the potential of the electrostatic image portion substantially to zero; conducting a first development of the obtained electrostatic image by such any one of the developing means 5 to 8 as uses the developer (of which the toner charges the image retainer 1 with the same polarity, as is different from the embodiment of FIG. 4) having the color toner corresponding to the image exposing ray 4; conducting a second image exposure projecting the image exposing ray 4 of a different color onto a position, which is shifted from the projected position of the previous developing ray 4, at a second rotation by means of the same laser beam scanner without any use of the charger 2; developing the electrostatic image thus obtained to have a substantially zero potential with a developer having a toner of corresponding color; and subsequently repeating the third and fourth retentions and developments of the electrostatic image in like manners thereby to subsequently complete the one color image reproducing cycle similarly to FIG. 4. In this embodiment, incidentally, even if the electrostatic image having the substantially zero potential is developed so that it traps the toner T for effecting the charge with the same polarity as that of the charge of the image retainer 1, the potential is not substantially equal to that of the background portion, as shown. As a result, upon the development for applying the toner T' of different color to the electrostatic latent image retained later, the toner T' is frequently applied in a superposed manner to the electrostatic image portion having previously trapped the toner T, although the portion is neither exposed nor written in yet. Since the laser beam scanner is used for preparing the image exposing ray 4, however, the projection position of the image exposing ray 4 at each time is so remarkably simple that the charging operation can be finished at one time. Moreover, it can be prevented by setting the d.c. biases of the respective developments at consecutively lower levels that the electrostatic images of different colors are liable to be superposed, whereby an excellently clear color image can be obtained.

The embodiment of FIG. 6 is one which is improved in such defects of the embodiment of FIG. 5 that the electrostatic image cannot be positively retained in the superposed manner at the position where the electrostatic image has been previously formed, and that there is a fear, to the contrary, that a toner of different color may be applied, even if a little, by the subsequent development to the electrostatic image portion which has been previously developed. More specifically, the embodiment of FIG. 6 is identical, at the steps from the initial time to the first development, to the steps up to the first development of FIG. 5 but is different from the same in the steps of: subsequently conducting or not the charge elimination by means of the charge eliminating means 13 (or only the charge eliminating lamp); uniformly conducting the second charge again at the second rotation by means of the charger 2; conducting the second image exposure and the second development of the charged surface; and subsequently repeating the third and fourth retentions and developments of the electrostatic image in a similar manner. Thus, in the embodiment of FIG. 6, in which the surface of the image retainer 1 is uniformly charged again after the previous development and is then subjected to the subsequent electrostatic image retentions and developments, there can be attained the effects that the electrostatic image can be retained in the superposed manner on the position where the electrostatic image has been previously retained, like the embodiment of FIG. 4, and that, in case the position of the subsequent electrostatic image is shifted from that of the previous one, the subsequent toner of different color is hardly applied to the image position to which the previous toner is applied.

The embodiment of FIG. 7 is one which is especially devised to prevent a subsequent toner of different color from being applied to an image position to which a previous toner has been applied. This example is identical in the steps before a first development to the embodiments of FIGS. 6 and 7 but is different from the same in the steps of: either previously uniformly exposing, after the first development, the surface of the image retainer 1 by the user of the pretransfer exposing lamp 10 or the charge-eliminating lamp of the charge-eliminating means 13, and subsequently conducting a second charge by means of the charger 2, or previously uniformly conducting a second charge by means of the charger 2, and subsequently uniformly conducting a weak exposure by means of the exposing lamp 3; then conducting a second image exposure and a second development; and repeating third and fourth retentions and developments of electrostatic images in a similar manner. Here, if the uniform exposure is previously conducted after the development, the portion which has been developed to trap the toner has its charge uneliminated so that it is held at a high potential, whereas the remaining portion is dropped substantially to a zero potential, whereupon the potential at the portion having the toner can be raised by conducting the second charge to a level slightly higher than that at the other portion, where the electrostatic image is to be retained, thereby to charge the surface of the image retainer 1. On the other hand, even if the second charge is previously conducted after the development to uniformly charge the surface of the image retainer 1 whereupon the weak exposure is uniformly conducted, the charged state of the surface of the image retainer 1 becomes similar to that obtainable in case the uniform exposure has been previously conducted. As a result, when the subsequent electrostatic image retained with a shift of position is to be developed, the previous portion having the toner is at a higher potential so that it can be effectively prevented from trapping the toner of different color.

In any of the foregoing embodiments, it is preferred that the developing means 5 to 8 use the developer which is composed of a mixture of the toner and the insulating carrier, and that the development is conducted under the non-contact jumping developing condition. As a result, as has also been described, it becomes possible to prevent the mixing of the toner of different color and to easily apply the bias voltage suitable for the toner control, whereby a color image having a high developed density and an excellent clearness can be reproduced even in the case of the electrostatic image retaining method and the developing method, as in the embodiments of FIGS. 5 to 7, in which the image exposing means such as the laser beam scanner can be advantageously used.

Next, the embodiments of FIGS. 4 to 7 will be described more specifically in the following in connection with Examples 1 to 4, respectively.

EXAMPLE 1 (I.E., EMBODIMENT OF FIG. 4)

The reproducing apparatus, as shown in FIG. 1, was used. However, the exposing lamp 3 was not used, but the image retainer 1 had a surface layer of a photosensitive material such as CdS and a circumferential speed of 180 mm/sec. The surface of the above-specified image retainer 1 was charged with a voltage of −500 V by means of the charger 2 using the corona discharger, and its charged surface was subjected to the slit exposure through a blue filter. As a result, there was retained in the image retainer 1 the electrostatic image in which the exposed portion PH had the background potential of −50 V whereas the unexposed portion DA had the potential of −500 V. The electrostatic image thus retained was firstly developed by the developing means 5, as shown in FIG. 3.

The developing means 5 used the developer, which was composed of: a carrier prepared by dispersing and containing 50 wt. % of magnetite in a resin to have an average particle diameter of 20 $\mu$m, a magnetization of 30 emu/g and a resistivity of $10^{14}\Omega$ cm or higher; and a non-magnetic toner prepared by adding 10 wt. parts of a benzine derivative as the yellow pigment and another charge controlling agent to the styreneacryl resin to have an average particle diameter of 10 μm, under a condition that the ratio of the toner to the carrier was 25 wt. %. Moreover, the non-contact jumping developing conditions was resorted to, under which the developing sleeve 31 had an external diameter of 30 mm and a number of revolutions of 100 r.p.m., under which the magnet 32 has its N and S magnetic poles of a magnetic flux density of 1,000 gausses and a number of revolutions of 1,000 r.p.m., under the layer of the developer in the developed region had a thickness of 0.7 mm, under which the gap between the developing sleeve 31 and the image retainer 1 was 0.8 mm, and under which a superposed voltage containing a d.c. voltage of −100 V and an a.c. voltage of 3 kHz and [1.000] *1,000* V was applied to the developing sleeve 31.

While the developing image was being developed by the developing means 5, the remaining developing means 6 to 8, as shown in FIG. 3, were held in their undeveloping state. This was achieved by disconnecting the developing sleeve 31 from the power supply 39 into its floating state, by grounding the same to the earth, or by positively applying the d.c. bias voltage, which had the same polarity as the charge of the image retainer 1 but the opposite polarity to the charge of the toner, to the developing sleeve 31. Of these, it is preferred to apply the d.c. bias voltage. Since the developing means 6 to 8 were made to conduct their developments under the non-contact jumping developing condition like the developing means 5, it was not necessary to especially eliminate the layer of the developer from the developing sleeve 31. Of those developing means 6 to 8: the developing means 6 used a developer which was prepared by replacing the toner of the developer of the developing means 5 by a toner containing polytungstate as the Magenta pigment in place of the yellow pigment; the developer 7 used a developer which was prepared by replacing the same toner by a toner containing copper phthalocyanine as the cyan pigment; and the developing means 8 used a developer which was prepared by replacing the same toner by a toner containing carbon black as the black pigment. It is quite natural that a toner containing other pigment and dye could be used as the color toner, and that the order of the colors to be developed and the order of the developing means could be suitably selected.

The surface of the image retainer 1, which had been subjected to the first development, was recharged to −600 V by operating the charge eliminating means 13 and the charger 2 (although the former may be left inoperative). The charged surface was subjected to the second exposure by the slit exposure through a green filter, and the developing sleeve 31 was then subjected to the second development with the Magenta toner by the developing means under the non-contact jumping developing condition for applying the superposed voltage of a d.c. voltage of −200 V and an a.c. voltage of 3 kHz and 1,000 V. Likewise, the following steps were repeated: the charge, the slit exposure through a red filter, and the third development of the cyan toner by the developing means 7; and the charge, the slit exposure without any filtration, and the fourth development of a black toner by the developing means 8. In the second and later developments, incidentally, the amplitudes and frequencies of the d.c. bias component and a.c. component of the voltage to be applied to the developing sleeve 31, the selecting time of a time selecting conversion, and so on were suitably changed in accordance with the changes in the surface potential, the developing characteristics and the color reproductivity of the image retainer 1. Especially, it was effective for preventing the color mixing of the toner that the charge potentials were made consecutively higher whereas the d.c. biases were made consecutively higher.

The color images of four colors were made liable, when they were retained on the image retainer 1 as a result of the fourth development, to be transferred by the pre-transfer charger 9 and the pre-transfer exposing lamp 10, and were than transferred to the recording member P by the transfer means 11 until they were fixed by the fixing means 12. The image retainer 1 having the color images transferred thereto had its charge eliminated by the charge eliminator 13 and its residual toner scraped off from its surface by the contacts of the cleaning blade or fur brush of the cleaning means 14. At the instant when the surface having the color images retained therein passed through the cleaning means 13, the one color image reproducing cycle was completely ended.

The color image thus reproduced was so clear that the respective colors exhibited sufficient densities, but a slight color mixing of the toners was found at the portion in which the respective color toners are densely trapped.

EXAMPLE 2 (I.E., EXAMPLE OF FIG. 5)

The reproducing apparatus, as shown in FIG. 1, was used. However, the exposing lamp 3 was not used, but the image retainer 1 had a surface layer of a photosensitive materail such as CdS and a circumferential speed of 180 mm/sec. The surface of the above-specified image retainer 1 was charged with a voltage of +500 V by means of the charger 2 using the corona discharger, and its charged surface was subjected to the first image exposure in a density of 16 dots/mm by the laser beam scanner of FIG. 2 using a He—Ne laser. As a result, there was retained in the image retainer 1 the electrostatic image in which the exposed portion PH had a potential of +50 V contrary to the background potential of +500 V. The electrostatic image thus retained was firstly developed by the developing means 5, as shown in FIG. 3.

Incidentally, the developing conditions by the developing means 5 were made identical to those of Example 1 except that the carrier of the developer had an average particle dize of 30 μm, that the ratio of the toner to the carrier was 20 wt. %, and that the superposed voltage of a d.c. voltage of +400 V and an a.c. voltage of 1.5 kHz and 1,000 V was applied to the developing sleeve 31. Moreover, the conditions of the remaining developing means 6 to 8 were identical to those of the Example 1 except the bias voltages. In this case, however, the bias voltages for holding the developing means taking no part in the development in the state other than the development had a polarity opposite to both those of the charge of the toner and the charge of the image retainer 1.

The surface of the image retainer 1 having been subjected to the first development was subjected again to the second image exposure without any change in the density but with a shift of the dot position by means of the same laser beam scanner without operating one of the pre-transfer charger 9, the pre-transfer exposing lamp 10, the charge eliminating means 13, the cleaning means 14 and the charger 2, and was then subjected to the second development with the Magenta toner by the developing means 6. Likewise, the third development with the cyanic toner by the developer means 7 and the fourth development with the black toner by the developing means 8 were repeated. In the second and later developments, incidentally, the amplitudes and frequencies of the d.c. bias component and a.c. component of the voltage to be applied to the developing sleeve 31, the selecting time of a time selecting conversion, and so on were suitably changed in accordance with the changes in the surface potential, the developing characteristics and the color reproductivity of the image retainer 1. Especially, in this case it was effective for preventing the color mixing of the toner that the d.c. biases were made consecutively lower at the respective steps.

After the fourth development had been conducted to retain the color image of four colors on the image retainer 1, it was transferred and fixed to the recording member P like the Example 1, and the image retainer 1 had its charge eliminated and was cleaned, thus ending the one color image reproducing cycle.

The color image thus reproduced was clear like that of the Embodiment 1.

EXAMPLE 3 (I.E., EMBODIMENT OF FIG. 6)

By using the same apparatus as that of the Example 2, the color image reproduction was performed under the same conditions as those of the Example 2 except that the voltage to be applied to the developing sleeve 31 of the developing means was a superposed voltage of a d.c. voltage of +400 V and an a.c. voltage of 500 Hz and 250 V, that the charge elimination was conducted by means of the pre-transfer exposing lamp 10 before each image exposure on and after the second image exposing step, and that the surface potential of the image retainer 1 was then recharged with +500 V by the charger 2.

The color image reproduced was more clear than that obtained by the Example 2, because the color mixture of the toners was reduced at the portion where the respective color toners were densely trapped.

According to this Example, incidentally, the previous image exposed position and the subsequent image exposed position can be superposed, as has been described hereinbefore, and, in this case, the order of the colors to be developed imparts considerable influences upon the clearness of the color image. It is, therefore, necessary to determine especially carefully the order of the colors to be developed.

EXAMPLE 4 (I.E., EMBODIMENT OF FIG. 7)

By using the same apparatus as that of the Example 2 except the provision of the exposing lamp 3, the color image reproduction was conducted under the same conditions as those of the Example 2 except that the voltage to be applied to the developing sleeve 31 of the developing means was a superposed one of a d.c. voltage of +450 V and an a.c. voltage of 2 kHz and 500 V, and that both the charge by the charger 2 for raising the surface potential of the image retainer 1 to +600 V and the uniform, weak exposure by the exposing lamp 3 for dropping the surface potential to +500 V were conducted before each image exposure on and after the second image exposure.

The color image thus reproduced has no color mixing of the respective color toners even at a portion, where the toners were densely trapped, so that it was remarkably clear.

Even in this Example, like the Example 3, the previous image exposed position and the subsequent image exposed position can be superposed.

According to the present invention, the common apparatus can be used for the repeated electrostatic image retentions to provide excellent effects that the reproducing apparatus can be constructed in a small size and at a low cost, and that the synchronous control of each image exposure can be conducted easily and accurately. Moreover, each development can be conducted either by the developing method, in which there is applied to an electrostatic image relatively easy to have its developed density controlled to a toner for charging it with the opposite polarity, or by the developing method in which the laser beam scanner can be used as the image exposing means and in which there is applied to the electrostatic image a toner for charging it with the common polarity. According to either of the developing methods, still moreover, there can be attained an excellent effect that the development can be conducted under the non-contact jumping developing condition to reproduce the color image having a sufficient developed density and an excellent clearness.

As has been described hereinbefore, incidentally, the present invention should naturally be limited neither to the method, in which the image retained uses the drum-shaped recording apparatus, but also to the method in which the color image is transferred to the recording member. In other words, the present invention can be applied to the method, in which the image retainer is mounted on a base such as that for electrofax paper and in which the color image retained thereon is not transferred but fixed. In this application, there can be dispensed with the pre-transfer charger, the pre-transfer exposing lamp, the transfer means and the cleaning means. It is true, but the pre-transfer charger, the pre-transfer exposing lamp or the charge eliminating means can be omitted in the transfer case, too, and the transfer may be a direct pressure one or one using an intermediate transfer member whereas the fixing operation should not be limited to one using a heat roller.

Figure 9:
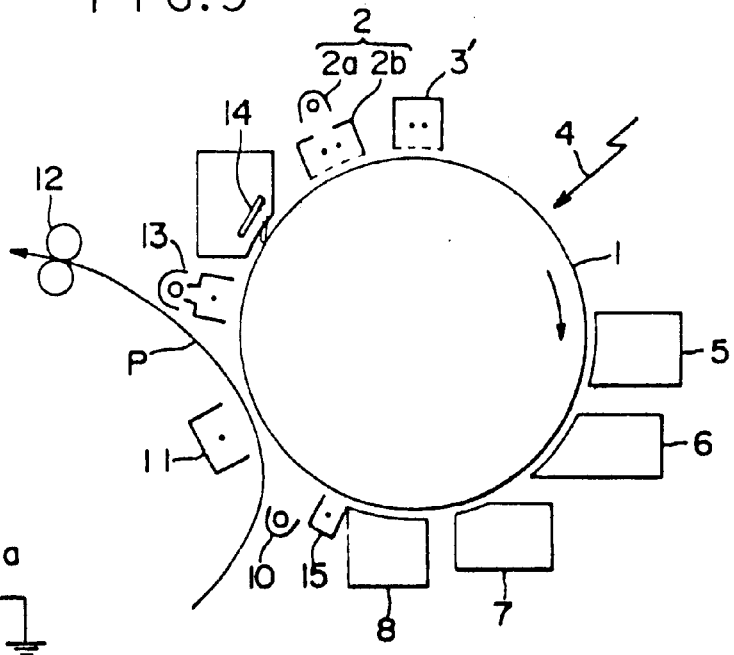
FIG. 9 is a schematic view showing the construction of the reproducing apparatus.
Figure 8:
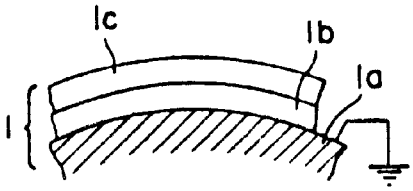
FIG. 8 is a partially sectional view showing the construction of an image retainer in another reproducing apparatus for practising the method of the present invention.

In other embodiments of the present invention, the image retainer 1 is constructed, as shown in FIG. 8, of: a conductive base 1a made of aluminum or nickel; a photoconductive photosensitive layer 1b made of Se, CdS, Si or the like and formed on the conductive base 1a; and a transparent insulating surface layer 1c made of a transparent resin and formed on the photoconductive photosensitive layer 1b, and said conductive substrate 1a being grounded to the earth. Indicated at reference numeral 2 in FIG. 9 is a primary charger which is composed, in combination, of a lamp 2a for irradiating the surface of the image retainer 1 and a corona discharger 2b. Numeral 3' indicates a secondary charger which is composed of a corona discharger. Here, the primary charger 2 need not necessarily be equipped with the lamp 2a in case the photoconductive photosensitive layer 1b of the image retainer 1 has such semiconductor characteristics as exhibit a rectifying action that charges can be implanted from the base 1a. Indicated at numeral 15 is a corona discharger for charging toners prior to transfers.

Figure 10:
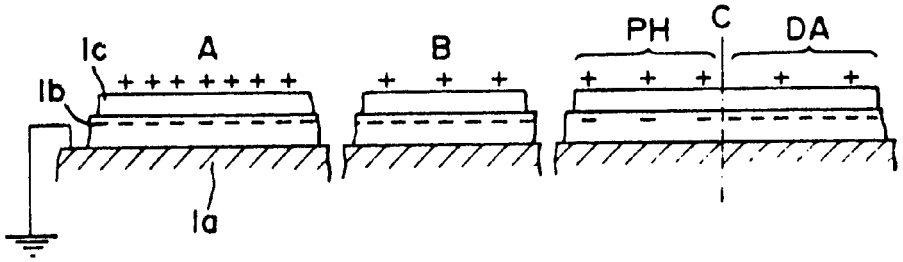
FIG. 10 is a diagram schematically showing changes in the charged states of one example of the process of electrostatic images.
Figure 11:
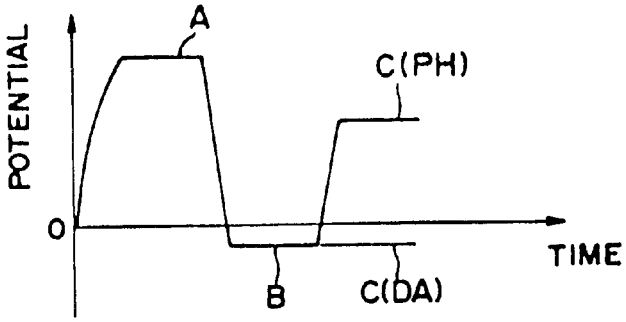
FIG. 11 is a chart showing changes in the potential at the surface portion of the image retainer in a manner to correspond to FIG. 10.

In the reproducing apparatus thus constructed, when the primary charger 2 conducts the corona discharge by its corona discharger 2b while irradiating the surface of the image retainer 1 by its lamp 2a (which may not be required as the case may be, as has been described hereinbefore), the image retainer 1 is charged, as shown in FIG. 10A, in its photoconductive photosensitive layer 1b and on the surface of its transparent insulating surface layer 1d. When the secondary charger 3' conducts the corona discharge of the charged surface of the image retainer 1, the charges on the surface of the transparent insulating surface layer 1c are reduced because the photoconductive photosensitive layer 1b has an insulating property in this case, so that the charged state of the image retainer 1 charges as shown in FIG. 10B. When the image exposing ray 4 is incident upon that surface of the image retainer 1 thus secondarily charged, the surface charges of the photoconductive photosensitive layer 1b at the exposed portion PH are reduced while being left as they are at the unexposed portion DA so that the charges of the image retainer 1 change, as shown in FIG. 10C. The changes of the surface potential of the image retainer 1 in this meanwhile are shown in FIG. 11, in which the potentials in states A, B and C correspond to the changed states of FIGS. 10A, B and C, respectively. More specifically, the potential of the exposed portion PH exposed to the image exposing ray 4 takes such surface one as is indicated at C(PH) in FIG. 11, whereas the potential of the unexposed portion having received none of the image exposing ray 4 is at C (DA) which is substantially the same as the surface potential indicated at B in FIG. 11. This results in that an electrostatic image having a surface potential at C(PH) with respect to that background is retained by the image exposing ray 4. The electrostatic image thus retained can be developed like the ordinary electrophotographic reproducing machine with such a developer as will charge the exposed portion PH with a polarity opposite to that of the latent image, and this development is conducted by any one of such a color of the developing means 5 to 8 as corresponds to the image exposing ray 4 having formed the electrostatic image. When the development is conducted to apply the toner, the potential of the electrostatic image is dropped in accordance with the trapped amount of the toner having been charged in the opposite polarity. However, the charge of the unexposed portion DA of the image retainer 1, which has received none of the image exposing ray 4, remains in such a state DA of FIG. 10C as is identical to that of FIG. 10B, and the surface potential of the same portion is at the same potential C(DA) as that of B of FIG. 11 even with a dark attenuation. As a result, if the image exposing ray 4 of another color is incident with a shift from the position of the previous image exposing ray 4 at the second rotation of the image retainer 1, an electrostatic image can be retained like the previous exposure with neither of the primary and secondary charging operations. Thus, the second and later retentions of the electrostatic images by making use of the first primary and secondary charging operations are easily effected in case the previous development or developments are conducted by the developing method, in which a developer for charging in an opposite polarity is applied, and under the noncontact jumping condition. This is partly because the application of the toners to the electrostatic images can be more easily conducted than the developing method, in which the developing agent for charging in the same polarity to make it unnecessary to apply such a high voltage to the developing sleeve 16 as to apply the toners to the electrostatic images so that the charged state of the image retainer 1 is held stable, and partly because the developer layer of the developing means is kept away from the surface of the image retainer 1 by resorting to the non-contact jumping developing condition so that the charged state of the image retainer 1 is held stable. Incidentally, the shift of the position of the subsequent image exposing ray 4 with respect to the previous image forming ray 4 so as to retain the electrostatic images of different colors can be easily conducted by using the laser beam scanner of FIG. 3 for producing the image exposing ray 4.

The present invention should not be limited to the embodiment in which the second and later retentions of the electrostatic images are conducted by making use of the first primary and secondary charging operations. Generally speaking, however, the primary and secondary charging operations may be conducted each time of the second and later retentions of the electrostatic images, or therefore the previous charges may be eliminated by the charge eliminating means 13 or only the secondary charging operation may be so executed as to compensate the dark attenuation. Especially either in case the primary and secondary charging operations are executed again without eliminating the previous charges or in case only the secondary charging operation is executed, the scorotron corona discharger may preferably for allowing stable charging operations even in the presence of the previous charges may preferably be used as the corona dischargers of the primary charger 2 and the secondary charger 3'. It is especially desired when a graded reproductivity is stressed or in case the image exposing ray 4 is of slit or flash exposure type that the primary and secondary charging operations are conducted again each retention of the electrostatic images. Moreover, it is possible to adopt the NP or KIP method by which the electrostatic images are retained by conducting the image exposure simultaneously with secondary charging operation after the primary charging operation and by conducting the exposure of the whole surface. In the several methods thus far described, the electrostatic image potential can be so controlled in dependence upon the relative strengths of the primary and secondary charges that the exposed portion and the unexposed portion may be in an identical or opposite polarity. Considering the feasibility of the development, however, it is preferable that the exposed and unexposed portions take opposite polarities.

The electrostatic image at the second rotation thus retained is developed by such one of a color different from the previous one of the developing means 5 to 8 as corresponds the image exposing ray 4 having retained that electrostatic image. Likewise, at the third and fourth rotations of the image retainer 1, too, both the retentions of the electrostatic images and the developments by the different developing means corresponding to those electrostatic images are conducted to form a color image which has toner images of different colors superposed on the image retainer 1. Moreover, the surface of the image retainer 1 having been subjected to the last development has, if necessary, charges applied to its toner image by means of the corona discharger 15 and is then irradiated by the pre-transfer lamp 10 so that the color image can be easily transferred to the recording member P by the transfer means 11. The color image thus transferred to the recording member P is fixed to the recording member P by the fixing means 12. The surface of the image retainer 1 having the color image transferred thereto has its charges eliminated by the charge eliminating means 13 so that the residual toners after the transfer are eliminated as a result that the cleaning blade of the cleaning means 14 having been kept away until the time comes into abutment against the surface of the image retainer 1. At the time the surface portion of the image retainer 1 having retained the color image moves over the cleaning means 14, the cleaning blade leaves the surface of the image retainer 1, thus completing the one color image reproducing cycle.

Figure 12:
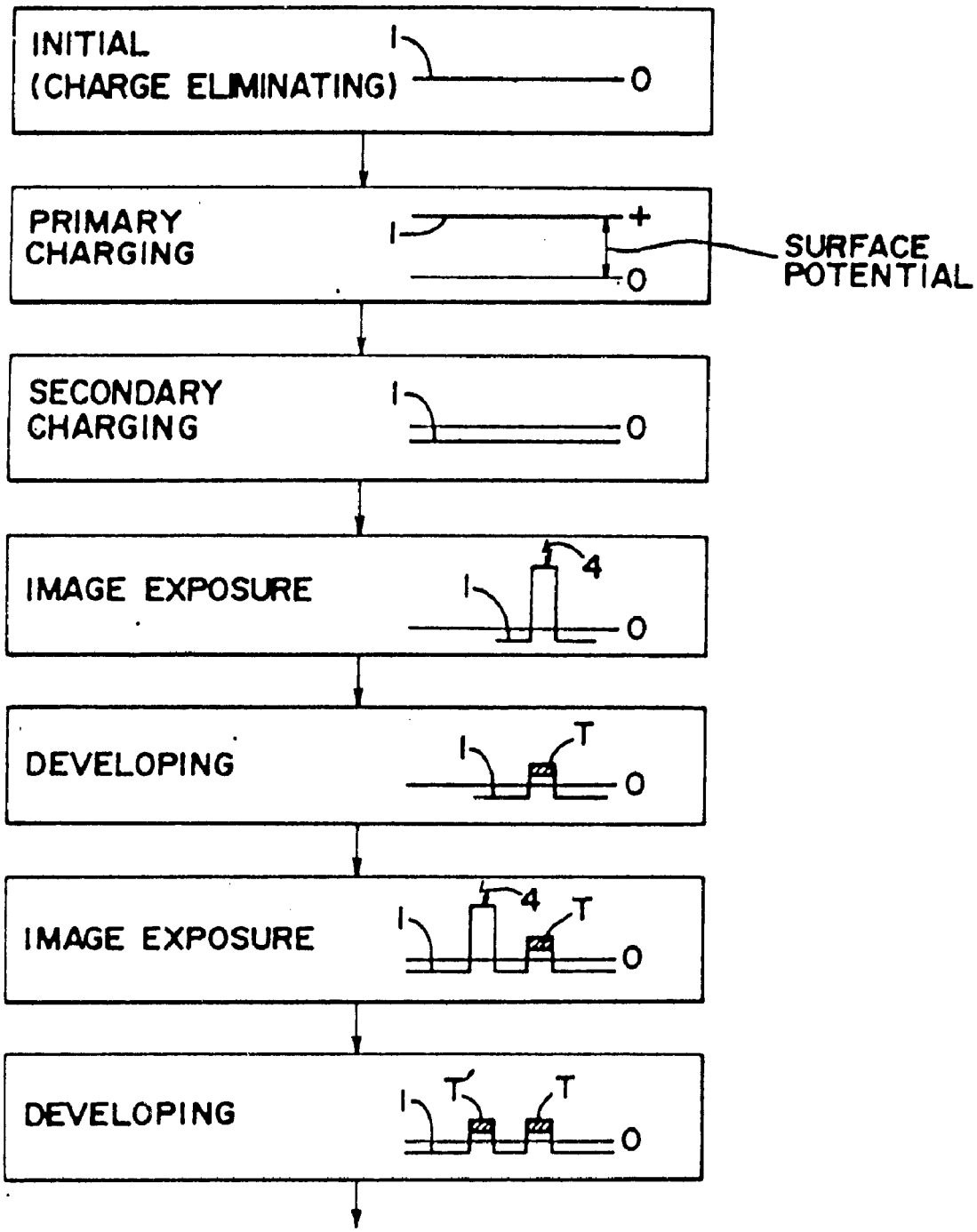
FIGS. 12 to 17 are flow charts of practising the method of the present invention, respectively.
Figure 13:
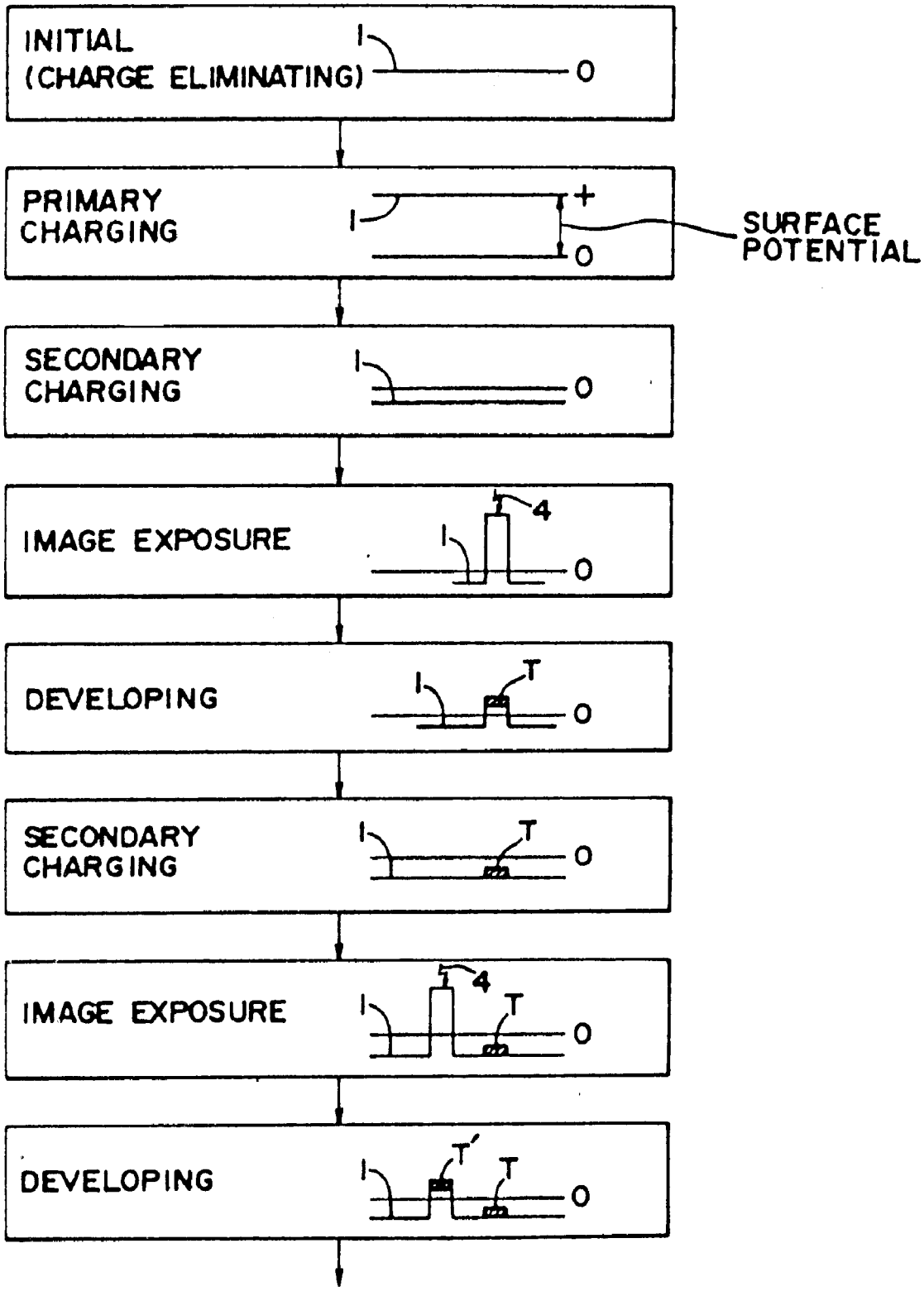
Figure 14:
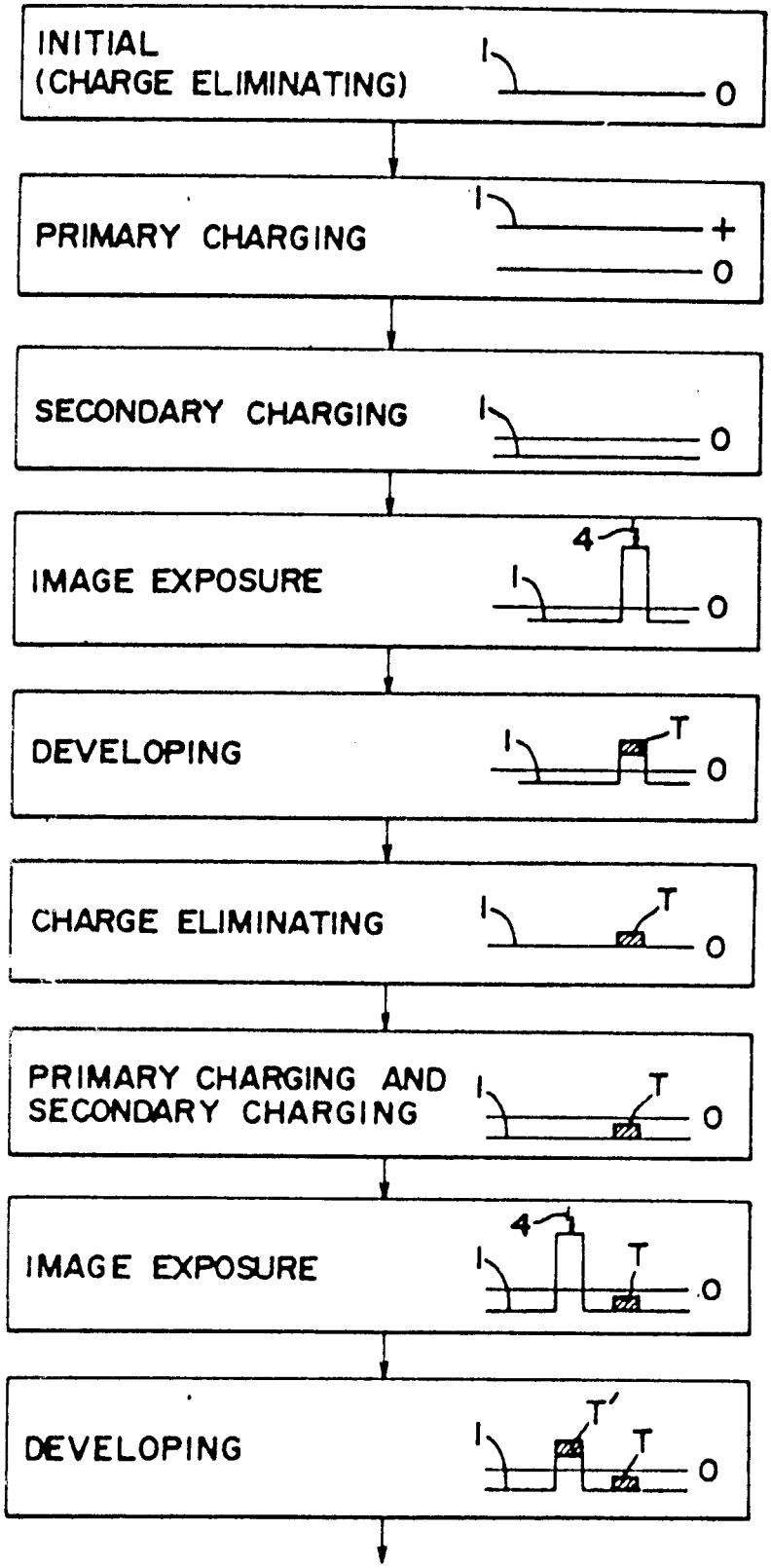
Figure 15:
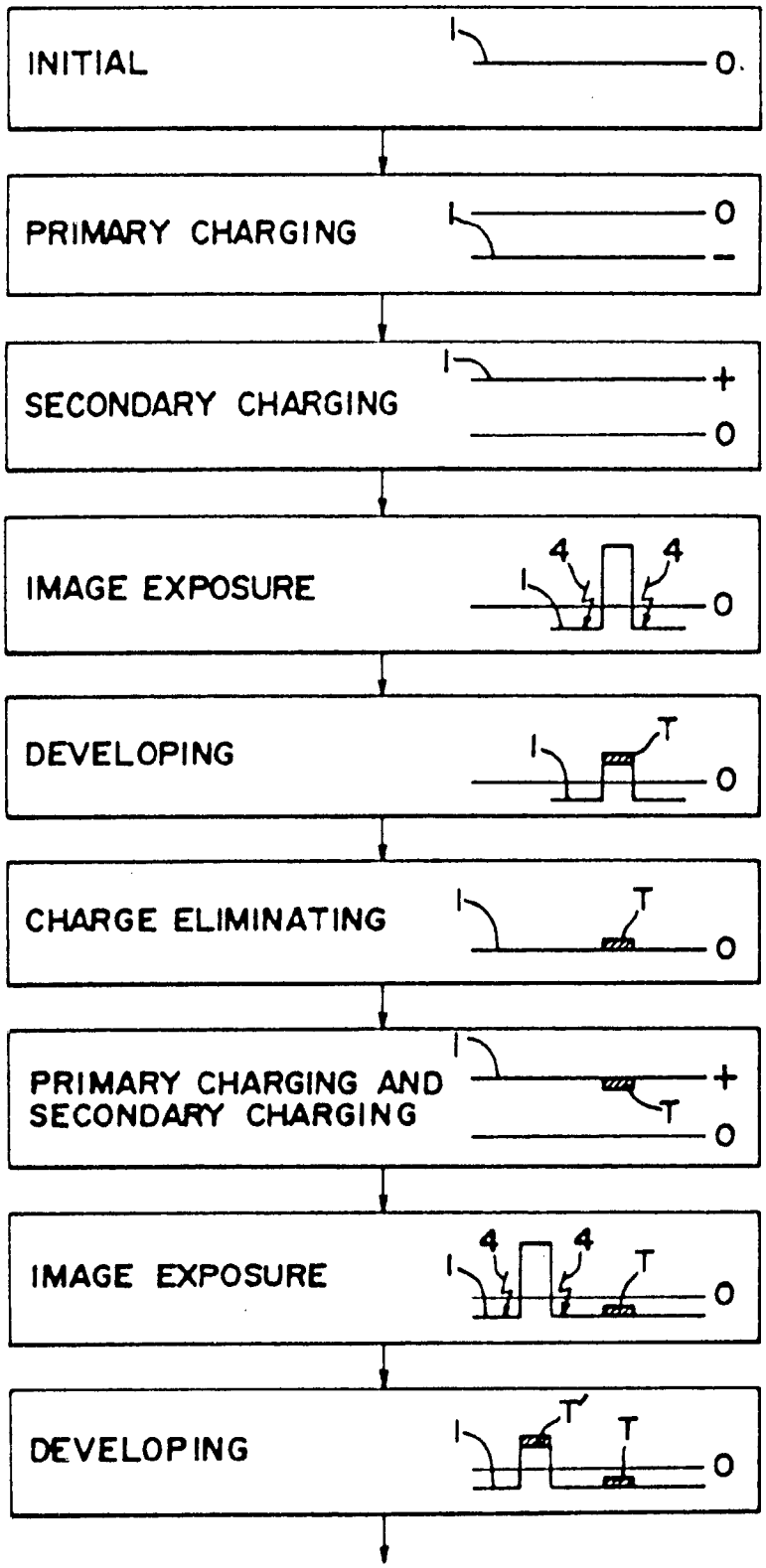
Figure 16:
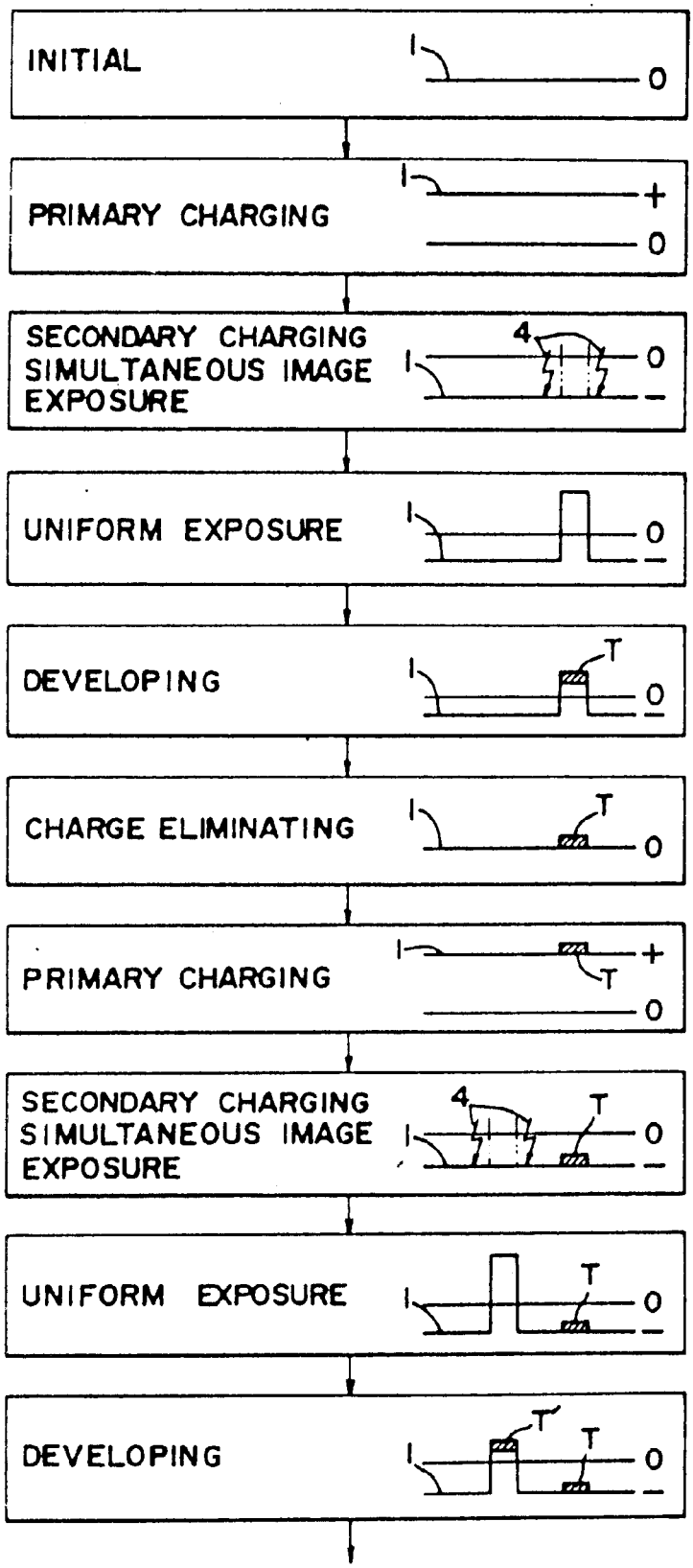
Figure 17:
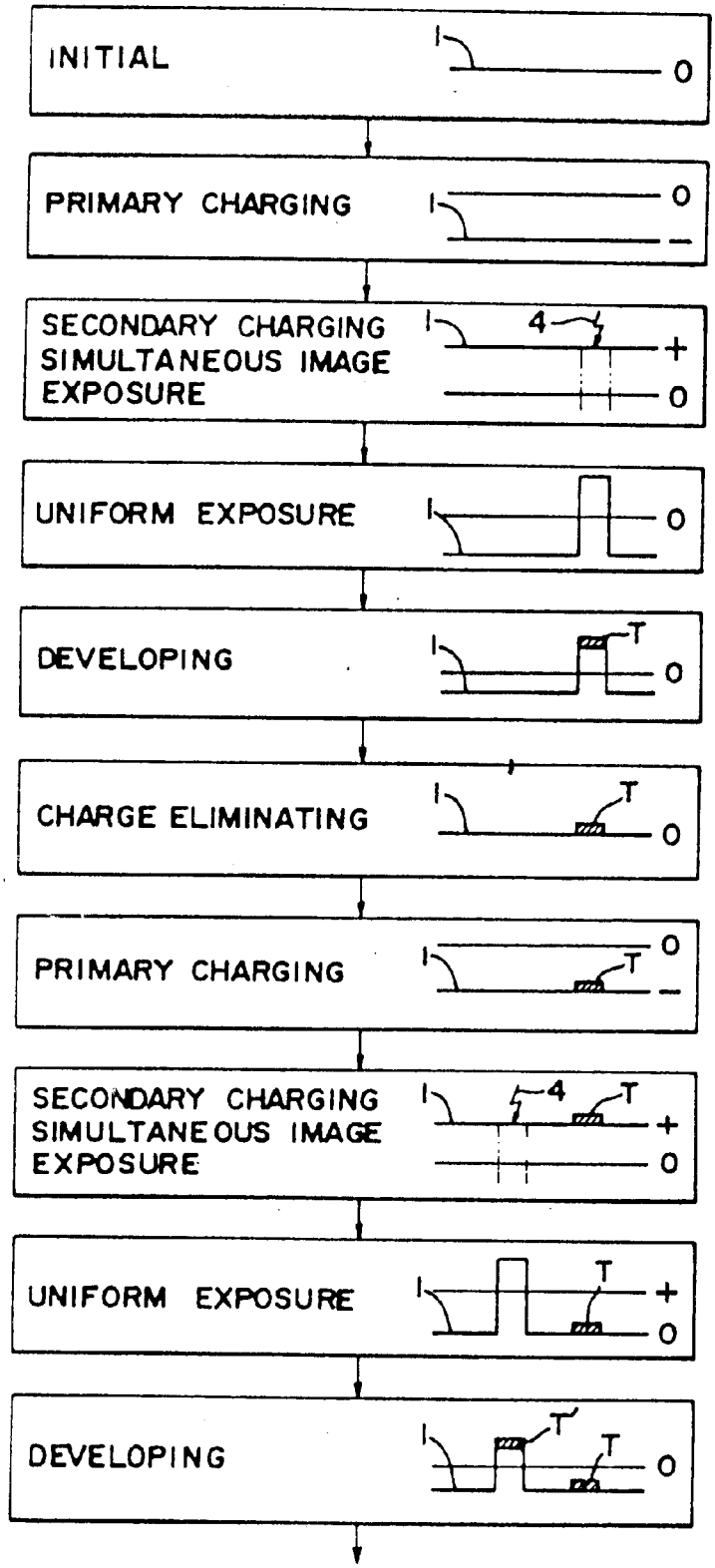

FIG. 12 is a flow chart showing the changes of the surface potential of the image retainer of the embodiment of the present invention, in which an electrostatic image is retained each time with an image exposing ray by making use of the first primary and secondary charging operations. FIG. 13 is a flow chart showing the changes of the surface potential of the image retainer of the embodiment of the present invention, in which only the secondary charging operations is conducted prior to the second and later electrostatic image retentions. FIG. 14 is a flow chart showing the changes of the surface potential of the image retainer of the embodiment of the present invention, in which the primary and secondary charging operations are conducted after charges are eliminated from the second and later retained electrostatic images like the first one. All of these Figures show, like FIGS. 10 and 11, the embodiments of the present inventions for retaining the electrostatic images by the negative exposure, where the image exposed portion retains the electrostatic images, to which the toners are applied. On the contrary, FIG. 15 is a flow chart showing the changes of the surface potential of the image retainer of the embodiment of the present invention for retaining the electrostatic images by the positive exposure, where the exposed portion is formed into the background portion whereas the unexposed portion is formed into the electrostatic image, to which the toners are applied, by changing the conditions for the primary and secondary charging operations in the embodiment of FIG. 14. On the other hand, FIGS. 16 and 17 are flow charts showing the changes of the surface potentials of the image retainers of the embodiments of the present invention using the electrostatic image retaining process called the "NP or KIP process". FIG. 16 corresponds to the case of the positive exposure like FIG. 15, whereas FIG. 17 corresponds to the case of the negative exposure like FIGS. 12 to 14. The embodiments of FIGS. 16 and 17 will be briefly described in the following. FIG. 16 shows the embodiment comprising the steps of: imparting charges to the photoconductive photosensitive layer 1*b* by the primary exposing operation to charge the image retainer 1 positive; subsequently conducting an image exposure in a secondary charging operation to form an ion image on the transparent insulating surface layer 1*c* thereby to charge the image retainer 1 negative; subjecting the whole surface to an exposure to retain such an electrostatic image that the potential of the unexposed portion not having been subjected to the image exposure during the secondary charging operation exhibits a positive value; applying a toner charged in an opposite polarity to that electrostatic image by a development; and subsequently repeating a charge elimination (which may be omitted) and an electrostatic image retention and development similar to the aforementioned ones. On the other hand, FIG. 17 shows the embodiment comprising the steps of: charging the image retainer 1 negative by a primary charging operation contrary to the fact that the image retainer 1 is charged positive in the embodiment of FIG. 16; charging the image retainer 1 positive by a subsequent second charging operation and a simultaneous image exposure; subjecting the whole charged surface to an exposure so that the potential of the unexposed portion other than the portion having been subjected the image exposure during the secondary charging operation is negative like the primary charging operation; applying a toner in an opposite polarity by a development to the electrostatic image at a portion which has been charged positive by the image exposure during the secondary charging operation; [nad] *and* subsequently repeating a charge elimination (which may be omitted), and an electrostatic image retention and a development like the aforementioned ones.

Incidentally, all FIGS. 12 to 17 show the step, at which the second development has been conducted, and the embodiments in which the second image exposure is shifted from the first one. However, not only in the embodiments of FIGS. 14 to 17, in which the charge elimination and the primary and the secondary charging operations are repeated at each time, but also in the embodiments of FIGS. 12 and 13, the subsequent image exposing ray is incident upon the previous image exposed position, in which the electrostatic image is formed, by means for increasing the quantity of light of the image exposing ray the more for a later time so that the toner of a color different from the previous one can be applied in a superposed manner by the developments. Indicated at reference letters T and T' in FIGS. 12 to 17 are toners in different colors, which are applied to the surface of the image retainer.

In any of the embodiments of FIGS. 12 to 17, moreover, each development is conducted with the developer in a polarity opposite to that of the electrostatic image thereby to provide an excellent effect that a remarkably clear color image can be reproduced with little scattering of the developer, and the reproducing apparatus is so constructed as is shown in FIG. 9 thereby to provide an advantage that the primary and secondary chargers and the image exposing ray producing apparatus taking part in the respective retentions of the electrostatic images can be commonly used. These embodiments of FIGS. 12 to 17 will be described more specifically in the following in connection with Examples 5 to 10.

EXAMPLE 5 (I.E., EMBODIMENT OF FIG. 12)

The reproducing apparatus shown in FIG. 9 was used. Despite of this fact, the image retainer 1 was prepared by forming a transparent insulating film having a thickness of 20 $\mu$m on a CdS photosensitive layer having a thickness of 30 $\mu$m and had a circumferential speed of 180 mm/sec. The image retainer 12 thus prepared was so charged by means of a d.c. scorotron corona discharger 2*b*, while being subjected to a uniform exposure by the lamp 2*a* of the primary charger 2, that its surface potential took a level of +1,000 V. Next, the image retainer 1 was charged to have a surface potential of −100 V by means of the secondary charger 3 composed of the scorotron corona discharger having an a.c. component. This charged surface was subjected to a writing exposure with a density of 16 dots/mm by means of the laser beam scanner using the He-Ne laser, as shown in FIG. 2, to retain an electrostatic image having a background potential of −100 V and an exposed portion potential of +50 V. This electrostatic image was developed by the developing means 5 shown in FIG. 3.

The developing means 5 used the developer, which was composed of: a carrier prepared by dispersing and containing 50 wt. % of magnetite in a resin to have an average particle diameter of 20 $\mu$m, a magnetization of 30 emu/g and a resistivity of $10^{14}\Omega$ cm or higher; and a non-magnetic toner prepared by adding 10 wt. parts of a benzine derivative as the yellow pigment and another charge controlling agent to the styrene-acryl resin to have an average particle diameter of 10 $\mu$m, under a condition that the ratio of the toner to the carrier was 20 wt. %. Moreover, the non-contact jumping developing condition was resorted to, under which the developing sleeve 31 had an external diameter of 30 mm and a number of revolutions of 100 r.p.m., under which the magnet 32 has its N and S magnetic poles of a magnetic flux density of 900 gausses and a number of revolutions of 1,000 r.p.m., under which the layer of the developer in the developed region had a thickness of 0.7 mm, under which the gap between the developing sleeve 31 and the image retainer 1 was 0.8 mm, and under which a superposed voltage containing a d.c. voltage of −50 V and an a.c. voltage of 2.5 kHz and 2,000 V was applied to the developing sleeve 31.

While the developing image was being developed by the developing means 5, the remaining developing means 6 to 8, as shown in FIG. 3, were held in their undeveloping state. This was achieved by disconnecting the developing sleeve 31 from the power supply 39 into its floating state, by grounding the same to the earth, or by positively applying the d.c. bias voltage, which had the same polarity as the charge of the image retainer 1 but the opposite polarity to the charge of the toner, to the developing sleeve 31. Of these, it is preferred to apply the d.c. bias voltage. Since the developing means 6 to 8 were made to conduct their developments under the non-contact jumping developing condition like the developing means 5, it was not necessary to eliminate the layer of the developer layer from the developing sleeve 31. Of those developing means 6 to 8: the developing means 6 used a developer which was prepared by replacing the toner of the developer of the developing means 5 by a toner containing polytungstate as the [Magenta] *magenta* pigment in place of the yellow pigment; the developer 7 used a developer which was prepared by replacing the same toner by a toner containing copper phthalocyanine as the cyan pigment; and the developing means 8 used a developer which was prepared by replacing the same tone by a toner containing carbon black as the black pigment. It is quite natural that the toner containing other pigment and dye could be used as the color toner, and that the order of the colors to be developed and the order of the developing means could be suitably selected. Especially in case the positions of the image exposing rays were superposed, the order of the colors to be developed had to be carefully determined because it had a serial relationship with the clearness of the color image.

When the surface of the image retainer 1 developed by the developing means 5 arrived again at the position, where it was to be exposed to the image exposing ray 4, after it had passed through the positions of the corona discharger 15 and the pre-transfer lamp 10, both of which were not necessary until the final transfer was conducted, the charge eliminating means 13 and the cleaning means 14, both of which are held in their inoperative states, and the primary charger 2 and the secondary charger 3' which came into their paused states after having conducted the primary and secondary charging operations, a second writing operation was conducted with a shift of the dot positions, in a doubled light quantity and in the same dot density by means of the same laser beam scanner as the previous one. The electrostatic image thus obtained had a potential of +200 V for the background portion potential of −100 V. The resultant electrostatic image was developed by the developing means 6 under the same conditions as those of the developing means 5 except that a voltage having a d.c. component of 100 V and an a.c. component of 2.5 kHz and 2,000 V was applied to the developing sleeve 31.

Likewise, at the third rotation of the image retainer 1, a writing operation was conducted in a tripled light quantity by means of the laser beam scanner to retain an electrostatic image having a potential of +350 V for a background portion potential of −100 V. This electrostatic iamge was developed by the developing means 7 under the same conditions as those of the developing means 5 except that a voltage having a d.c. component of 250 V and an a.c. component of 2.5 kHz and 2,000 V was applied to the developing sleeve 31. Likewise, moreover, a writing operation was conducted at the fourth rotation of the image retainer 1 in a quadrupled light quantity by means of the laser beam scanner to retain an electrostatic iamge of +500 V for a background potential of −100 V. This electrostatic image was developed by the developing means 8 under the same conditions as those of the developing means 5 except that a voltage having a d.c. component of 400 V and an a.c. component of 2.5 kHz and 2,000 V was applied to be developing sleeve 31.

At the stage when that fourth development was conducted so that the color image of four colors was retained on the image retainer 1, the corona discharger 15 and the pre-transfer lamp 10 were operated to make the color image liable to be transferred, and this color image was transferred to the recording member P by the transfer means 11 and fixed by the fixing means 12.

The image retainer 1 having the color image thus transferred thereto had its charges eliminated by the charge eliminating means 13 and its surface cleared of the residual toners by the abutment against the cleaning blade of the cleaning means 14. As a result, the one color image reproducing cycle was completely finished at the time the surface having the color image retained therein passed over the cleaning means 14.

The color image thus reproduced was freed from any color mixing not only at the portion, to which the respective color toners were coarsely applied, but also as the portion, to which the same were densely applied, so that it was remarkably clear.

EXAMPLE 6 (I.E., EMBODIMENT OF FIG. 13)

The same reproducing apparatus as that of the Example 5 was used, and primary and secondary charging operations were conducted under the same conditions as those of the Example 5 by means of the primary charger 2 and the secondary charger 3'. After that, the writing operations was conducted by the same laser beam scanner as that of the Example 5 but in a light quantity four times as large as that of the first writing operation of the Example 5 and with the same dot density as that of the Example 5 to retain an electrostatic image having an exposed portion potential of +500 V for a background portion potential of −100 V in the image retainer 1 under the same conditions as those of the Example 5.

This electrostatic image was developed by the developing means 5 under the same conditions as those of the Embodiment 5 except that a superposed voltage composed of a d.c. voltage of 50 V and an a.c. voltage of 1.5 kHz and 1,000 V was applied to the developing sleeve 31.

Moreover, when the surface of the image retainer 1 thus developed by the developing means 5 arrived again at the position of the secondary charger 3', the image retainer 1 is so charged again by the secondary charger 3' that its surface potential took a level of −100 V. That surface was subjected to second writing and exposing operations under the same conditions as the previous ones except the shift of the dot positions by means of the same laser beam scanner to retain again an electrostatic image. This electrostatic image was developed by the developing means 6 using the same developer as that of the Example 5 and under basically the same conditions as the developing conditions of the developing means 5.

Like the second operation, moreover, the charging and exposing operations were repeated to develop a third electrostatic image by the developing means 7 and to develop a fourth electrostatic image by the developing means 8 in a similar manner. In this case, each development was conducted by suitably changing the d.c. bias component and the amplitude, frequency, duty ratio and so on of the a.c. component of the voltage, which was to be applied to the developing sleeve 31, in accordance with the changes, developing characteristics and color reproducing state of the surface potential of the image retainer 1.

After the fourth development has been conducted to retain a color image of four colors on the image retainer 1, the operations of reproducing the color image was completed like the Example 5.

The reproduced image thus obtained was remarkably clear like that of the Example 5.

EXAMPLE 7 (I.E., EMBODIMENT OF FIG. 14)

The reproducing apparatus shown in FIG. 9 was used. Despite of this fact, the image retainer 1 was prepared by forming a transparent insulating film having a thickness of 10 μm on an α-Si photosensitive layer having a thickness of 10 μm and had a circumferential speed of 180 mm/sec. The image retainer 1 thus prepared was charged with a voltage of +700 V by the primary charger 2, while being uniformly exposed to the lamp 2a like the Example 5, and was then charged with a voltage of 0 V by the secondary charger 3'. This charged surface was subjected to a writing operation by the laser beam scanner like the Example 5. The electrostatic image thus obtained had a potential of +300 V with respect to the background portion potential of 0 V. The resultant electrostatic image was developed by the developing means 5 under the same conditions as those of the Example 5 except that a voltage composed of a d.c. component of 100 V and an a.c. component of 500 Hz and 400 V was applied to the developing sleeve. A second development was conducted by the developing means 6 using the same developer as that of the Example 5 and under the same conditions as those of the developing means 5 by executing the primary and secondary charging operations and the image exposure under the same conditions as those of the first development after the charge eliminating means 13 had been operated to eliminate the charges (although this charge eliminating step might be omitted). Third and fourth developments were repeated in the same manner as that of the second one by means of the developing means 7 and 8, respectively. The developers of the developing means 7 and 8 were the same as those of the Example 5, respectively. Although substantially unnecessary for practical purposes, however, the change of the conditions of the voltage to be applied to the developing sleeve was conducted like the Example 6 in accordance with the potential change, the developing characteristics and the color reproductivity of the image retainer 1. Thus, the color image reproducing operations were completed like the Example 5.

The reproducing image thus obtained was remarkably clear like the Example 5.

EXAMPLE 8 (I.E., EMBODIMENT OF FIG. 15)

The reproducing apparatus shown in FIG. 9 was used. Despite of this fact, the image retainer 1 was prepared by forming a transparent insulating film having a thickness of 10 μm on an α-Si photosensitive layer having a thickness of 10 μm and had a circumferential speed of 180 mm/sec. The image retainer 1 thus prepared was charged with a voltage of −700 V by the primary charger 2, while being uniformly exposed to the lamp 2a like the Example 5, and was then charged with a voltage of +300 V by the secondary charger 3'. This charged surface was subjected to a slit exposure through the blue filter of an ordinary color reproducing machine. As a result, there was obtained at a potential of +300 V an electrostatic image which corresponds to the unexposed portion with respect to the background portion of 50 V corresponding to the exposed portion. The resultant electrostatic image was developed by the developing means 5 under the same conditions as those of the Example 5 except that a voltage composed of a d.c. component of 50 V and an a.c. component of 500 Hz and 400 V was applied to the developing sleeve. A second development was conducted by the developing means 6 using the same developer as that of the Example 5 and under the same conditions as those of the developing means 5 by executing the primary and secondary charging operations and the image exposure through a green filter under the same conditions as those of the first development after the charge eliminating means 13 had been operated to eliminate the charges (although this charge eliminating step might be omitted). Third and fourth developments were repeated in the same manner as that of the second one but by changing the exposing filters into a red filter and an neutral filter, respectively, to form an electrostatic image, and this electrostatic image was developed by means of the developing means 7 and 8, respectively. The developers of the developing means 7 and 8 were the same as those of the Example 5, respectively. Although substantially unnecessary for practical purposes, however, the change of the conditions of the voltage to be applied to the developing sleeve was conducted like the Example 6 in accordance with the potential change, the developing characteristics and the color reproductivity of the image retainer 1. Thus, the color image reproducing operations were completed like the Example 5.

The reproduced image thus obtained was remarkably clear like the Example 5.

EXAMPLE 9 (I.E., EMBODIMENT OF FIG. 16)

The reproducing apparatus shown in FIG. 9 was used. Despite of this fact, the image retainer 1 was prepared by forming a transparent insulating film having a thickness of 10 μm on an α-Si photosensitive layer having a thickness of 10 μm and had a circumferential speed of 180 mm/sec. The image retainer 1 thus prepared was charged with a voltage of +700 V by the primary charger 2, while being uniformly exposed to the lamp 2a like the Example 5, and was then charged with a voltage of −100 V by the secondary charger 3'. This charged surface was simultaneously subjected to a slit exposure through the blue filter of an ordinary color reproducing machine, and then to a uniform exposure. As a result, there was retained at a potential of +300 V an electrostatic image which corresponds to the unexposed portion with respect to the background portion of −100 V corresponding to the exposed portion. The resultant electrostatic image was developed by the developing means 5 under the same conditions as those of the Example 5 except that a voltage composed of a d.c. component of 0 V and an a.c. component of 500 Hz and 400 V was applied to the developing sleeve. A second development was conducted by the developing means 6 using the same developer as that of the Example 5 and under the same conditions as those of the developing means 5 by executing the primary and secondary charging operations, the image exposure through a green filter, and the uniform exposure under the same conditions as those of the first development after the charge eliminating means 13 has been operated to eliminate the charges (although this charge eliminating step might be omitted). Third and fourth developments were repeated in the same manner as that of the second one but by changing the exposing filters into a red filter and an neutral filter, respectively, to form an electrostatic image, and this electrostatic image was developed by means of the developing means 7 and 8, respectively. The developers in the developing means 7 and 8 were the same as those of the Example 5, respectively. Although substantially unnecessary for practical purposes, however, the change of the conditions of the voltage to be applied to the developing sleeve was conducted like the Example 6 in accordance with the potential change, the developing characteristics and the color reproductivity of the image retainer 1. Thus, the color image reproducing operations were completed like the Example 5.

The reproduced image thus obtained was remarkably clear like the Example 5.

EXAMPLE 10 (I.E., EMBODIMENT OF FIG. 17)

The reproducing apparatus shown in FIG. 9 was used. Despite of this fact, the image retainer 1 was prepared by forming a transparent insulating film having a thickness of 10 μm on an α-Si photosensitive layer having a thickness of 10 μm and had a circumferential speed of 180 mm/sec. The image retainer 1 thus prepared was charged with a voltage of −700 V by the primary charger 2, while being uniformly exposed to the lamp 2*a* like the Example 5, and was then charged with a voltage of +300 V by the secondary charger 3'. Simultaneously with this secondary charging operation, the charged surface was subjected to a writing operation by means of the laser beam scanner and then to a uniform exposure. As a result, there was retained at a potential of +300 V an electrostatic image which corresponds to the exposed portion with respect to the background portion of −100 V corresponding to the unexposed portion. The resultant electrostatic image was developed by the developing means 5 under the same conditions as those of the Example 5 except that a voltage composed of a d.c. component of 50 V and an a.c. component of 500 Hz and 400 V was applied to the developing sleeve. A second development was conducted by the developing means 6 using the same developer as that of the Example 5 and under the same conditions as those of the developing means 5 by executing the primary and secondary charging operations, the image exposure, and the uniform exposure under the same conditions as those of the first development after the charge eliminating means 13 had been operated to eliminate the charges. Third and fourth developments were repeated in the same manner as that of the second one, and this electrostatic image was developed by means of the developing means 7 and 8, respectively. The developers in the developing means 7 and 8 were the same as those of the Example 6, respectively. Although substantially unnecessary for practical purposes, however, the change of the conditions of the voltage to be applied to the developing sleeve was conducted like the Example 6 in accordance with the potential change, the developing characteristics and the color reproductivity of the image retainer 1. Thus, the color image reproducing operations were completed like the Example 5.

The reproduced image thus obtained was remarkably clear like the Example 5.

According to the Examples of the present invention thus far described, it is possible to change the potentials and polarities of the electrostatic images in dependence upon the relative strengths of the primary and secondary charging operations and to easily conduct the positive or negative exposure. It is also possible to superpose the developers under the non-contact jumping developing conditions and especially to make the electrostatic images and the developers have opposite polarities. As a result, the developers are easily applied to the electrostatic images so that the adjustment of the developing conditions of the image retainer for the changes in the potential can be facilitated to reproduce a color image having a sufficient density and an excellent clearness while having little scattering of the developers. Since the common charger and image exposing ray producing means are used for each retention of the electrostatic images, moreover, there can be attained an effect that the recording apparatus can be reduced in size and cost without being troubled by registration.

Incidentally, the present invention can be applied to such an image retainer as is applied to a base, as in electrofax paper, and that the color image retained thereon is not transferred but fixed. In this case, the pre-transfer lamp, the transfer means, the cleaning means and so on can be dispensed with. It is true but the pre-transfer lamp 10 and the charge eliminating means 15 can be omitted in the case of the transfer, and this transfer may be conducted not only the corona transfer one but also a bias roller one, an adhesion transfer, a direct pressure one or on using an intermediate transfer member, whereas the fixture should not be limited to the heat roller.

On the other hand, it is a great advantage that the polarities of the potentials of the latent images of the image portion and the non-image portion can be reversed by the balance in the strength between the primary and secondary charging operations. Even if the polarities are common, however, the development can naturally be conducted by changing the developing bias conditions. As to the potentials at this time, the relationship, in which the zero potential in FIGS. 12 to 17 is shifted up or down, holds as it is. A similar development can be conducted if the developing bias is accordingly changed.

FIGS. 18 to 21 show other embodiments of the method of the present invention. Incidentally, FIGS. 18 to 21 all show the steps after the second development has already been conducted.

Figure 18:
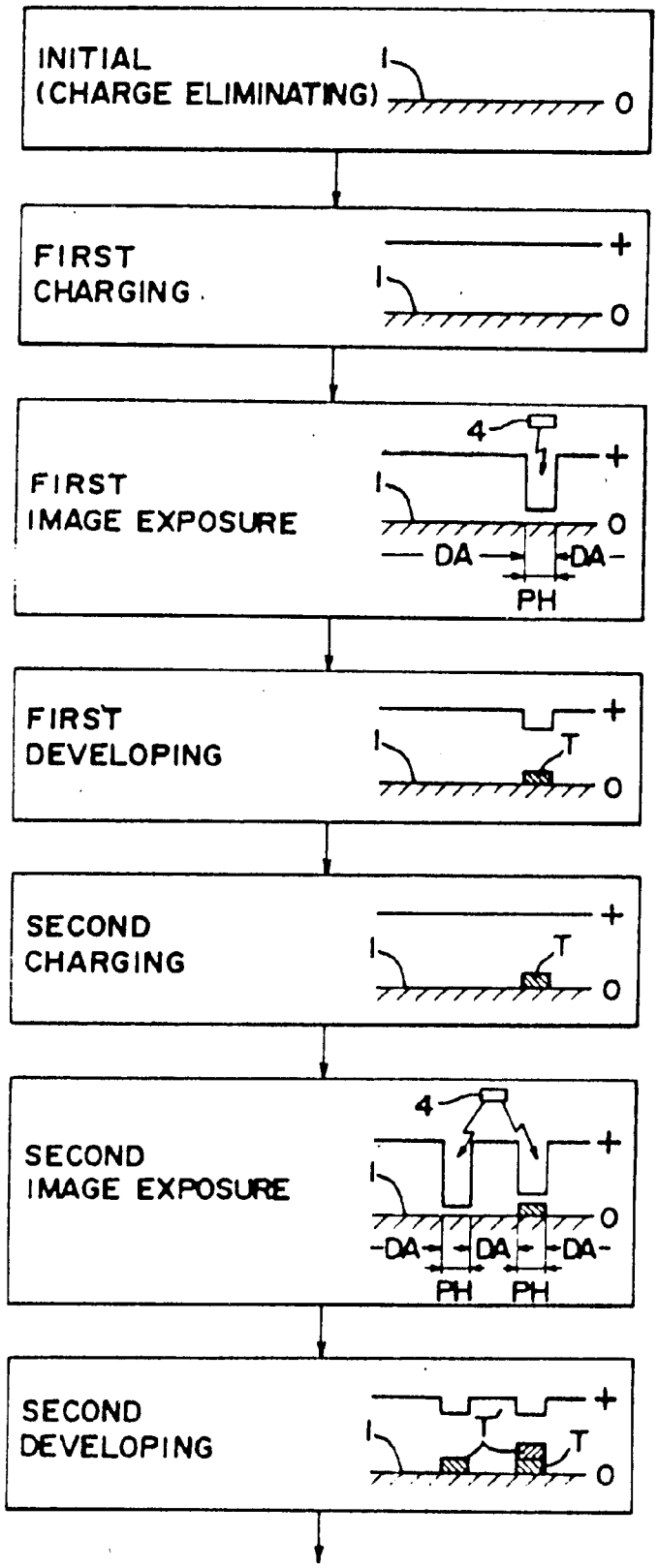
FIGS. 18 to 21 are flow charts showing another embodiment of the method of the present invention to be practised by the reproducing apparatus of FIG. 1, respectively.

FIG. 18 shows the embodiment of the reproducing method of the present invention, comprising the steps of: uniformly subjecting the surface of the image retainer 1 in the initial state, which has had its charges eliminated by the charge eliminating means 13 of the reproducing apparatus of FIG. 1 and has been cleaned by the cleaning means 14 to have a zero potential, to a first charging operation by means of the charger 2; subjecting the charged surface to a first image exposure of different color by the image exposing means 4, as shown in FIG. 2, to retain an electrostatic image in which the potential of the exposed portion PH is dropped with respect to the background potential of the unexposed portion DA; firstly developing the electrostatic image by any one of the developing means 5 to 8, which uses as its developer the color toner corresponding to the first image exposure, so that the potential of the electrostatic image by the first image exposure is elevated up to the background potential as a result that the color toner having been frictionally charged with the same polarity as that of the charges of the image retainer 1 is applied; secondly charging the image retainer 1 uniformly again at the second rotation by means of the charger 2 with or without the charge elimination by the charge eliminating means 13, because that portion cannot retain the electrostatic image even if it is subjected again to the image exposure; conducting a second image exposure by the same image exposing means 4 as the previous one with the same spot density as that of the previous image exposure and in a manner that the positions are superposed at least partially; subsequently conducting a second development by another development means using as its developer the color toner corresponding to the second image exposure; subsequently repeating in a like manner third and fourth charging operations and image exposures to retain a color image having a plurality of color toner images superposed on the image retainer 1; operating one or both of the pre-transfer charger 9 and the pre-transfer exposing lamp 10, if necessary, from the step at which the fourth development is conducted to the step as which the color image finishes its passage; transferring the color image by the transfer means 11 to the recording member P being fed in synchronism with the rotations of the image retainer 1; fixing the color image transferred to the recording member P by the fixing means 12; eliminating the charges from the surface of the image retainer 1, from which the color image has been transferred, by the charge eliminating means 13; and cleaning the image retainer 1 by the cleaning means 14 until the initial state is restored, thus completing the one cycle of the color image reproduction. Thus, by conducting the image exposure of each time such that the spot positions are superposed at least partially, it is possible to prevent the color image retained from having its picture element density dropped so that the color image can be reproduced densely and finely in its colors. Incidentally, the retention of such an electrostatic image by the second image exposure at a position different from that having previously trapped the toner T as has a lower potential at its exposed portion PH that the background potential at its unexposed portion DA is intended to shown the case in which the color image has in that particular position none of the picture elements of the color of the toner T. Indicated at reference letter T' is the toner which has been applied at the second development. Although FIG. 18 shows the case in which the spot positions of the image exposures of the respective times are completely superposed, the spot positions may be partially superposed. In the method of the present invention, moreover, since the retentions of the electrostatic images at the respective times can be conducted by the common apparatus, as has been described hereinbefore, the reproducing apparatus can be conducted in a small size and at a low cost, and the synchronous control of the image exposure can be easily conducted.

Figure 19:
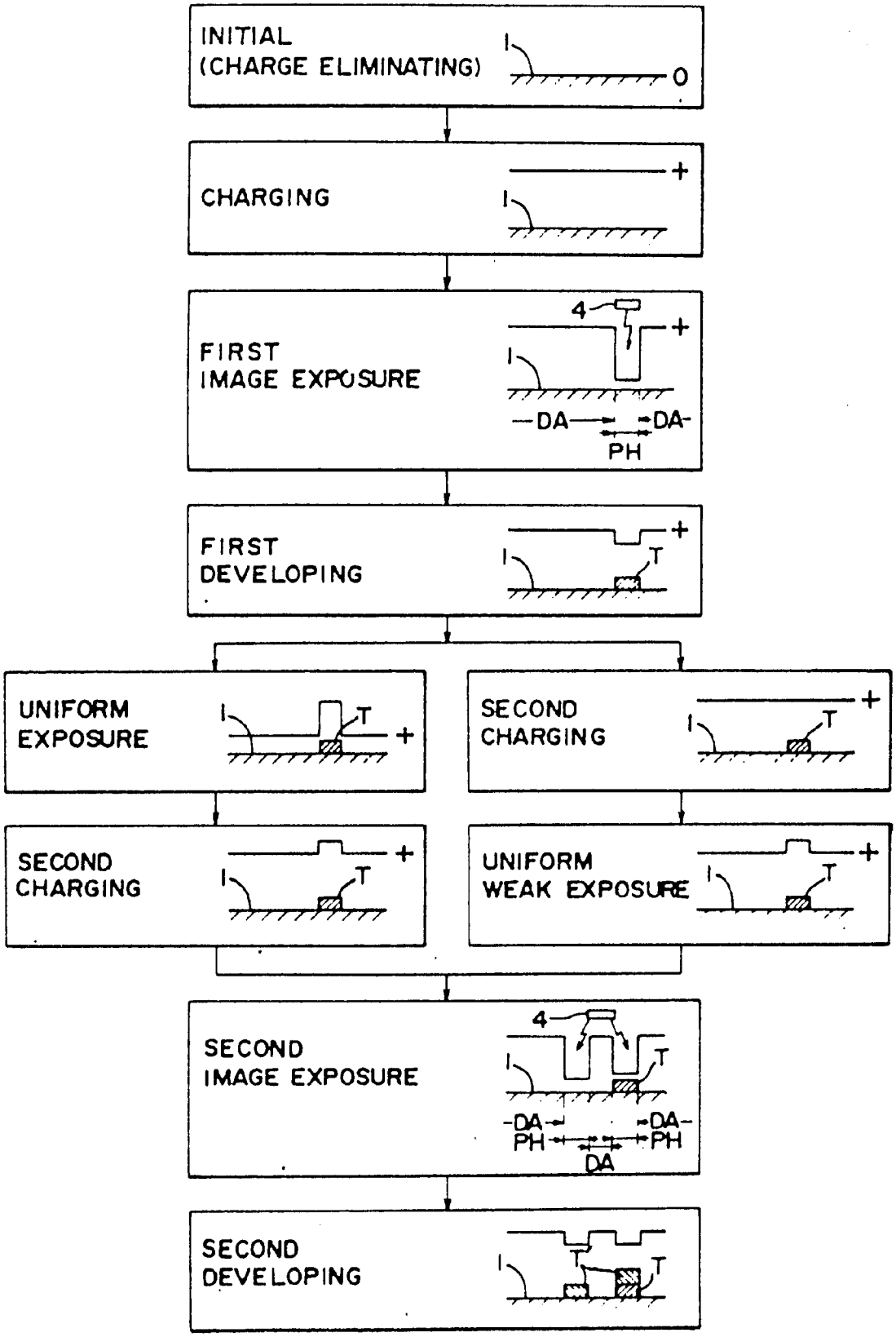

FIG. 19 shows the embodiment of the present invention, which is the same as the embodiment of FIG. 18 until the first development but different therefrom in that, after the first development, the surface of the image retainer 1 is either secondly charged by the charger, after it has been uniformly exposed by the pre-transfer exposing lamp 10 or the charge eliminating lamp of the charge eliminating means 13, or uniformly but weakly exposed by means of the exposing lamp 3 after it has been secondly charged by the charger 2, so that the electrostatic image retainer portion having trapped the previous toner T is made to have such a slightly higher potential than that of the background portion that it is liable to retain the electrostatic image, whereupon, like the embodiment of FIG. 18, the second image exposure and the second development are executed, followed by repeating the third and fourth image exposures and developments in a similar manner to retain the color image. The embodiment of FIG. 19 is suitable in case it is undesirable to apply the subsequent toner T' to the previous toner T. Generally speaking, more specifically, most of the images are required to have a reproductivity of black letters. According to the method being described, the light is not passed fully at the subsequent writing and the color toner to be subsequently applied in a superposed manner can be prevented from being applied by firstly conducting the writing operation of a black letter portion so that the vagueness of colors and the shift of positions can be prevented. Thus, it is possible to obtain an image in which a preferential color is stressed. In combination with the embodiment of FIG. 18, on the other hand, an image of the selected color can be stressed or weakened. It is quite natural that the charge eliminating step and the charging step can be introduced after the first development and after the subsequent process is entered.

Figure 20:
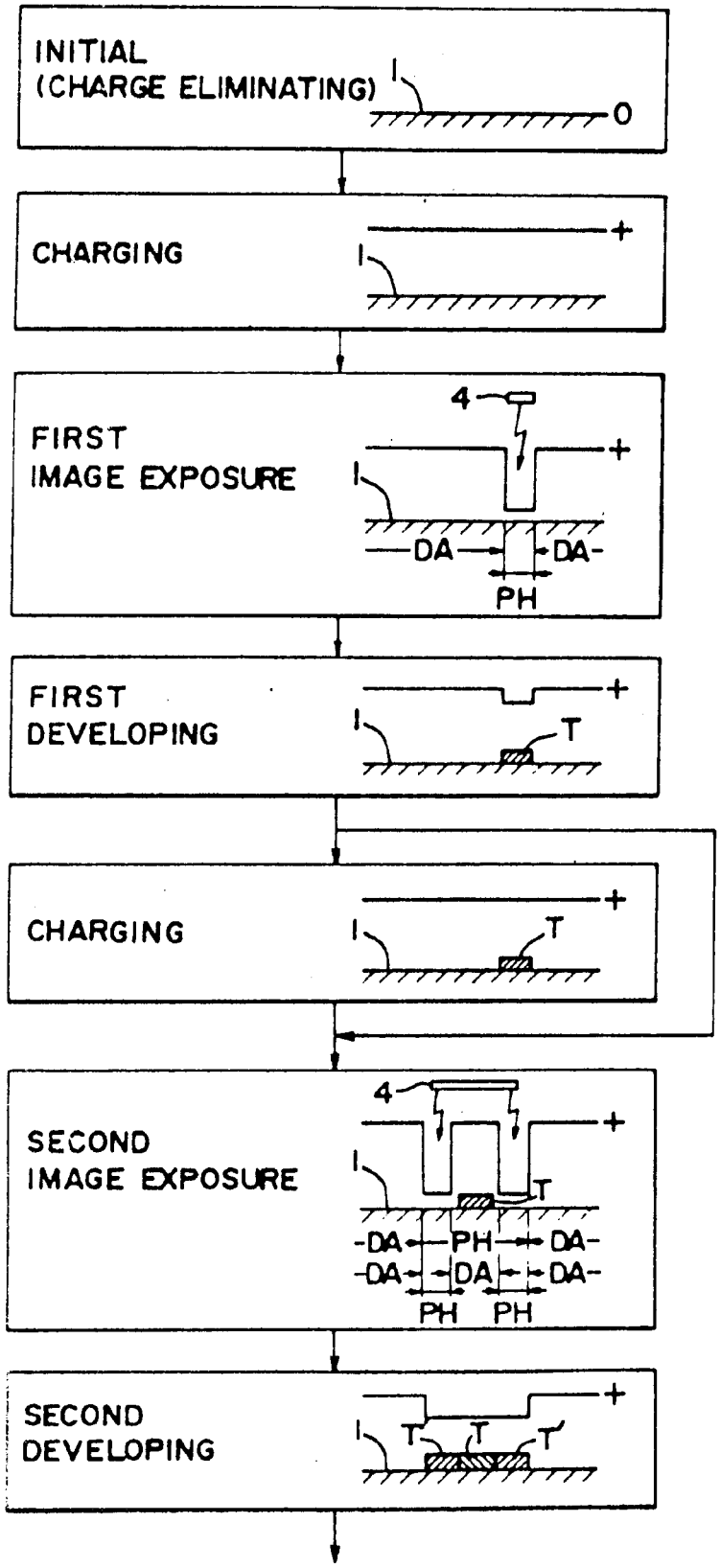
Figure 21:
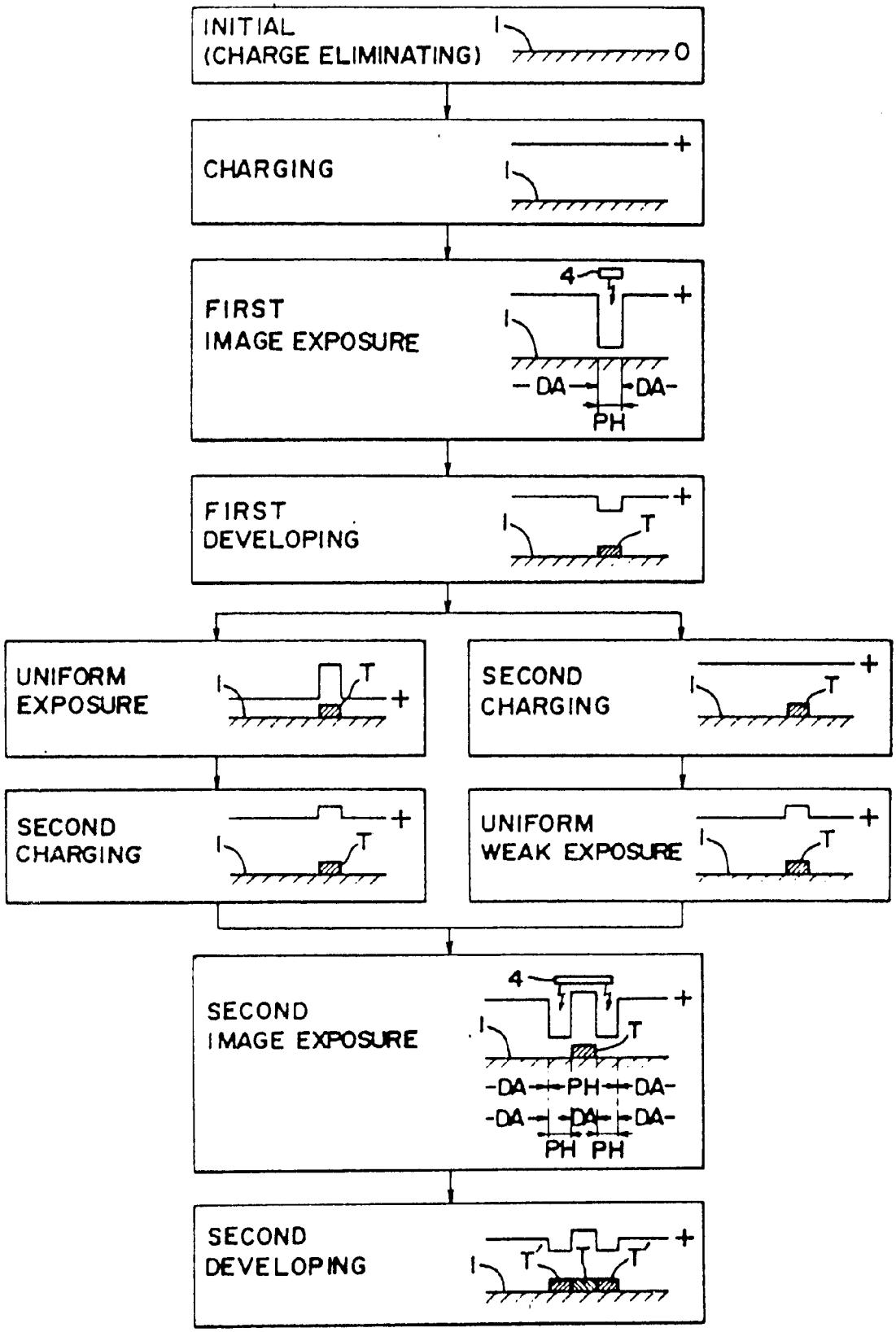

FIGS. 20 and 21 show the embodiments of the present invention, which are improved in the problem of mixing by applying the subsequent toner T' in a manner to surround the previous toner T, because the mixing state of a color toner is changed in dependence upon the fixing method or the color superposing order to change the color balance if the subsequent toner T' is superposed upon the previous toner T. The embodiments of FIGS. 20 and 21 correspond to those of FIGS. 18 and 19, respectively, but are different therefrom in that the spot of the second image exposing ray, i.e, the subsequent image exposing ray is made so large by the image exposing means 4, i.e., by means of the lens 27 of the laser beam scanner of FIG. 2 as to enclose the spot of the first image exposing ray, i.e., the previous image exposing ray. Incidentally, the boundaries between the unexposed portion DA and the exposed portion pH in the second image exposure are shown in two ways, i.e., the upper portion shows the spot of the second image exposing ray, and the lower portion shows the exposing area shield by the center toner image. In the embodiments of FIGS. 20 and 21, too, the color image retained can be prevented from having its picture element density dropped so that it can have its colors retained densely and finely, and the problem of toner mixing is eliminated so that a color image having clearer colors can be retained in the embodiments of FIGS. 20 and 21. Especially in the embodiment of FIG. 21, as compared with the embodiment of FIG. 20, the portion, in which the previous spot and the subsequent spot are superposed, does not trap or is reluctant to trap the subsequent toner T' on the previous toner T thereby to prevent the toners T and T' from being mixed to exhibit a mixed color at the portion having the spots superposed because the subsequent toner T' is applied only around the previous spot, so that a beautiful blended color can be attained.

Incidentally, in the embodiments of FIGS. 18 and 19, the toners are mixed so that the color developing sequence exerts great influence upon the clearness of the color image. It is, therefore, important to determine the sequence of the developments. In the embodiments of FIGS. 20 and 21, however, the importance of the developing order is not so high as that of the embodiments of FIGS. 18 and 19. Despite of this fact, how the colors are arranged from the central portion to the outer side still influences upon the tone of the color image.

The foregoing are the embodiments in which all the developments by the developing means 5 to 8 are conducted by the developing method of applying the toner charged with the same polarity as that of the background potential to the electrostatic image corresponding to the exposed portion having a lower potential than that of the background potential. According to the reproducing apparatus shown in FIG. 9, however, the developments of the method of the present invention can be conducted by the developing method of applying the toner charged with the polarity opposite to that of the electrostatic image to the electrostatic image.

Figure 22:
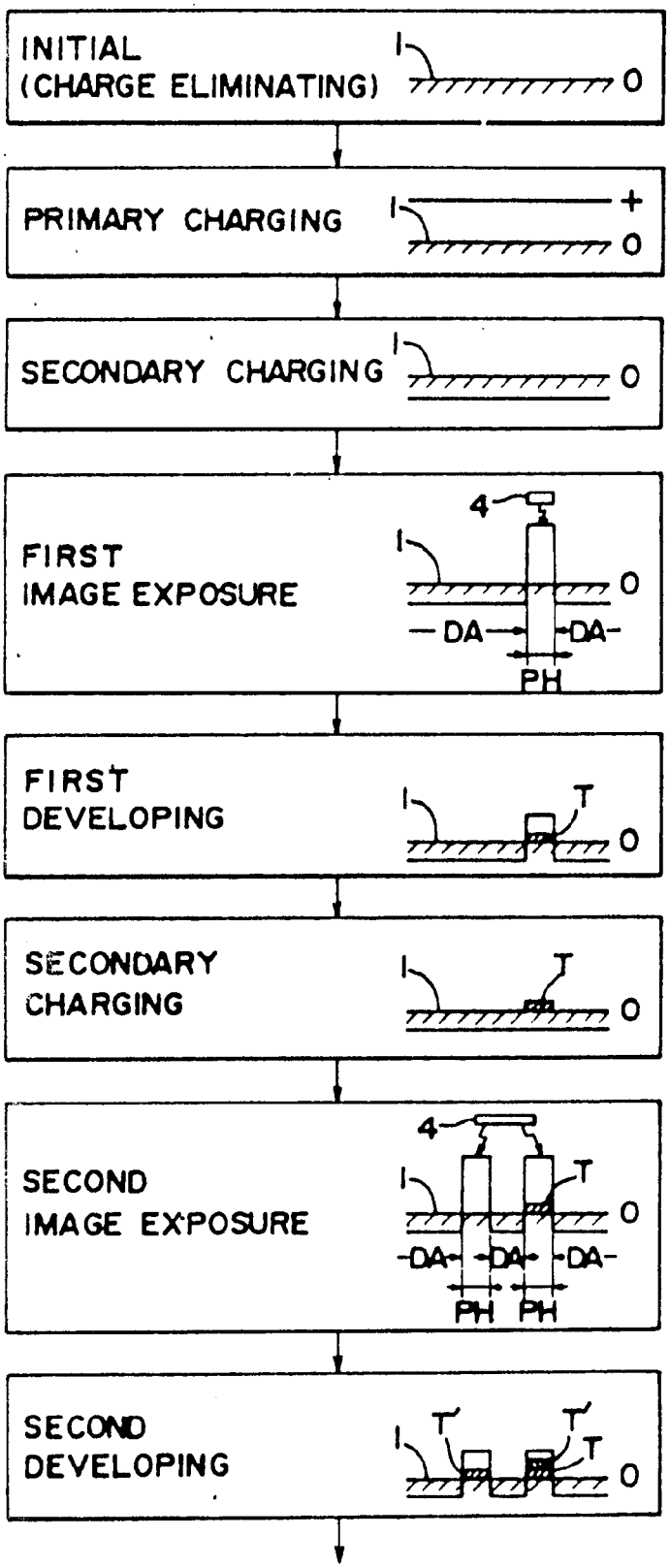
FIGS. 22 to 25 are flow charts showing flow charts of an embodiment of the method of the present invention to be practised by the recording apparatus of FIG. 9, respectively.

FIG. 22 shows the embodiment of the reproducing method of the present invention, comprising the steps of: subjecting like the above embodiment the surface of the image retainer 1, which has had its charges eliminated by the charge eliminating means 13 of the reproducing apparatus of FIG. 9 and has been cleaned by the cleaning means 14 to have a zero potential, to a primary charging operation by means of the charger 2; subjecting the surface to a secondary charging operation by means of the secondary charger 3'; subsequently subjecting the charged surface to a first image exposure by the image exposing means 4 like that of FIG. 2; firstly developing the electrostatic image, in which the absolute value of the potential of the exposed portion pH retained is higher than the background potential of the unexposed portion DA, by that one of the developing means 5 to 8, which uses as its developer the toner for effecting the changing operation with a polarity opposite to that of the electrostatic image of the color corresponding to the first image exposure, so that the surface potential of the electrostatic image retaining portion is dropped by the toner having the opposite polarity applied; discharging again the surface of the image retainer 1 before the image exposure at the second rotation by means of the second charger 3' to retain the electrostatic image in the previously developed electrostatic image retaining portion, too; conducting again a second image exposure by the same image exposing means 4 as the previous one with the same spot density as that of the previous image exposure and in a manner that the positions are superposed at least partially; subsequently conducting a development by another developing means using as its developer the color toner corresponding to the second image exposure having the same charging characteristics as those of the first development; subsequently repeating in a like manner third and fourth electrostatic image retentions and developments, thus completing the one cycle of the color image reproduction like the embodiments of FIGS. 18 to 21 after the color image has been retained. According to this embodiment, all the developments are conducted by applying the toners for charging the electrostatic images with an opposite polarity so that the control of the developing densities of the respective colors is easier than the embodiments of FIGS. 18 to 21.

Figure 23:
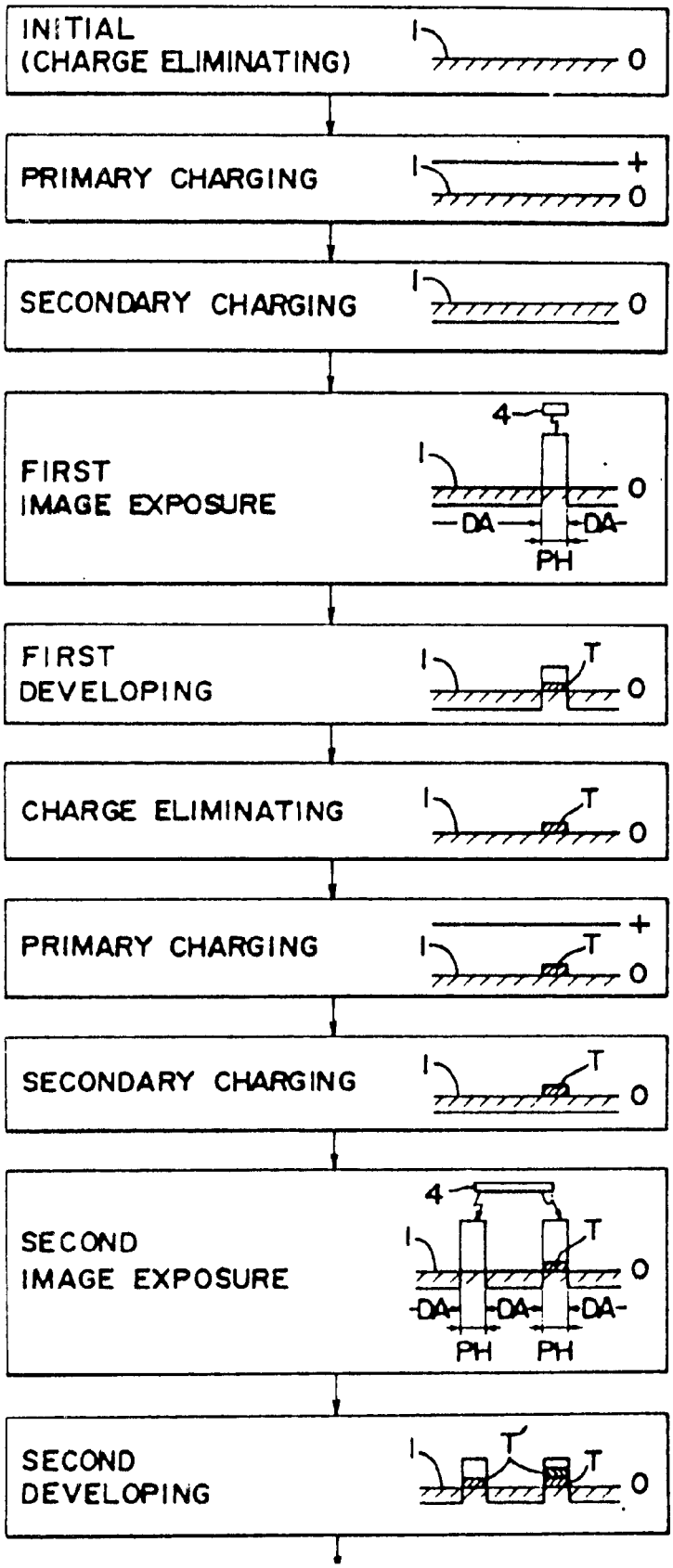

FIG. 23 shows an embodiment of the present invention, which is different from the embodiment of FIG. 22 in that not only the secondary charging operation by the secondary charger 3' is conducted but also the primary charging operation is conducted beforehand by the primary charger 2 during the time period between the first development and the second image exposure, and in that the charge elimination is also conducted by the charge eliminating means 13 prior to the primary charging operation. According to the embodiment of FIG. 23, it becomes possible to apply the toner T' in the same density to the toner T having been previously applied.

Figure 24:
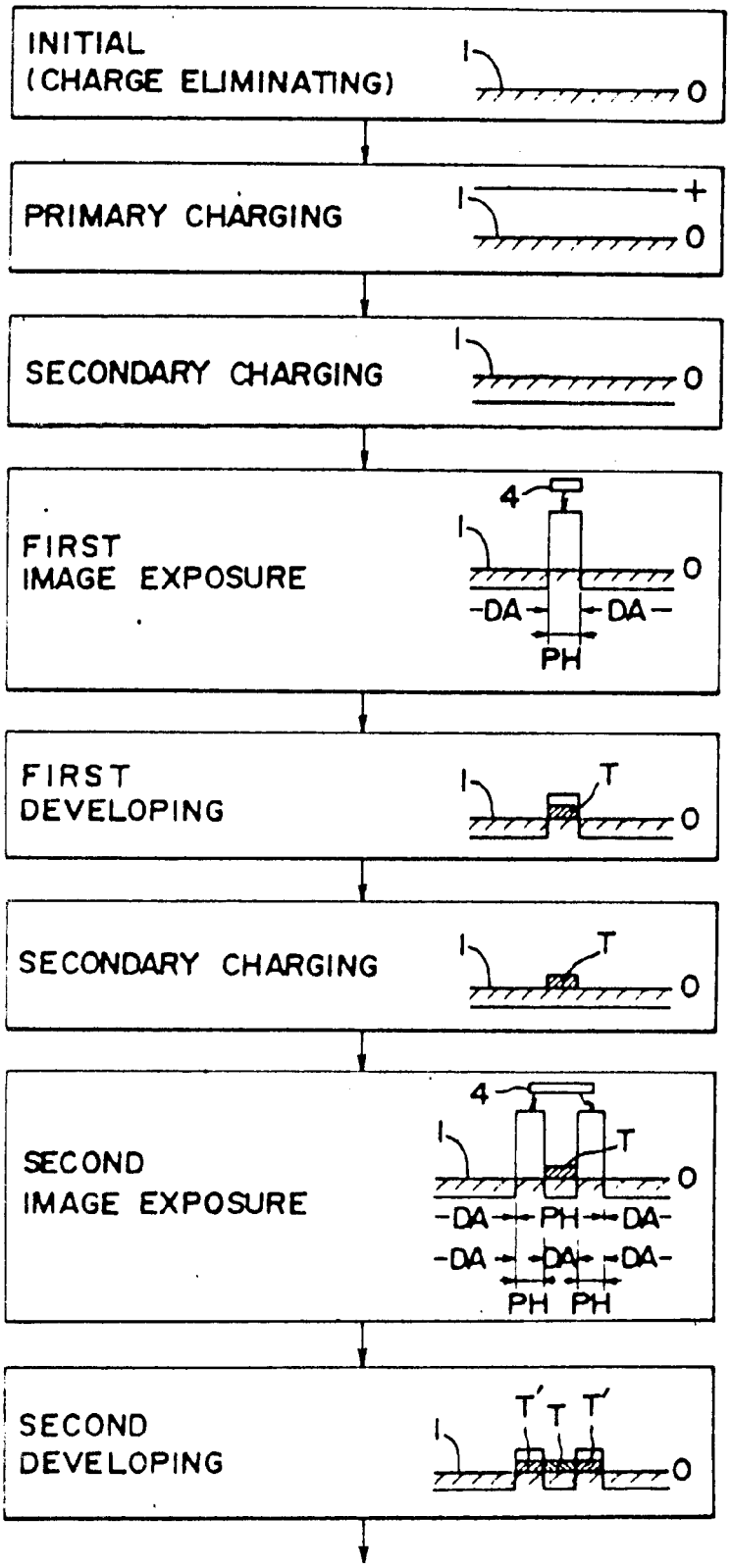
Figure 25:
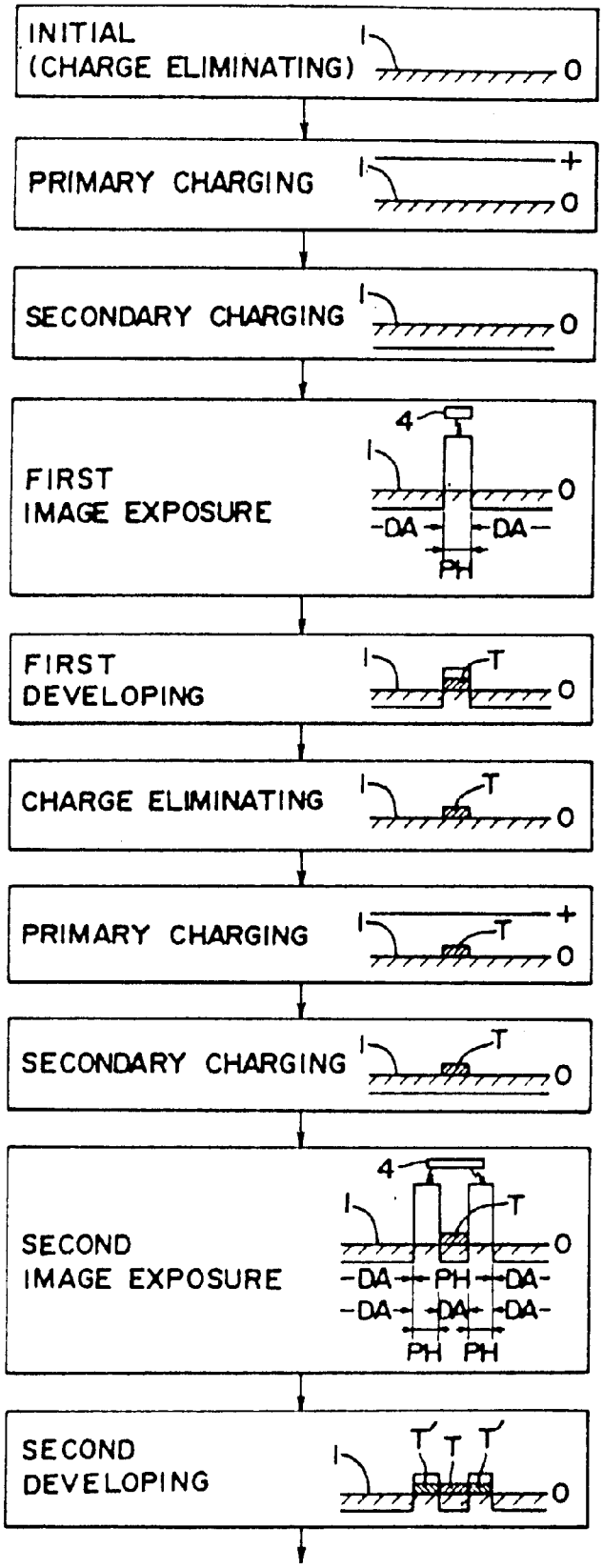

FIGS. 24 and 25 show embodiments of the method of the present invention, which are different from the embodiments of FIGS. 22 and 23 in that the second image exposure is conducted in a manner to change the spot diameter like the embodiments of FIGS. 20 and 21. According to the embodiments of FIGS. 24 and 25, there can be attained a result that the vagueness due to the color mixing can be eliminated like the embodiments of FIGS. 10 and 21.

Next, the embodiments of FIGS. 18 to 21 and FIGS. 22 to 25 thus far described will be described in more detail in the following as Examples 11 to 18, respectively.

EXAMPLE 11

The reproducing apparatus of FIG. 1 was used. However, the exposing lamp 3 was not used, but the image retainer 1 had a photosensitive surface layer of Se and a circumferential speed of 180 mm/sec. This image retainer 1 has its surface charged to +500 V by means of the charger 2 using the scorotron corona discharger, and the charged surface was subjected to a first image exposure in a density of 16 spots/mm by means of the laser beam scanner of FIG. 2 using the He-Ne laser.

As a result, there was retained in the image retainer 1 an electrostatic image which had a background potential of +500 V but an exposed portion potential of +30 V. The resultant electrostatic image was subjected to a first development by the developing means 5 shown in FIG. 3.

The developing means 5 used the developer, which was composed of: a carrier prepared by dispersing and containing 50 wt. % of magnetite in a resin to have an average particle diameter of 30 $\mu$m, a magnetization of 30 emu/g and a resistivity of $10^{14}\Omega$ cm or higher; and a non-magnetic toner prepared by adding 10 wt. parts of a benzine derivative as the yellow pigment and another charge controlling agent to the styrene-acryl resin to have an average particle diameter of 10 $\mu$m, under a condition that the ratio of the toner to the carrier was 20 wt. %. Moreover, the non-contact jumping developing condition was resorted to, under which the developing sleeve 31 had an external diameter of 30 mm and a number of revolutions of 100 r.p.m., under which the magnet 32 has its N and S magnetic poles of a magnetic flux density of 1,000 gausses and a number of revolutions of 1,000 r.p.m., under which the layer of the developer in the developed region had a thickness of 0.7 mm, under which the gap between the developing sleeve 31 and the image retainer 1 was 0.8 mm, and under which a superposed voltage containing a d.c. voltage of +400 V and an a.c. voltage of 1.5 kHz and 1,000 V was applied to the developing sleeve 31.

While the developing image was being developed by the developing means 5, the remaining developing means 6 to 8, as shown in FIG. 3, were held in their undeveloping state. This was achieved by disconnecting the developing sleeve 31 from the power supply 39 into its floating state, by grounding the same to the earth, or by positively applying the d.c. bias voltage, which had the polarity opposite to that of the charge of the image retainer 1 i.e., the opposite polarity to the charge of the toner, to the developing sleeve 31. Of these, it is preferred to apply the d.c. bias voltage. Since the developing means 6 to 8 were made to conduct their developments under the non-contact jumping developing condition like the developing means 5 it was not necessary to especially eliminate the layer of the developer from the developing sleeve 31. Of those developing means 6 to 8: the developing means 6 used a developer which was prepared by replacing the toner of the developer of the developing means 5 by a toner containing polytungstate as the [Magenta] *magenta* pigment in place of the yellow pigment; the developer 7 used a developer which was prepared by replacing the same toner by a toner containing copper phthalocyanine as the cyan pigment; and the developing means 8 used a developer which was prepared by replacing the same toner by a toner containing carbon black as the black pigment. It is quite natural that a toner containing other pigment and dye could be used as the color toner, and that, as has been touched hereinbefore, the sequence of the colors to be developed and accordingly the sequence of the developing means could be suitably selected.

The surface of the image retainer 1 thus having been subjected to the first development was subjected, after it had been secondly charged with +500 V at the second rotation by means of the charger 2 while the pre-transfer exposing lamp 10 being operated but the charge eliminating means 13 and the cleaning means 14 being left inoperative, to a second image exposure again in the superposed spot positions and in the same spot density by means of the same laser beam scanner and then to a second development using the [Magenta] *magenta* toner by the developing means 6. Likewise, a third development using the cyan toner by the developing means 7 and a fourth development using the black toner by the development means 8 were repeated. In each of the developments, incidentally, the developing density of each color can be adjusted in accordance with the changes of the surface potential of the image retainer 1, the developing characteristics, the color reproductivity and so on by changing the d.c. bias components and the amplitude and frequency of the voltage to be applied to the developing sleeve 31, and the selecting time of the time selecting conversion.

After the fourth development was conducted so that the four-color image was retained on the image retainer 1, it was made liable to be transferred by the pre-transfer charger 9 and the pre-transfer exposing lamp 10 so that it was transferred to the recording member P by the transfer means 11 until it was fixed by the fixing means 12. The image retainer 1 having the color image transferred thereto had its charges eliminated by the charge eliminating means 13 and its surface cleared of the residual toners by its abutment against the cleaning blade or fur brush of the cleaning means 14. The one cycle of the color image reproduction was completely ended at the time when the surface having retained the color image therein passes over the cleaning means 14.

The color image thus reproduced had the vagueness in color due to the color mixing but had a high density of spot picture elements and a finely expressed pattern.

EXAMPLE 12

The same reproducing apparatus of FIG. 1 as that of the Example 11 was used. In this case, however, the apparatus is equipped with the exposing lamp 3. And, a first development was conducted under absolutely the same conditions as those of the Example 11 except that a superposed voltage of a d.c. voltage of +40 V and an a.c. voltage of 2 kHz and 1,000 V was applied in the development to the developing sleeve 31. Next, at the second rotation, the surface of the image retainer 1 having been subjected to the first development was secondly charged with +600 V by means of the charging means 2 and was then subjected to a uniformly and weak exposure by the exposing means 3 to take a surface potential of +500 V. As a result, the surface potential of the portion having trapped the toner T by the first development came into a slightly higher state than +500 V. Therefore, this image retainer 1 had its surface subjected to a second image exposure and a second development like the Example 11. The exposure, uniform and weak exposure and development described above were repeated thirdly and fourthly thereby to conduct the color image reproduction like the Example 11.

The color image thus reproduced was finely expressed not differently of that of the Example 11 except that the tone of the mixed-color portion is stressed slightly better in its previously color than that of the Example 11.

Incidentally, in this Example, too, similar effects can be attained even if the charging operation is conducted by means of the charger 2 after a uniform exposure using the pre-transfer exposing lamp 10 or the exposing lamp of the charge eliminating means 13 in place of the charging operation and the uniform and weak exposure.

EXAMPLE 13

The same reproducing apparatus as that of the Example 11 was used. The reproduction of a color image was conducted absolutely similar to the Example 11 except that a first image exposure using a spot having a diameter of 20 $\mu$m, a second image exposure using a spot having a diameter of 30 $\mu$m, a third image exposure using a spot having a diameter of 40 $\mu$m, and a fourth image exposure using a spot having a diameter of 50 $\mu$m in the same spot position and in the same density of 16 spots/mm were conducted by the switching operation of the lens 27 of the laser beam scanner thereby to retain an electrostatic image having a potential of +50 V with respect to the background potential of +600 V, that a superposed voltage of a d.c. voltage of +450 V and an a.c. voltage of 1.5 kHz and 1,000 V was applied for the development to the developing sleeve 31, and that the colors were superposed in the order of the black, cyan, red and yellow toners.

The color image thus reproduced was substantially cleared of any vagueness by the color mixing so that it has a fine and clear tone.

Incidentally, in this Example, an identical color image could be attained even if the charging operation between the first development and the second image exposure, i.e., the charging operation between the previous development and the subsequent image exposure was omitted.

EXAMPLE 14

The same reproducing apparatus as that of the Example 12 was used. The reproduction of a color image was conducted under absolutely the same conditions as those of the Example 12 except that the image exposures were conducted in the same manner as the Example 13 to retain the same electrostatic image, and that a superposed voltage of a d.c. voltage of 30 [450] V and an a.c. voltage of 2 kHz and 500 V was applied for the development to the developing sleeve 31.

The color image thus reproduced had a fine and clear color tone which was hardly different from that of the Example 13.

EXAMPLE 15

The reproducing apparatus of FIG. 9 was used. The image retainer 1 was prepared by laying a transparent insulating surface layer having a thickness of 20 $\mu$m on a photosensitive layer of CdS having a thickness of 30 $\mu$m, and had a circumferential speed of 180 m/sec. The image retainer 1 thus prepared was primarily charged to have a surface potential of +1,000 V by means of the d.c. scorotron corona discharger while being uniformly exposed by the exposing lamp of the primary charger 2. Next, the image retainer 1 was charged to have a surface potential of −100 V by means of the secondary charger 3' which is constructed of the scorotron corona discharger having an a.c. component. The resultant charged surface was subjected to a first image exposure in a density of 16 spots/mm by means of the laser beam scanner of FIG. 2 using the He-Ne laser to retain an electrostatic image exhibiting a potential of +200 V with respect to the background potential of −100 V. The resultant electrostatic image was firstly developed by the developing means 5 under the same conditions as those of the Example 11 except that only an a.c. voltage component of 1.5 kHz and [1.000] *1,000* V was applied to the developing sleeve 31, and that the charging polarity of the toner was opposite to that of the electrostatic image. In this Example, moreover, a second image exposure and a second development were conducted like the Example 11 after a secondary charging operation by the secondary charger 3' was conducted again at the second rotation of the image retainer 1. Likewise, a secondary charging operation, an image exposure and a development were subsequently repeated thirdly and fourthly, and reproduction of the color image was then conducted like the Example 11.

Since, in this Example, the developments were effected by the coulomb attractive force, the density adjustment of the color image reproduced could be conducted more easily than the cases of the Examples 11 to 14, by which the toners for charging in the same polarity were applied to the electrostatic image, so that the color image obtained had the same color tone as that by the Example 11.

EXAMPLE 16

The reproduction of a color image was conducted under the same conditions as those of the Example 15 except that the image retainer 1 was prepared by placing a transparent insulating surface layer having a thickness of 10 μm on an α-Si photosensitive layer having a thickness of 10 μm, that a primary charging operation was effected to +700 V by means of the primary charger 2, that a secondary charging operation was effected to 0 V by the secondary charger 3' to retain electrostatic images, the first one of which had a potential of +300 V and the second and later of which had a similar potential with respect to the background potential of 0 V, in the image exposures by the laser beam scanner, that the voltage to be applied to the developing sleeve 31 for the development was a superposed one composed of a d.c. voltage of +100 V and an a.c. one of 500 Hz and 400 V, and that a charge elimination by the charge eliminating means 13, the primary charging operation by the primary charger 2, and the secondary charging operation by the secondary charger 3' were conducted prior to the second and later image exposures.

In this Example, the color tone of the color image reproduced wire similar to that of the Example 11, and the densities of the respective colors could be better adjusted.

EXAMPLE 17

The reproduction of the color image was conducted under absolutely the same conditions as those of the Example 15 except that the image exposure by the laser beam scanner was conducted, like the Example 13, firstly with a spot having a diameter of 20 μm, secondly with a spot having a diameter of 30 μm, thirdly with a spot having a diameter of 40 μm, and fourthly with a spot having a diameter of 50 μm, in the same spot position and in the same density of 16 spots/mm to retain an electrostatic image having a potential of +400 V with respect to the background potential of −100 V, and that the colors were superposed in the order of the black, cyan, red and yellow toners.

The color image thus reproduced had a color tone similar to that by the Example 13 but had a clearer tone.

In this Example, too, the density adjustments of the respective colors could naturally be easily effected.

EXAMPLE 18

The reproduction of the color image was conducted under absolutely the same conditions of those of the Example 16 except that the image exposure by the laser beam scanner used the same spot and spot density as those of the Example 17 to retain an electrostatic image having a potential of +300 V at each time with respect to the background potential of 0 V.

The color image thus reproduced was substantially the same as that by the Example 17.

In this Example, too, the density adjustments of the respective colors could naturally be easily effected.

According to the Examples of the present invention thus far described, it is possible to make the spot densities fine thereby to reproduce a fine color image and to prevent any color mixing thereby to reproduce a color image having a clear color tone. Since the retentions of the electrostatic images are conducted by the common apparatus, moreover, there can be attained excellent effects that the reproducing apparatus can be constructed in a small size and at a low cost, and that the synchronous control of the image exposure as to the image retainer is facilitated.

Incidentally, the present invention can be applied to the case, in which the image retainer has a belt or sheet shape, or to such an image retainer, e.g., electrofax paper as is placed on a base as can fix without any transfer the color image retained thereon by the toners. In this case, it is highly necessary to consider the superposing sequence of the color toners, but there arises an advantage that the pre-transfer lamp, the transfer means and the cleaning means can be dispensed with. Despite of this fact, the pre-transfer lamp and the charge eliminating means can be omitted in case the toners have predetermined polarities and quantities of charges so that they can be transferred. On the other hand, the transfer may be not only the corona type but also a bias roller type, an adhesion type and a pressure type through an intermediate transfer member. It is quite natural that the fixing operation should not be limited to a heat roller type.

The methods of the Examples 15 to 18 according to the present invention are highly advantageous in that the polarities of the potentials at the image portion and the non-image portion can be reversed by the balance between the strengths of the primary and secondary charging operations. However, the development can be effected even by using the same polarities and by changing the developing bias conditions. As to the potentials at this time, there holds as it is the relationship in which the zero potential of FIGS. 21 to 23 is shifted up and down. If the developing bias is accordingly changed, a like development can be made. Moreover, those methods can naturally be applied even to the NP- or KIP-method.

Figure 26:
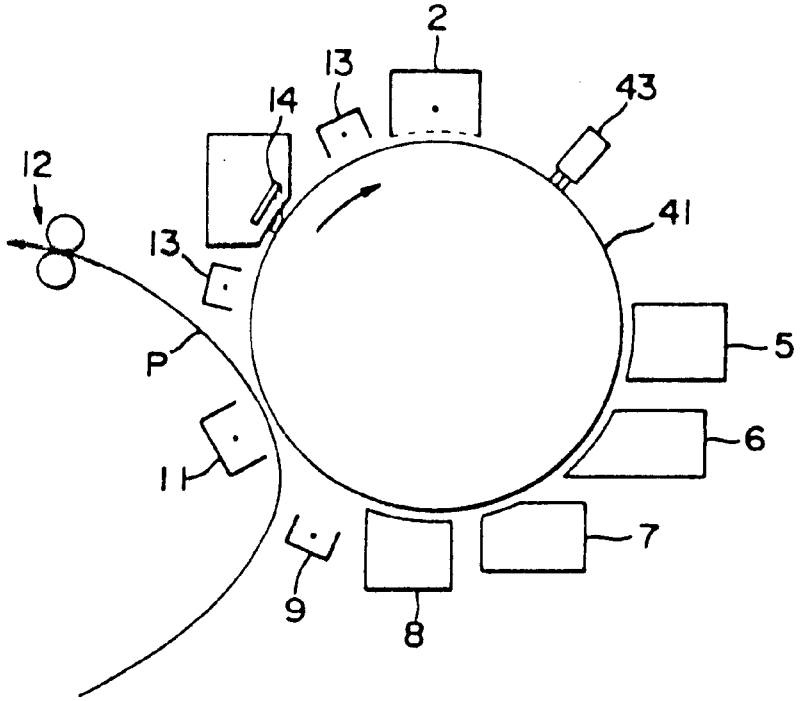
FIGS. 26 and 27 are schematic views showing an example of the recording apparatus to be used for practising another embodiment of the method of the present invention, respectively.
Figure 27:
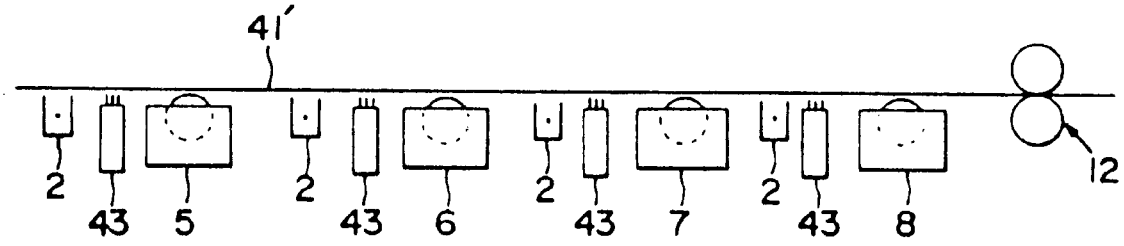
Figure 28:
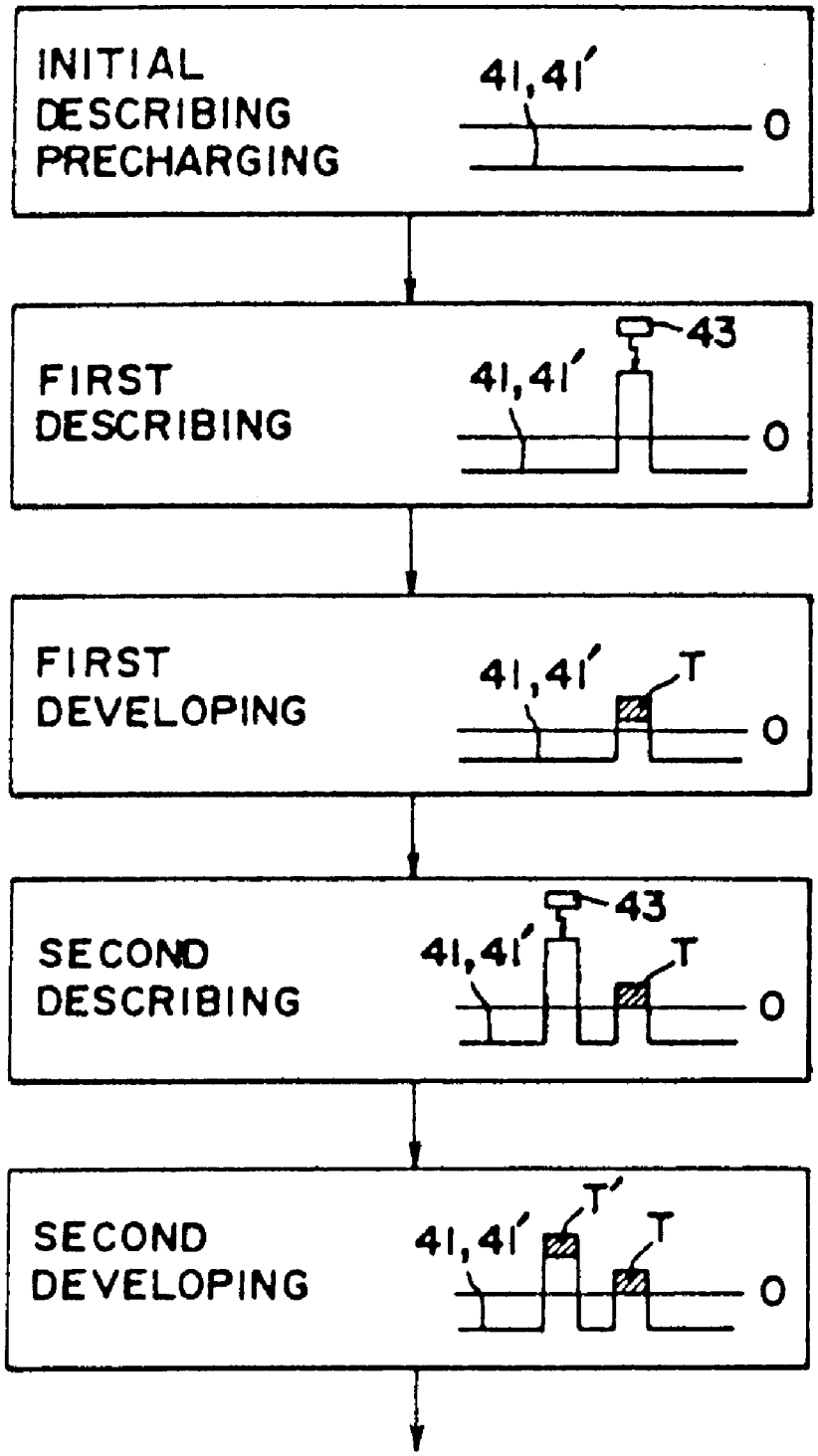
FIGS. 28 to 30 are flow charts for practising the method of the present invention, respectively.
Figure 29:
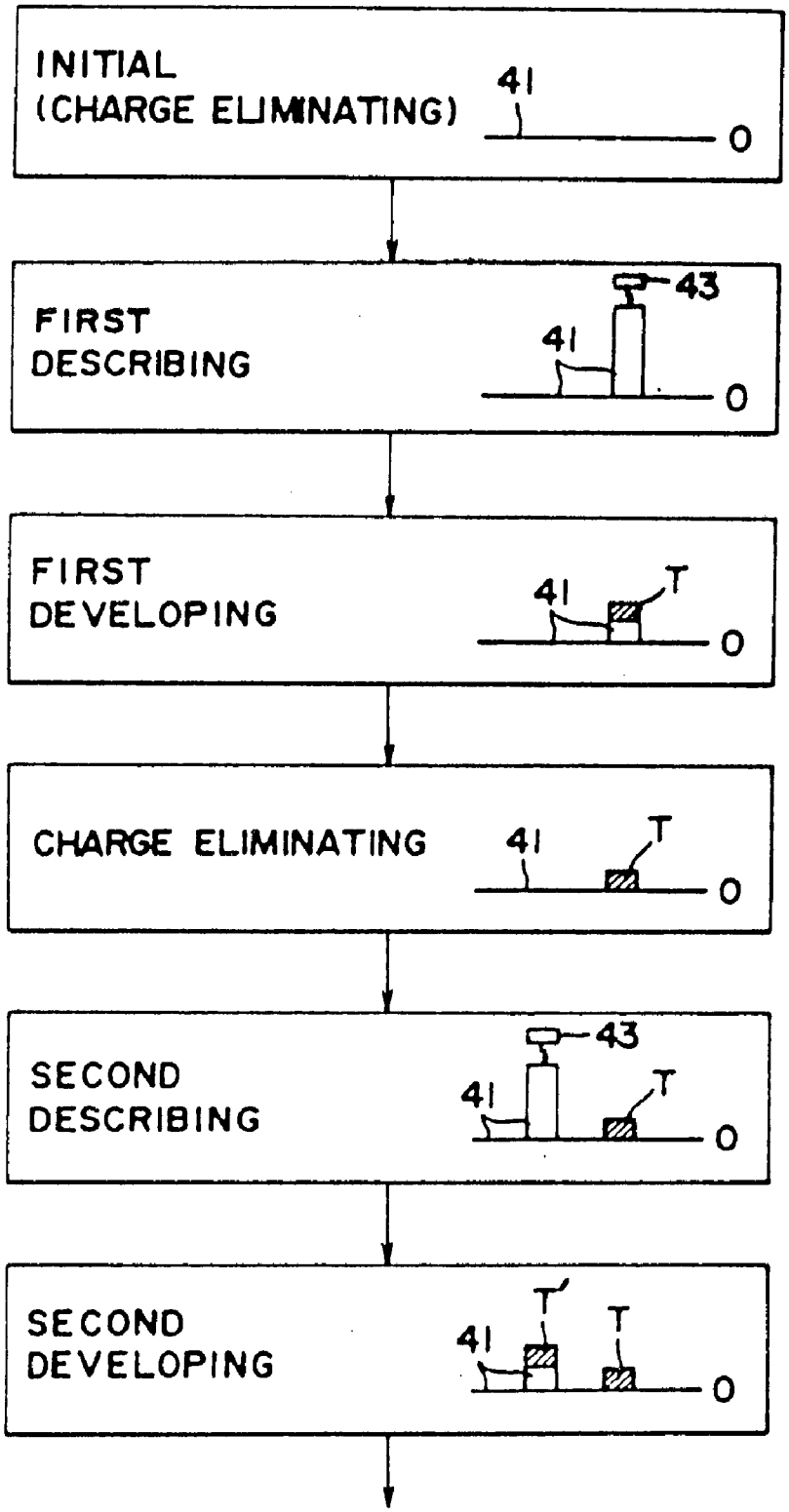
Figure 30:
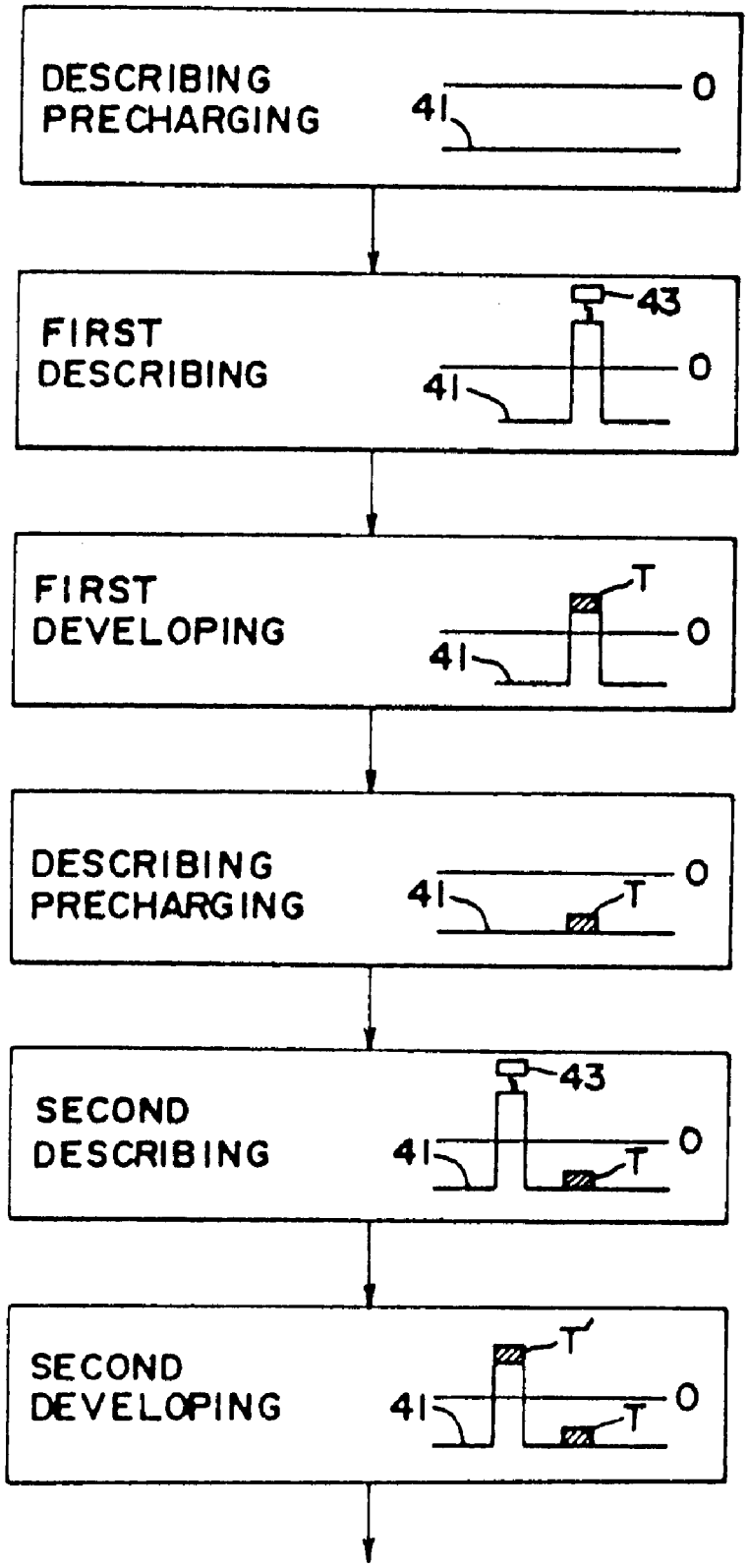

FIGS. 26 and 27 are schematic views showing the constructions of the embodiments of the reproducing apparatus which are used for the method of the present invention, respectively. FIGS. 28 to 30 are flow charts for the method of the present invention, respectively.

In FIG. 26, reference numeral 41 indicates a drum-shaped image retainer which is constructed by laying a dielectric layer such as a resin on a metal base and which is made rotatable in the direction of arrow, and numeral 43 indicates an electrostatic recording head which is equipped with needle discharge poles. The remaining portions are identical to those of the example of FIG. 1.

The pre-transfer charger 9 may be omitted in case the transfer can be sufficiently effected merely by the transfer means 11. The electrostatic recording head 43 is used to form an electrostatic image having a charged spot distribution on the dielectric layer of the image retainer 41 by means of the needle discharge poles which are arrayed in one or plural rows.

Of the toners: the black toner is similar to that of the two-component developer of the prior art; the cyan toner is prepared by adding copper phthalocyanine in place of carbon black having a black color; the Magenta is prepared by similarly adding polytungstophosphate; and the yellow toner is prepared by similarly adding a benzidine derivative. However, those toners should not be limited to those color toners made of such pigments, but it is naturally possible to use color toners made of dyes and to add an electrification controlling agent or the like, if necessary. On the other hand, the sequence of the colors to be developed by the developing means 5 to 8 using the developers of different color toners has to be carefully determined because it exerts influences upon the tone of the color image.

The method of the present invention can be practised by the reproducing apparatus of FIG. 26 described above but can also be carried out by the reproducing apparatus shown in FIG. 27.

The reproducing apparatus of FIG. 27 is one in which a series of recording members are formed with dielectric layers on their surfaces to provide an image retainer 41'. The retentions and developments of electrostatic images are repeated while the image retainer 31' is being linearly conveyed. Along the conveyor passage of the image retainer 41', the prewriting charger 2, the electrostatic recording head 43 and the developing means 5 to 8 are repeatedly arranged side by side, and the fixing means 12 for fixing the color image to the image retainer 41' is disposed at the last position. The reproducing apparatus under consideration does not require the pretransfer charger, the transfer means, the charge eliminating means and the cleaning means but can reproduce a series of color images. In order that the image retainer 41' may not depend, however, it is necessary to strengthen the tension or to provide such a supporting roller midway as to prevent the toners applied to the image retainer 41' from being offset, although not shown.

In the reproducing apparatus shown in FIG. 26, too, the pre-transfer charger 9, the transfer means 11, the charge eliminating means 13 and the cleaning means 14 can be dispensed with if the image retainer 41 is prepared by rolling an image retainer similar to the image retainer 41', which is used in the reproducing apparatus of FIG. 27, on a drum.

The method of the present invention, as is exemplified by the embodiments of FIGS. 28 to 30, can be practised by the reproducing apparatus thus far described. Incidentally, FIGS. 28 to 30 all show the steps after a second development has been finished.

The embodiment of FIG. 28 shows the method of the present invention, comprising the steps of: subjecting the surface of the image retainer 41 to a first writing operation by means of the electrostatic recording head 43, either from the initial state (which is shown to be a charged state), in which the surface of the image retainer 41 has its charges eliminated by one or both of the charge eliminating means 13 and 13, cleaned by the cleaning means 14 and charged to be positive or negative by the pre-writing charger 2, if necessary, according to the reproducing apparatus of FIG. 26 or from the initial state, in which the image retainer 41' is conveyed from the left and charged to be negative or positive by the first pre-writing charger 2, if necessary, according to the reproducing apparatus of FIG. 27, thereby to retain an electrostatic image at a potential having a polarity different from that of the background potential; firstly developing that electrostatic image by the developing means 5; conducting a second writing operation by the electrostatic recording head 43 after the uniform charging operation by the charger 2, if necessary, either when the image retainer 41 comes into its second rotation, according to the reproducing apparatus of FIG. 26, or when the image retainer 41' advances to the position of the next charger, according to the reproducing apparatus of FIG. 27; secondly developing the electrostatic image thus retained by the developing means 6; [subsequtnely] *subsequently* repeating third and fourth writing and developing operations in a similar manner so that a color image having superposed color images is retained on the image retainer 41 or 41'; and either fixing the resultant color image to the recording member P by means of the fixing means 12, after the color image has been made reluctant to be transferred by the pretransfer charger 9 so that it is transferred to the recording member P by the transfer means 11, according to the reproducing apparatus of FIG. 26, or directly fixing the same color image to the image retainer 41' by the fixing means 12 according to the reproducing apparatus of FIG. 27. According to the reproducing apparatus of FIG. 26, moreover, the surface of the image retainer 41 thus having the color image transferred thereto has its charges eliminated by the charge eliminating means 13, and cleared of the residual toners by the cleaning means 14, and further has its charge eliminated, if necessary, by the charge eliminating means 13, thus ending one cycle of the color image reproduction. According to the reproducing apparatus of FIG. 27, on the other hand, the portion of the image retainer 41', which has been formed with the color image, ends its steps of reproducing the color image when it completely passes the fixing means 12.

Moreover, the embodiment of FIG. 29 uses the reproducing apparatus of FIG. 26 and is similar to that of FIG. 28 except that the image retainer 41 having the toner images retained thereon has its charges eliminated by the charge eliminating means 13 before a subsequent image retaining stage is entered after each development.

The embodiment of FIG. 30 resorts to the reproducing apparatus of FIG. 26 and is different from that of FIG. 28 in that the pre-writing charger 2 is operated before each writing operation.

Incidentally, reference letters T and T' appearing in FIGS. 28 to 30 indicate toners of different colors, which are applied to the image retainer 41 or 41'.

In the method of the present invention, the developing means other than that conducting each development under the non-contact jumping developing conditions can be easily held in an inoperative state, even if the developer layer is not removed from the developing sleeve 31, by disconnection of the developing sleeve 31 from the power supply 39 into a floating state, by grounding the developing sleeve 31 to the earth, or positively applying such a d.c. bias voltage to the developing sleeve 31 as has a polarity identical to that of the electrostatic image, i.e., opposite to that of the charges of the toners. Of these, the application of the bias voltage having the opposite polarity to that of the toners may be preferably used to hold the developing means in the inoperative state.

Next, the embodiment of FIGS. 28 to 30, which are practised by the reproducing apparatus of FIG. 26, will be described in more detail as the following Examples 19 to 21, respectively.

EXAMPLE 19

The reproducing apparatus shown in FIG. 26 was used. The image retainer 41 was prepared by laying an insulating layer having a thickness of 20 $\mu$m on an aluminum base and had a circumferential speed of 180 mm/sec. The image retainer 41 thus prepared had its surface charged to −100 V by means of the pre-writing charger 2 using the scorotron corona discharger and then subjected to writing operation in a distribution density of 10 spots/mm by means of the electrostatic recording head 43 the needle electrodes of which had their tips spaced by about 30 $\mu$m from the surface of the image retainer 41. As a result, there was retained on the image retainer 41 an electrostatic image which had a written portion potential of +200 V with respect to the background portion potential of −100 V. The resultant electrostatic image was firstly developed by the developing means 6 shown in FIG. 3. This developing means 6 used the developer, which was composed of: a carrier having 50 wt. % of magnetite dispersed and contained in a resin and having an average particle diameter of 20 $\mu$m, a magnetization of 30 emu/g and a resistivity of $10^{14}\Omega$ or higher; and a nonmagnetic toner prepared by adding 10 wt. % of copper phthalocyanine and another electrification control agent as the cyan pigment to the styrene-acryl resin and which had an average particle diameter of 10 $\mu$m, under the condition of the ratio of 10 wt. % of the toner to the carrier. Moreover, the non-contact jumping developing conditions were resorted to under which the developing sleeve 31 had an external diameter of 30 mm and a number of revolutions of 100 r.p.m., under which the magnet 32 had a magnetic flux density of its N and S magnetic poles of 1,000 gausses and a number of revolutions of 1,000 r.p.m., under which the developer layer had a thickness of 0.7 mm at its developed portion, under which the gap between the developing sleeve 31 and the image retainer 1 was 0.8 mm, and under which a bias voltage having a d.c. voltage component of 0 V and an a.c. voltage component of 1.5 kHz and 1,000 V was applied to the developing sleeve.

The surface of the image retainer 41 having been firstly developed was subjected to such a second writing operation with a spot position shift from the first writing operation but in the same spot density again by the same electrostatic recording head 43 but without operating the pre-transfer charger 9, the charge eliminating means 13 and 13, the cleaning means 14 and the pre-writing charger 2 that the written portion took a potential of +300 V. Next, a second development was conducted by the developing means 6 under the same conditions as those of the developing means 5 except that the toner of the developer used one which was prepared by adding polytungstophosphate as the Magenta pigment in place of the cyan pigment, and that a bias voltage having a d.c. voltage component of 100 V and an a.c. voltage component of 1.5 kHz and 1,000 V was applied. Likewise, a third writing operation for elevating the potential of the written portion to +400 V and a third development were conducted by the developing means 7 under the same conditions as those of the developing means 5 except that the toner of the developer used one which was prepared by adding a benzidine derivative as the yellow pigment, and that the developing bias was composed of a d.c. component of 200 V and an a.c. component of 1.5 kHz and 1,000 V. Moreover, a fourth writing operation for raising the potential of the written portion to +500 V and a fourth development were conducted by the developing means 8 under the same conditions as those of the developing means 5 except that the toner of the developer used one which was prepared by adding carbon black as the black pigment, and that the developing bias had a d.c. component of 300 V and an a.c. component of 1.5 kHz and 600 V. The color image thus retained on the image retainer 41 was transferred to and fixed on the recording member P. Moreover, the surface of the image retainer 41 thus having the color image transferred thereto had its charges eliminated by the charge eliminating means 13 and cleared of the residual toners by the cleaning means 14.

The reproduced image thus obtained had little mixing of the color toners and was a remarkably clear color image.

Incidentally, in this Example, the spot position of the subsequent writing operation may be superposed of that of the previous writing operation, or, the discharge voltage of the electrostatic recording head 43, and the voltage value, frequency and selected time of the d.c. or a.c. component of the volatage to be applied to the developing sleeve may be so changed in the writing and/or developing operations as to adjust the developed densities of the respective colors. If the spot positions of the writing operations are superposed, the color mixing occurs to make the colors liable to be vague. However, the tone can be enhanced by increasing the spot density. In this case, moreover, especially the sequence of colors to be developed plays an important role. By adjusting the developed densities of the respective colors in the manner thus far described, moreover, it is possible to obtain a color image which has a changed tone.

EXAMPLE 20

The color image reproduction was conducted by the use of the same reproducing apparatus as that of the Example 19 and under the same conditions as those of the Example 19 except that the charging operation of the Example 19 by the pre-writing charger 2 prior to the first writing operation was not conducted to form an electrostatic image having a potential of +150 V with respect to the background potential of 0 V by a first writing operation, that a superposed voltage having a d.c. voltage of +50 V and an a.c. voltage of 3 kHz and 2,000 V was applied as the bias voltage upon the development to the developing sleeve 31, and that charge elimination was conducted before second and later writing operations by the charge eliminating means 13 to retain an electrostatic image having a potential of +150 V with respect to the background potential of 0 V even in the second and later writing operations. The reproduced image thus obtained was a color image having an excellent clearness like that of the Example 19.

EXAMPLE 21

The color image reproduction was conducted by the use of the same reproducing apparatus as that of the Example 19 under the same conditions of those of the Example 19 except that the charge of −300 V was conducted by the pre-writing charger 2 so that an electrostatic image having a potential of +50 V with respect to the background potential of −300 V was retained by a first writing operation, that a superposed voltage composed of a d.c. voltage of −200 V and an a.c. voltage of 2 kHz and 1 kV was applied as a bias for the development to the developing sleeve 31, and that the pre-writing charger 2 was used before second and later writing operations. The reproduced image obtained was a color image having an excellent clearness like that of the Example 19.

By using the image retaining means having its electrostatic retainability and toner image retainability separated, according to the foregoing Examples of the present invention, there can be attained excellent effects that the color tone and so on of the color image can be easily changed, and that the color image having the excellent clearness and a high tone can be reproduced so that the reproduction can be stably effected.

Incidentally, the present invention can be applied to the case, in which the image retainer has a belt or sheet shape, or to such an image retainer, e.g., electrofax paper as is placed on a base as can fix without any transfer the color image retained thereon by the toners. In this case, it is highly necessary to consider the superposed order of the color toners, but there arises an advantage that the pre-transfer lamp, the transfer means and the cleaning means can be dispensed with. Despite of this fact, the pre-transfer lamp and the charge eliminating means can be omitted in case the toners have predetermined polarities and quantities of charges so that they can be transferred. On the other hand, the transfer may be not only the corona type but also a bias roller type, an adhesion type and a pressure type through an intermediate transfer member. It is quite natural that the fixing operation should not be limited to a heat roller type.

Although the Examples of the present invention thus far described used the electrostatic recording head as the writing means, moreover, other means can be similarly used if it can retain the electrostatic charge image on the dielectric layer. More specifically, there can be likewise applied either a method in which the passage rate of a corona ion flow is controlled by control electrodes so that an electrostatic image may be retained on the dielectric layer, or a method in which a screen photosensitive member is used so that the electrostatic charge pattern retained thereon may be used for controlling the passage rate of the corona ion flow to retain the electrostatic image on the dielectric layer.

Figure 31:
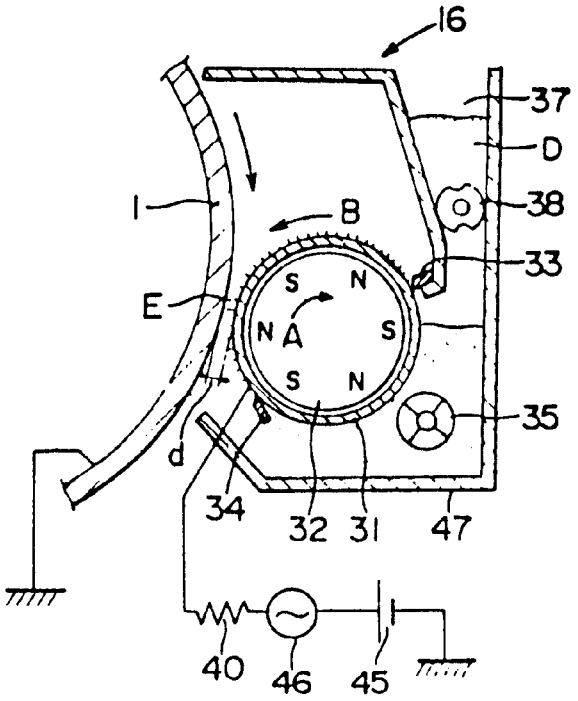
In FIGS. 31 to 38 showing a further embodiment of the present invention.
Figure 32:
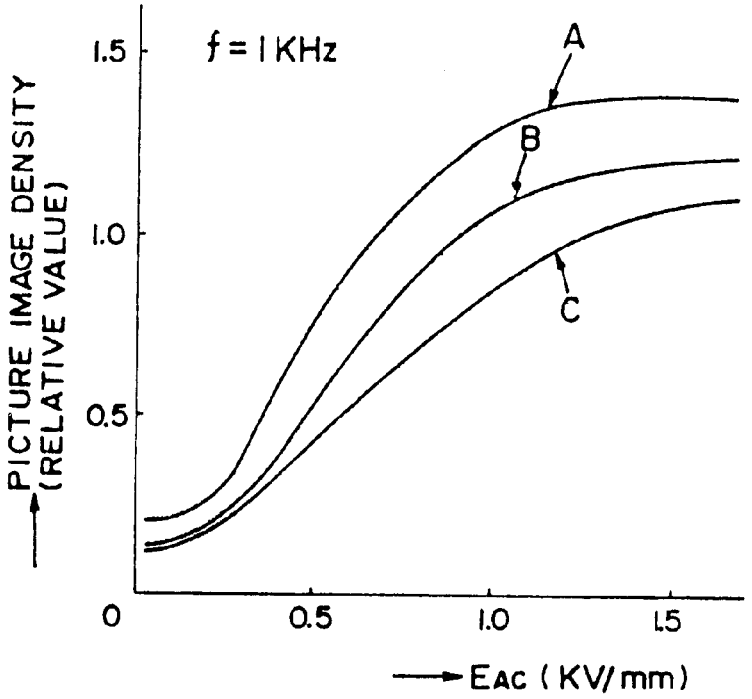
Figure 33:
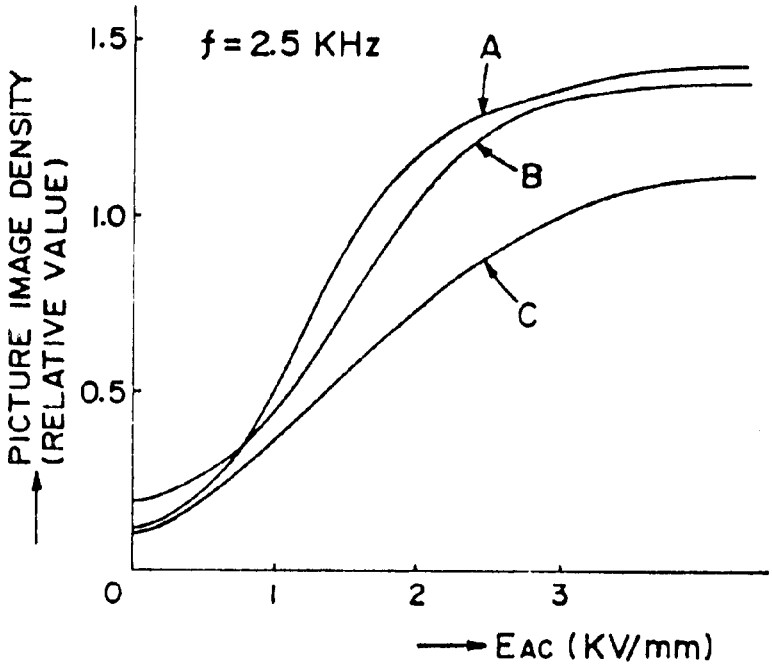

Other Examples of the present invention will be described in the following. In the method of consecutively superposing toner images by repeating the step of retaining a latent image on an image carrier and the step of developing the retained latent image, as has been described as the prior art, a development in a suitable density has to be conducted without disturbing the toner image which was retained in the image carrier at the previous step. Here, the term "superposition" means not only that the toner images are formed plural times in an identical position of the developing regions of the image carrier but also that the toner images are retained in plural times in another portion of the image region. The result of our investigations has revealed that an excellent image cannot be obtained even if the values such as the gap d (mm) (which may be simply called the "gap" in the following) between the image carrier and a developer carrier and the voltage $V_{AC}$ and frequency f of the a.c. component of the developing bias are satisfied so as to satisfy the above-specified conditions, and that those parameters have close relationships to each other. Therefore, experiments have been conducted by the developing means 16, as shown in FIG. 31, with the parameters such as the voltage and frequency of the a.c. component of the developing bias being changed, so that the results, as shown in FIGS. 32 and 33, have been obtained. Incidentally, the toner image is previously formed on the photosensitive drum 1 acting as the image carrier drum. The developing means 16 carries a developer D in the direction of arrow B on the circumference of the sleeve 31 to supply the developer D to a developing region E as a result that the sleeve 31 acting as the developer carrier and the magnetic roll 32 are rotated. Incidentally, the developer D is a two-component developer composed of a magnetic carrier and a non-magnetic toner. Said carrier is composed of ball-shaped particles which have an average particle diameter of 30 $\mu$m (which is a weight-averaged value measured by means of the Omnicon Alpha (manufactured by Bausch & Lomb Inc.) or the [Caulter] *Coulter* Counter (manufactured by [Caulter] *Coulter* Inc.), a magnetization of 50 emu/g and a resistivity of $10^{14}\Omega$ or more and which are coated with a resin. Incidentally, the resistivity is a value which is obtained by reading out a current value when a load of 1 kg/cm$^2$ is applied to the tapped particles so that the carrier particles have a thickness of 1 mm after the particles have been tapped in a container having an effective sectional area of 0.50 cm$^2$ and when a voltage for establishing an electric field of 1,000 V/cm is applied between the load and the bottom electrodes. Said toner is prepared by adding a small quantity of an electrification controlling agent to 90 wt. % of a thermoplastic resin and 10 wt. % of a pigment (e.g., Carbon Black) and by blending and pulverizing the mixture so that the particles may have an average particle diameter of 10 $\mu$m. The developer D is carried in the direction of arrow B by rotating the magnetic roll 32 in the direction of arrow A and the sleeve 31 in the direction of the arrow B. The developer D has its thickness regulated in its carrying course by means of the head regulating blade 33. A developer reservoir 47 is equipped therein with an agitating screw 35 so that the developer D may be sufficiently agitated. When the developer D in the developer reservoir 47 is consumed, its supply is made from the toner hopper 37 by rotating the toner supply roller 38.

Between the sleeve 31 and the photosensitive drum 1, moreover, there is connected a d.c. power supply 45 for applying the developing bias. In order that the developer D may be vibrated in the developing region E to be sufficiently supplied to the photosensitive drum 1, an a.c. power supply 46 is connected in series with the d.c. power supply 45. Reference numeral 40 is the protecting resistor.

FIG. 32 shows the relationship between the amplitude of the a.c. component, when the gap d between the photosensitive drum 1 and the sleeve 31 is set at 1.0 mm; the thickness of the developer at 0.5 mm; when the charged potential of the photosensitive drum at 600 V; and the developing bias has its d.c. component at 500 V and its a.c. component at a frequency of 1 kHz, and the image density of a toner image which is formed by the reverse phenomenon on the exposed portion (at a potential of 0 V) of the photosensitive drum 1. The amplitude $E_{AC}$ of the intensity of the a.c. electric field takes a value which is made by dividing the a.c. voltage of the developing bias by the gap d. Curves A, B and C appearing in FIG. 32 are the results obtained in case the toners used are controlled to have average charges of 30 $\mu$c/g, 20 $\mu$c/g and 15 $\mu$c/g, respectively. It is observed from the three curves A, B and C that the effect of the a.c. component appears for the amplitude of the a.c. component of the electric field of 200 V/mm or larger, and that the toner image retained in advance on the photosensitive drum is partially broken for the amplitudes of 2,500 V/mm or larger.

FIG. 33 shows the changes in the image density when the frequency of the a.c. component of the developing bias is set at 2.5 kHz and when the a.c. field intensity $E_{AC}$ is changed under the same conditions of those of the experiments of FIG. 32.

According to these experiments, the image density is high when the amplitude $E_{AC}$ of the a.c. field intensity exceeds 500 V/mm, and the toner image retained in advance on the photosensitive drum 1 is partially broken when that amplitude exceeds 4 KV/mm, although not shown.

Incidentally, as being seen from the results of FIGS. 32 and 33, the image density highly changes across a certain amplitude, which has a value obtainable hardly in dependence upon the average charges of the toners, as seen from the curves A, B and C. The reason therefor can be thought, as follows. In the two-component developer, specifically, it is predicted that the toners are charged by the friction with the carrier or by the mutual frictions with one another, and that the charges of the toners distribute over a wide range, and it is thought that toners having a large quantity of charges are preferably developed. Even if the average charges are controlled by the electrification controlling agent, the ratio occupied by those toners having the large quantity of charges does not change so much. As a result, it is thought that the changes in the developing characteristics are found more or less but not highly observed.

Figure 34:
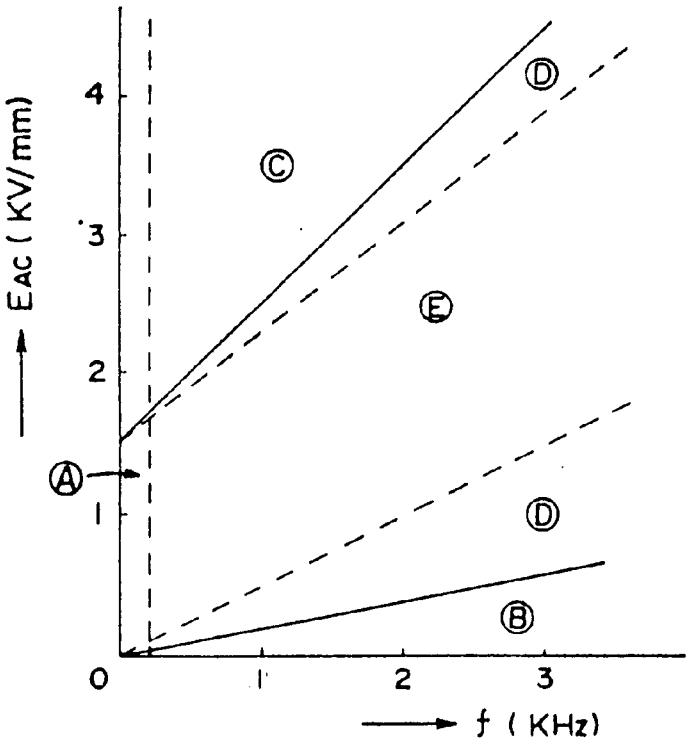

Now, experiments similar to those of FIGS. 32 and 33 were conducted under changing conditions to pigeon-hole the relationship between the amplitude $E_{AC}$ and frequency f of the a.c. field intentisy so that the results shown in FIG. 34 could be obtained.

In FIG. 34: indicated at A is a region where a developing unevenness is liable to occur; indicated at B is a region where the effect of the a.c. component does not appear; indicated at C is a region where the toners are liable to return, i.e., where the color mixing is liable to occur; and indicated at D and E are regions where the effect of the a.c. component appears so that no color mixing occurs.

These results indicate that a proper region for the amplitude and frequency of the intensity of the a.c. electric field exists so that a next (or subsequent) toner image may be developed in a proper density without breaking the toner image which was retained at the previous step on the photosensitive drum 1. This is thought to be explained by the following reasons.

In the region where the image density has a tendency to increase for the amplitude $E_{AC}$ of the a.c. field intensity, e.g., for the density curve of FIG. 32, i.e., where the amplitude of $E_{AC}$ of the a.c. field intensity ranges from 0.2 to 1.2 KV/mm, the a.c. component of the developing bias acts to make it liable to jump a threshold value at which the toners fly from the sleeve. As a result, even the toner having a small quantity of charges is trapped by the photosensitive drum 1 so that it can be used for [rhe] *the* development. As a result, the image density is increased to the higher level as the amplitude of the a.c. field intensity becomes the larger.

For the region where the image density is saturated for the amplitude $E_{AC}$, i.e., where the amplitude $E_{AC}$ exceeds 1.2 KV/mm in the curve A of FIG. 32, this phenomena can be explained as follows. In this region, more specifically, the toners are the more intensely vibrated as the amplitude of the a.c. field intensity becomes the larger, and the cluster formed as a result of the aggregation of the toners becomes liable to be broken so that only the toners having high charges are selectively applied to the photosensitive drum 1 whereas the toner particles having low charges become reluctant to be developed. Moreover, the toners having low charges are liable to be returned to the sleeve 31 by the a.c. bias because they have a weak image forming force even if they are once trapped by the photosensitive drum 1. Since the charges on the surface of the photosensitive drum 1 leak because the amplitude of the field intensity of the a.c. component, still moreover, the phenomenon that the toners become reluctant to be developed become liable to occur. As a matter of fact that, it is thought that those causes are overlapped to make the image density constant for the increase in the a.c. component.

If the a.c. field intensity is raised to have an amplitude exceeding 2.5 KV/mm under the condition of obtaining the curve A of FIG. 32, for example, it is found that the toner image retained in advance on the photosensitive drum 1 is broken, and that the degree of this breakage is the higher for the higher a.c. component. This is thought to be caused by the fact that such a force is applied on the toners trapped by the photosensitive drum 1 as to return to the sleeve 31 by the a.c. component.

In case the development is conducted by consecutively superposing toner images on the photosensitive drum 1, it is a fatal problem that the toner image or images having already been retained are broken at a subsequent developing step.

As is seen by comparing the results of FIGS. 32 and 33, on the other hand, the experiments conducted by changing the frequency of the a.c. component have revealed that the image density becomes the lower for the higher frequency. This is caused by the fact that the toner particles have their vibrating range narrowed, because they cannot follow the changes in the electric field, so that they become reluctant to be trapped by the photosensitive drum 1.

On the basis of the experimental results thus far described, the Inventors have attained a conclusion that a later development can be conducted in a proper density without disturbing the toner image already having been retained on the photosensitive drum 1, if each development is conducted under the conditions satisfying the following relationship when the amplitude of the a.c. component of the developing bias is designated at $V_{AC}$ (V); the frequency of the same at f (Hz); and the gap between the photosensitive sleeve 1 and the sleeve at d (mm).

$$0.2 \leqq V_{AC}/(d \cdot f); \text{ and}$$

$$\{(V_{AC}/d)-1500\}/f \leqq 1.0.$$

In order to ensure a sufficient image density and not to disturb the toner image having been retained by the previous step, it is preferable that the relationships of the above-specified conditions be satisfied:

$$0.5 \leqq V_{AC}/(d \cdot f); \text{ and}$$

$$\{(V_{AC}/d)-1500\}/f \leqq 1.0.$$

If especially the following relationships of the above are satisfied, it is possible to obtain a multi-color image having a better clearness but no color vagueness and to prevent the toner of another color from being mixed into the developing apparatus even with a number of operations:

$$0.5 \leqq V_{AC}/(d \cdot f); \text{ and}$$

$$\{(V_{AC}/d)-1500\}/f \leqq 0.8.$$

Moreover, it is further preferable to set the frequency of the a.c. component at 200 Hz or higher so as to prevent the developing unevenness due to the a.c. component and to set the frequency of the a.c. component at 500 Hz or higher so as to eliminate the influences from the beats, which are caused by the a.c. component and by the rotations of the magnetic roll in case the rotating magnetic roll is used as the means for supplying the developer to the photosensitive drum 1.

According to the construction of the present invention thus far described, in order to consecutively develop the subsequent toner images in predetermined densities on the photosensitive drum without breaking the toner images retained on the photosensitive drum 1, it is further preferable to use either solely or in suitable combination the following methods in accordance with the repetitions of the developments:

(1) toners having consecutively higher charges are used;

(2) the amplitude of the field intensities of the a.c., component of the developing bias are made consecutively smaller; and (3) the frequencies of the a.c. component of the developing bias are made consecutively higher.

In other words, the toner particles having the higher charges are the more susceptible to the influences of the electric field. As a result, the toner particles having high charges may return to the sleeve at the step of the subsequent development if they are trapped by the photosensitive drum 1 at an early development. Therefore, the method (1) is intended to prevent the toners having low charges from returning to the sleeve at a later development by using those toner particles at the early development. The method (2) is intended to prevent the toner particles, which have already been trapped by the photosensitive drum 1, from returning by making the field intensities consecutively the smaller in accordance with the repetitions of the development (i.e., at the later steps of developments). As the specific method of consecutively weakening the electric field intensity, there is either a method of consecutively dropping the voltage of the a.c. component or a method of making the larger the gap d between the photosensitive drum 1 and the sleeve 31 at the later steps of developments. On the other hand, the method (3) is intended to prevent the toner particles, which have already been trapped by the photosensitive drum 1 from returning by raising the frequency of the a.c. component consecutively to a higher level as the developments are repeated. Some effect can be obtained if those methods (1), (2) and (3) are solely used, but a better effect can be attained, if they are used in combination, for example by consecutively increasing the toner charges in accordance with the repetitions of the developments with the a.c. bias being consecutively dropped. In case those three methods are adopted, moreover, proper image density and color balance can be held by adjusting the d.c. biases, respectively.

Other specific Examples practised by the use of the construction thus far described will be explained in the following with reference to FIGS. 35 and 37.

EXAMPLE 22

Figure 35:
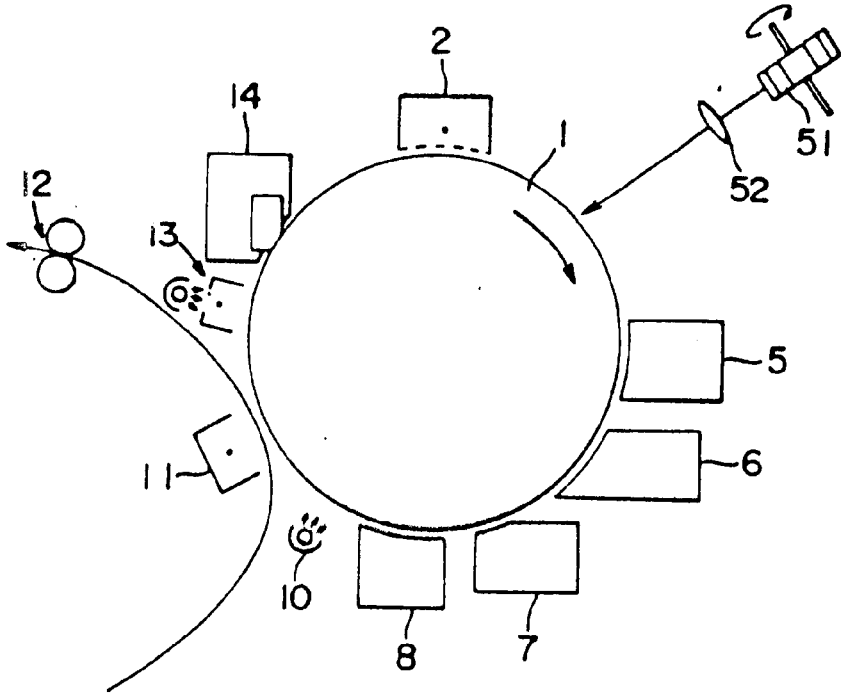

FIG. 35 is a schematic view showing an essential portion of a color image reproducing apparatus. The photosensitive drum 1 having been uniformly charged by means of the scorotron charger was exposed to the ray, which had been guided from the He-Ne laser light source (although not shown) through a rotary polygonal mirror 51 and a focusing lens 52, to retain an electrostatic latent image. This electrostatic latent image was developed by the first developing means 5 so that a first toner image was retained on the photosensitive drum 1. And, this first toner image was charged again by the scorotron charger 2 and exposed without being transferred to the recording paper so that a second toner image was then retained by the second developing means 6. This is repeated until a fourth toner image is retained. In other words, the steps of the charging operation (the second and later ones of which are not always required) →the exposure→the development were repeated four times in the form containing no transfer step. After the toner images had been wholly retained on the photosensitive drum 1, the pre-transfer exposing lamp 10 irradiated the region, in which the toner image had been retained on the photosensitive drum 1, to transfer the toner image to the recording paper (the path of which is indicated by a broken line), which was fed from the paper feeder (although not shown) by the transfer means 11. The recording paper was heated and fixed by the fixing means 12, which was composed of at lest one heated roller, until it was discharged to the outside of the machine.

On the other hand, the photosensitive drum 1 having ended its transferring operation had its charges eliminated by the charge eliminating means 13, which had not been used during the toner image retention, and was then cleared of the spare toners, which had been left on the surface thereof, by the cleaning means 14 which had been left inoperative during the toner image retention.

The color image reproducing apparatus thus far described were caused to repeat the above operations each time its operation button was depressed. Incidentally, in the present Example, the photosensitive material used was selenium, and the photosensitive drum 1 had a diameter of 120 mm, a circumferential speed of 120 mm/sec and a charged potential of 600 V. To the developing means 5 and 6 used, there was applied at each developing time a developing bias which was composed of a d.c. component of 500 V and an a.c. component having an amplitude of 1 KV and a frequency of 1 kHz. The gap d between the photosensitive drum 1 and the sleeve of each of the developing means was set at 0.8 mm. Moreover, the developer used was a two-component developer which is composed of a magnetic carrier and a non-magnetic toner. As this carrier, there was used a ball-shaped one which had an average particle size of 30 $\mu$m, a magnetization of 50 emu/g and a resistivity of $10^{14}\Omega$ or more and which was coated with a resin. The toner was prepared by adding a small quantity of an electrification controlling agent to 90 wt. % of a thermoplastic resin and 10 wt. 5 of a pigment. In the developing means 5, 6, 7 and 8, respectively, there were used the yellow, Magenta, cyan and black pigments, all of which had an average quantity of charges of 20 $\mu$c/g and an average particle diameter of 10 $\mu$m. The developer used was a mixture which was composed of 80 wt. % and 20 wt. % of the above-specified carrier and toner, respectively. Moreover, at each developing time the sleeve 31 and the magnetic roll 32 were rotated in each of the developing means in directions opposite to each other and had their heads regulated by the magnetic blade so that the developer layer had a thickness of 0.4 mm.

With the construction thus far described, as has been described above, the toner images were consecutively superposed to form a multi-color image. As a result, a visible image having a sufficient density was obtained with neither breaking the toner images, which had already been retained on the photosensitive drum 1 at the subsequent development, nor any toner of another color being mixed into each of the developing means.

The resultant superposed toner images were transferred to and fixed to the recording paper so that a clearly reproduced image could also be attained. Even after the toner images had been reproduced on a number of sheets of the transfer paper, moreover, none of other colors were not mixed into each of the developing means. Incidentally, a small quantity of magnetic material was contained in the toner of each developing means so that the fog of the image could be further prevented by the magnetic force.

EXAMPLE 23

This example was practised by the color image reproducing apparatus shown in FIG. 35, too. The difference from the Example 22 was that both the gap d between the photosensitive drum 1 and the sleeve and the d.c. component of the developing bias to be applied at the developing time were different among the developing means. The gaps and the d.c. components were set at 0.5 mm and 450 V, at 0.7 mm and 500 V, at 0.8 mm and 500 V, and at 1.0 mm and 550 V in the developing means 5, 6, 7 and 8, respectively. The average quantities of the charges of the toners and the amplitude and frequency of the a.c. biases were common among the developing means like the Example 22 and were set at 20 $\mu$c/g, 1 KV and 1 kHz, respectively.

In the present Example, the return of the toners on the photosensitive drum 1 was prevented by constructing the photosensitive drum 1 and the sleeves of the respective developing means such that the gaps d inbetween were widened the more of the developing sequence, and the balance of the densities of the respective color toner images was held by raising the d.c. biases in the developing order.

According to this Example, a clearer image was obtained, and another color was not mixed into each of the developing means even after the reproduction of the multiple sheets.

EXAMPLE 24

This Example was practised by the color image reproducing apparatus shown in FIG. 35, too. The difference from the Example 22 was that the a.c. component and d.c. component of the developing bias to be applied at the developing time were different among the developing means. The amplitudes of the a.c. components and the d.c. components were set at 1.5 KV and 450 V, at 1.2 KV and 500 V, at 1.0 KV and 520 V, and at 0.8 KV and 550 V in the developing means 5, 6, 7 and 8, respectively. The average quantities of the toners, the frequencies of the a.c. biases, and the gaps between the photosensitive drum 1 and the sleeve were common among the developing means like the Example 22 and were set at 20 $\mu$c/g, 1 kHz and 0.8 mm, respectively.

In the present Example, the return of the toners on the photosensitive drum 1 was prevented by setting the a.c. components at lower levels in the developing order, and the balance of the densities of the respective color toner images was held by consecutively raising the d.c. biases.

According to the present Example, a clear multicolored image could be obtained without any mixing of another color into each developing means even after the reproducing operations of the multiple sheets.

EXAMPLE 25

This Example was also practised by the color image reproducing apparatus shown in FIG. 35.

The developing conditions were such that the amplitudes of the a.c. components of the developing bias applied at the developing time were all 1 KV for the respective developing means, and such that the frequencies and the d.c. components of the same were set at 800 Hz and 450 V, at 1 kHz and 500 V, at 1.5 kHz and 550 V, and at 2 kHz and 600 V in the developing means 5, 6, 7 and 8, respectively.

In each developing means, moreover, at the developing time only the sleeve was rotated to supply the developer whereas the internal magnets were fixed. The head height regulations were conducted by the magnetic blade to provide a gap of 0.5 mm so that the developer had a thickness of 0.2 mm.

The average quantities of the charges of the toners and the gaps between the photosensitive drum 1 and the sleeve were common among the respective developing means and were set at 20 $\mu$c/g and 0.8 mm, and the remaining developing conditions and developers were the same as those of the Example 22.

In the present Example, the return of the toners on the photosensitive drum 1 was prevented by increasing the frequencies of the a.c. components in the developing sequence, and the balance of the densities of the respective color toner images was held by consecutively raising the d.c. biases.

A clear multi-colored image could also be obtained by the present Example, and another color was not mixed into each developing means even after the reproductions of multiple sheets.

Figure 36:
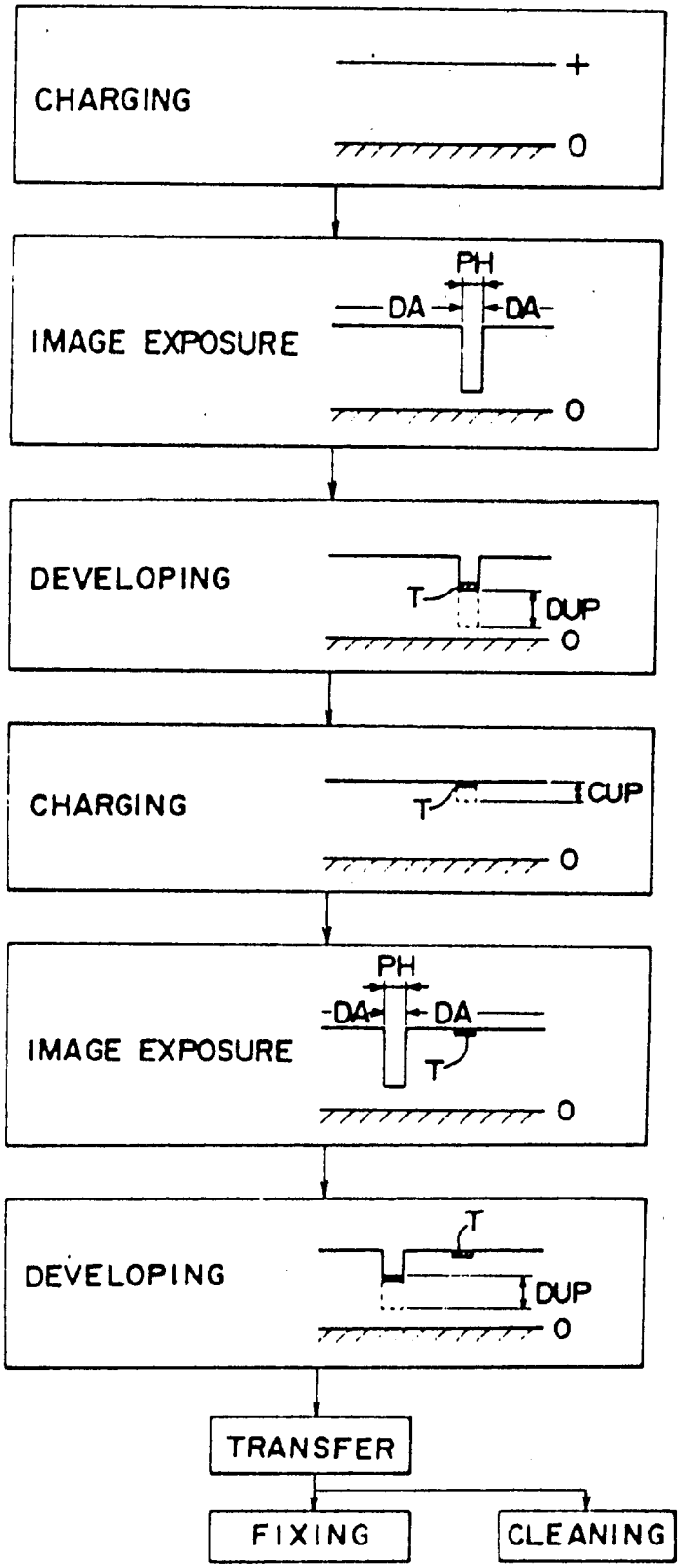

FIG. 36 is a flow chart showing the changes in the potential on the photosensitive drum 1 when the developments are conducted by the color image reproducing apparatus of FIG. 35. Reference letters PH and DA indicate the exposed portion and the unexposed portion, respectively.

The photosensitive drum 1 holds a predetermined potential when it is charged by the scorotron charger 2, and the portion having been optically irradiated has its potential dropped when the image exposure is conducted. Next, by applying a bias, which has its d.c. component substantially equal to the potential of that of the unexposed portion, to the developing means, the toner charged positively in the developing means is trapped by the exposed portion having a lower potential so that a development is conducted to retain a first visible image. The potential at that particular portion rises a little (as indicated at DUP in the drawing) as a result it traps the positive toners. Next, the potential on the photosensitive drum 1 is so uniformly charged again by the charger 2 that it is raised to a predetermined potential (as indicated at CUP in the same drawing). Next, if a second image exposure is conducted and if a development is similarly conducted, the toners are applied to the exposed portion to retain a second visible image. By repeating these steps four times, four color visible images are retained in a superposed manner on the photosensitive drum 1.

In the methods thus far described, the second and later charging operations can be omitted. In case these charging operations are not omitted, on the other hand, a charge eliminating step may be inserted before each of the charging operations.

All of the three Examples described hereinbefore conduct the reversal developing methods but can be practised by the normal developing method, i.e., the method in which the toners are applied to the unexposed portion to retain toner images. In case the superposed developments are conducted by the normal method, however, it is necessary to introduce the charging step at each time.

EXAMPLE 26

Next, the description to be made in the following is directed to the case in which the developments were conducted by means of the color image reproducing apparatus shown in FIG. 37.

The photosensitive drum 1 was made of a CdS photosensitive member which had its surface covered with an insulating layer and had a diameter of 120 mm, a circumferential speed of 120 mm/sec, an insulating layer thickness of 20 $\mu$m and a photosensitive layer thickness of 30 $\mu$m.

First of all, the photosensitive drum 1 had its surface charged to +1,000 V by means of the primary charger 2 while being exposed all over its surface by the action of a lamp L mounted in that charger 2. This exposure was conducted so as to facilitate injection of charges into the photosensitive layer of the photosensitive drum 1. Next, the surface of the photosensitive drum 1 was charged to −100 V to reduce the positive charges on the surface of its insulating lay by means of the secondary charger 3' having an a.c. component. The photosensitive drum 1 thus charged to −100 V was subjected to an image exposure with a ray which was reflected from the rotary polygonal mirror 51. The portion thus exposed took a plus potential and was developed by the first developing means 5 so that a first visible image was retained. Next, the photosensitive drum 1 was uniformly charged again to −100 V by the secondary charger 3' and was then subjected to an image exposure so that a second visible image was retained by the second developing means 6. These operations were repeated four times to retain all the visible images on the photosensitive drum 1. After that, the pre-transfer exposing lamp 10 irradiated the region, in which the visible images of the photosensitive drum had been retained, and these visible images were transferred by the transfer means 11 to the recording paper (the path of which is shown by the broken line), which was fed from the paper feeder (although not shown). The recording paper was heated and fixed by the fixing means 12, which was composed at least one heated roller, until it was discharged to the outside of the machine.

On the other hand, the photosensitive drum 1 having its transferring operation completed had its charges eliminated by the charge eliminating means 10 which had not been used during the toner image retention. After that, the photosensitive drum 1 was cleared of the spare toners, which were left on its surface, by the action of the cleaning means 14 which had been left inoperative during the toner image retention.

The color image reproducing apparatus thus far described repeated the foregoing operations each time its operating button was depressed. The developing conditions of each developing step were such that the developing bias to be applied at the developing time had its a.c. component set at 1.5 KV and having a frequency of 2 kHz and its d.c. component set at 0 V, and such the gap d between the photosensitive drum 1 and the sleeve of each developing means was 0.5 mm. In each developing means, at the developing time the sleeve and the magnetic roll were rotated in the same common direction to carry the developer, and this developer had its layer thickness regulated to 0.3 mm by the action of the magnetic blade.

Each of the developers had the same composition as that of the Example 22 except that its charge was controlled to −20 $\mu$c/g.

With the construction thus far described, the multi-color images were retained to form a visible image having a sufficient density with neither breakage of the tone images, which had already been retained on the photosensitive drum 1, nor any mixing of the toner of another color into each developing means.

EXAMPLE 27

Figure 37:
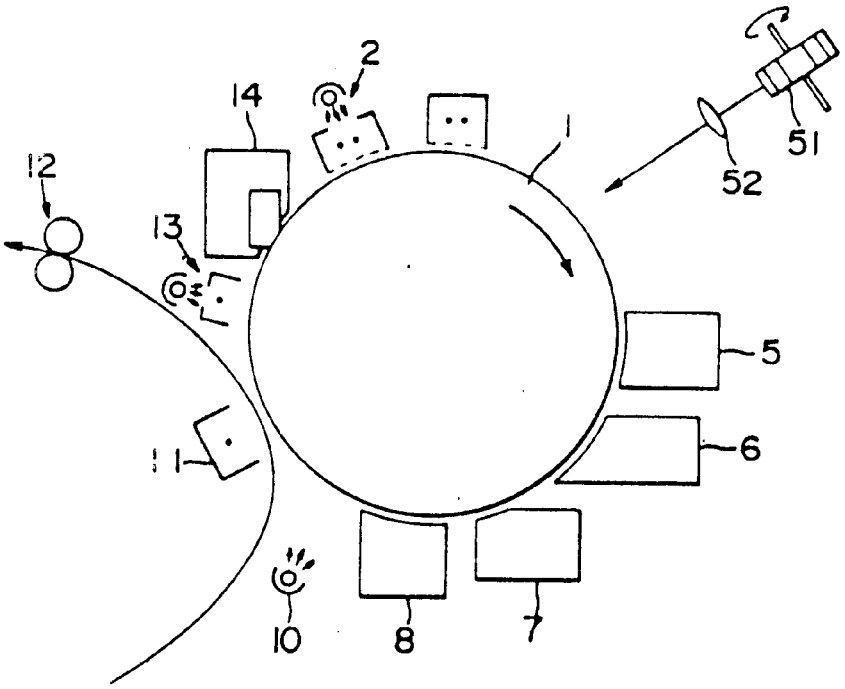

This example was likewise practised by the color image reproducing apparatus shown in FIG. 37. The difference from the Example 26 is located in that the average quantities of the developers used and the d.c. component of the developing bias applied at the developing time were different among the developing means and were set at −10 $\mu$c/g and 0 V, at −15 $\mu$c/g and 0 V, at −20 $\mu$c/g and 20 V, and at −40 $\mu$c/g and 50 V in the developing means 5, 6, 7 and 8 respectively. On the contrary, the amplitudes and frequencies of the a.c. bias and the gaps between the photosensitive drum 1 and the sleeve were common among the respective developing means like the Example 26 and were set at 1.5 KV, 2 kHz and 0.5 mm, respectively.

In the present Example, the return of the toners on the photosensitive drum 1 was prevented by controlling the electrifications such that the average quantities of the charges of the developers had their absolute values increased in the developing sequence, and the balance of the densities among the respective color toner images was held by consecutively increasing the values of the d.c. biases.

According to the present Example, too, a clear multi-color image was obtained, and another color was not mixed into each developing means.

EXAMPLE 28

This Example was likewise practised by the color image reproducing apparatus shown in FIG. 37. The difference from the Example 26 was found in that the average quantities of the developers used and the amplitudes of the a.c. components of the developing biases applied at the developing time were different among the developing means and were set at −10 $\mu$c/g and 1.6 KV, at −15 $\mu$c/g and 1.4 KV, at −20 $\mu$c/g and 1.2 KV, and at −40 $\mu$c/g and 1.0 KV in the developing means 5, 6, 7 and 8, respectively. The frequencies of the a.c. biases, the potentials of the d.c. biases, and the gaps d between the photosensitive drum 1 and the sleeve were shared among the respective developing means and were set at 2 kHz, 0 V and 0.5 mm, respectively.

In the present Example, the return of the toners on the photosensitive drum 1 was prevented, and at the same time the balance among the densities of the respective color toner images was held partly by controlling the electrifications such that the average quantities of the charges of the developers had their absolute values increased and partly by consecutively setting the a.c. biases.

According to the present Example, a clearer multi-color image was obtained, and no color was mixed into each developing means even after reproductions of multiple sheets.

Figure 38:
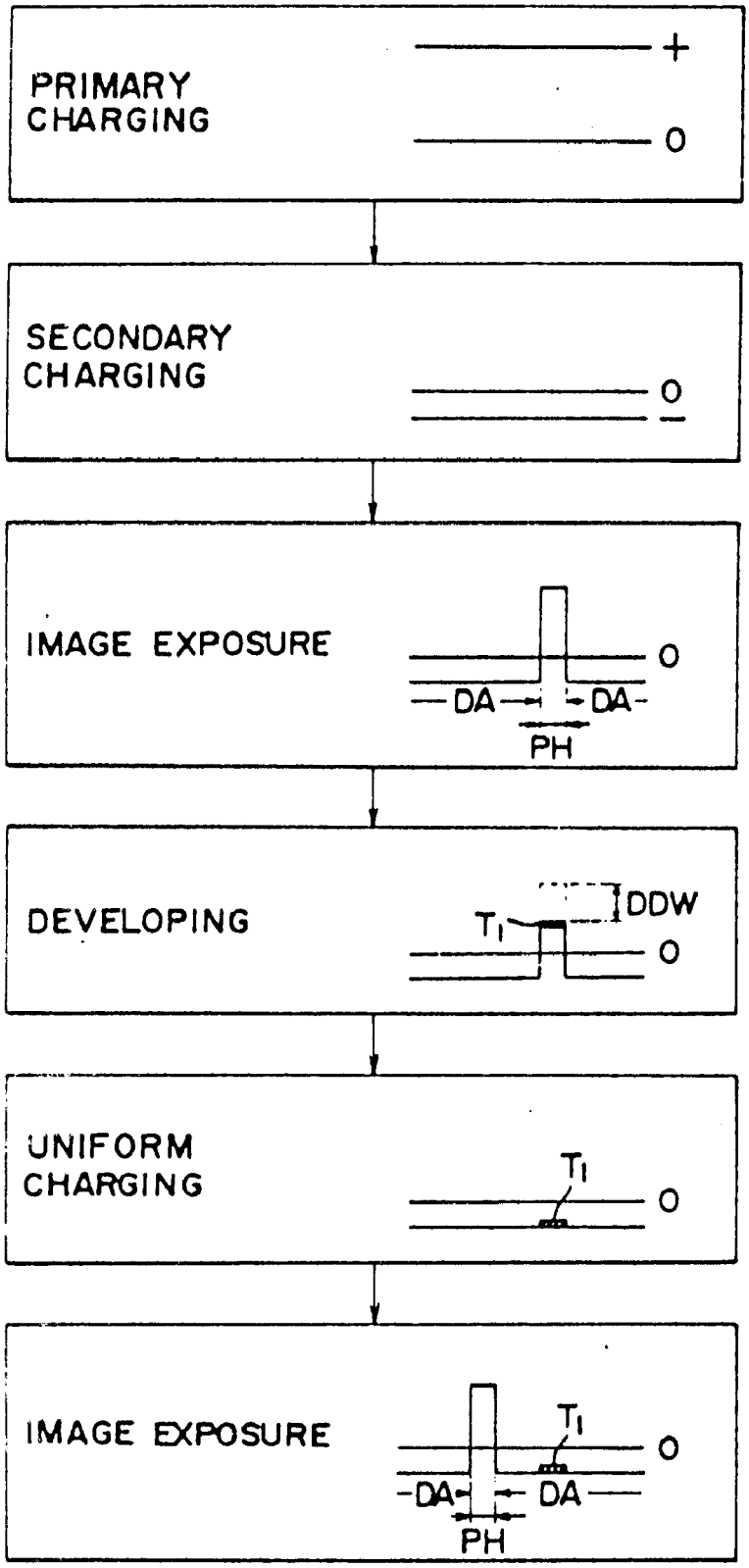

FIG. 38 shows the changes in the potentials on the photosensitive drum when the developments are conducted by the color image reproducing apparatus of FIG. 37.

After has been charged positive by the primary charger 2, the photosensitive drum 1 is charged negative so that its surface potential is dropped substantially to 0 V. Next by conducting the image exposure, the portion optically irradiated has its potential raised to trap the toners, which have been charged negative in the developing means, so that the portion having trapped the toners has its potential dropped (as indicated at DDW in the drawing). Next, a uniform charging operation is so conducted by the secondary charger that the surface potential is dropped substantially to 0 V, and the image exposure and the development are repeated. After the visible images of all the colors have been formed on the photosensitive drum 1, the resultant toner images are transferred to the recording paper, and the photosensitive drum 1 has its charged eliminated and is then cleaned until the step advances to a subsequent image reproduction.

In the methods described hereinabove, the second and later secondary charging operations can be omitted. On the other hand, the primary and secondary charging operations may be conducted each time, and in this case the charge eliminating step may be introduced prior to the charging step.

In the respective Examples thus far described, the corona transfer is used as the toner image transfer, but another type may be used. If the adhesion transfer disclosed in Japanese Patent Publication Nos. 41679/71, 22763/73 or the like, for example, is used, the transfer can be conducted without considering the polarities of the toners. Moreover, it is possible to adopt the method of effecting direct fixture to the photosensitive member as in the electrofax method.

The two-component developer used in the present invention may especially preferably be composed of a magnetic carrier as its carrier and a non-magnetic toner as its toner.

The compositions of the toners are generally, as follows:

(1) Thermoplastic Resin: 80 to 90 wt. % of binder

Examples: polystyrene, styrene-acryl polymer, polyester, polyvinyl butyral, epoxy resin, polyamide resin, polyethrene, and ethylene-vinyl acetate copolymer, which are frequently used in a mixed form;

(2) Pigment: 0 to 15 wt. % of coloring agent

Examples:

Black: Carbon Black;

Blue: copper phthalocyanine, derivative dye of sulfonamide;

Yellow: benzine derivative; and

Magenta: polytungstophosphate, Rhodamine Lake, Carmine 6B;

(3) Electrification Controlling Agent: 0 to 5 wt. %

Examples:

Plus: Nigrosine (i.e., electron donor); and

Minus: organic complex (i.e., electron acceptor);

(4) Fluidizer:

Examples: coloidal silica or hydrophobic silica as representative, silocone varnish, metallic soap, non-ionic active agent;

(5) Cleaning Agent: intended to prevent the filming of the toners of photosensitive member Examples:

fatty acid metal salt, oxidized silicate having a surface radical, surface active agent containing fluorine; and (6) Filler: intended to improve the surface gloss of images and to reduce the cost for raw materials Examples:

Calcium carbonate, clay, talc, pigment.

In addition to the above-enumerated materials, a magnetic material may be contained so as to prevent a fog and a toner dispersion.

As the magnetic powders, there are proposed such powders of tri-iron tetraoxide, γ-ferric oxide, chromium dioxide, nickel ferrite or iron alloy as have a diameter of 0.1 to 1 μm. At present, however, the tri-iron tetraoxide is frequently used and is contained in 5 to 7 wt. % with respect to the toners. The resistances of the toners are variable in dependence upon the kinds and quantities of the magnetic powders. In order to provide a sufficient resistance, however, it is preferred to contain 55 wt. % or less of the magnetic material. Moreover, the quantity of the magnetic material is desired to be contained in 30 wt. % or less so that it may hold a clear color as the color toner.

In addition, as the resin suitable for the pressure fixing toner, an adhesive resin such as wax, polyorefines, ethylene-vinyl acetate copolymer, polyurethane or rubber is selected so that it may be plastically deformed and adhered to paper by a force of about 20 kg/cm. A capsule toner may also be used.

The toners can be made of the above-enumerated materials and prepared by the method known in the prior art.

In order to obtain a more preferable image in the construction of the present invention, the particle diameters of those toners are desired to be no more than 50 microns in their ordinary average values in relation to the resolution. In the present invention, the toner diameters of about 1 to 30 microns may preferably be used in relation to the resolution, the toner scattering and the carriage, although they are not restricted on principle.

In order to reproduce fine points and lines and to enhance the gradation, moreover, the magnetic carrier particles may preferably be particles composed of magnetic particles and a resin, for example, a resin-dispersed system of magnetic powders and a resin or resin-coated magnetic particles and may more preferably be rounded to have an average particle diameter of 50 μm or smaller, especially preferably, a particle diameter no more than 30 μm and no less than 5 μm.

Moreover, in order to prevent the problems that the carrier particles for providing an obstruction against the satisfactory image reproduction are made liable to receive the charges by the bias voltage so that they become liable to be trapped by the surface of the image carrier and that the bias voltage is not applied to a sifficient level, the carrier may have such an insulating property of a resistivity no less than $10^8\Omega$, preferably, $10^{13}\Omega$, more preferably, $10^{14}\Omega$. Moreover, the carrier particles may have this resistivity and the above-mentioned diameter.

The carrier particles described above can be prepared either by coating the surface of the magnetic materials described as to the toners with the thermoplastic resin or by making the particles of a resin having fine magnetic particles dispersed and contained therein and by selecting the resultant particles by the well-known average diameter selecting means. Moreover, in order to improve the agitating characteristics of the toners and the carriers and the carrying characteristics of the developers and to improve the electrification controlling characteristics of the toners thereby to make the toner particles reluctant to aggregate or the toner particles and the carrier particles to aggregate, it is desirable to round the carriers. Of these rounded magnetic carrier particles, the resin-coated ones are prepared by selecting magnetic particles as round as possible and by coating the particles selected with a resin, and the carriers having fine magnetic powders dispersed therein are prepared either by rounding fine particles of a magnetic material, if possible, by hot wind or water after making the dispersed resin particles or by directly forming the rounded dispersed resin particles by the spray dry method.

Incidentally, the present invention can be further modified on the basis of the technical concept thereof. In the Examples, the description has been made as to the case in which the two-component developer composed of the toner and the carrier was used as the developer having a plurality of components. However, the developer may additionally contain a third component.

In the Examples, the description is limited to the development of the color image. However, the present invention can be applied to the case in which toners of the same color are developed in plural times. In this case, a toner having an excellent gradation can be retained on the photosensitive drum.

Still moreover, the present invention can be applied not only to the reproducing apparatus by electrophotography but also to the non-impact printer making use of the electrostatic reproducing method or the magnetic reproducing method.

According to the Examples of the present invention, an image at a subsequent step can be retained on an image carrier without disturbing an image retained at a previous step even if the step of retaining a latent image on the image carrier and the step of developing the latent image with a developer having a plurality of component are repeated a plurality of times.

In other words, a clear image can be retained on the image carrier if the amplitude $V_{AC}$ and the frequency f of the a.c. component and the gap d between the developer carrier and the image carrier are so set as to satisfy the following relathinships:

$$0.2 \leqq V_{AC}/(d \cdot f); \text{ and}$$

$$\{(V_{AC}/d)-1500\}/f \leqq 1.0.$$

In the other Examples, the developer D used was a one-component magnetic developer which was prepared by blending and pulverizing 70 wt. % of a thermoplastic resin, 10 wt. % of a pigment (e.g., Carbon Black), 20 wt. % of a magnetic material and an electrification controlling agent to have an average particle diameter of 10 μm. The quantity of the charges is controlled by the electrification controlling agent.

In case the development is conducted with a one-component developer using only the magnetic or non-magnetic toner, there can be used developing means which is disclosed in U.S. Pat. Nos. 3,866,574 and 3,893,418. On the other hand, developing means having two or more magnetic rollers may be used. The electric bias containing vibratory components and applied upon the development has to be set under such a condition that the toner image retained already on the image retainer may neither be disturbed nor have a color mixing. Under the bias condition used in the non-contact jumping development, e.g., the condition as is disclosed in Japanese Patent Laid-Open Nos. 18656 to 18659/80 and 106253/81, the toner images having already been retained may be damaged by the vibrations of the toners, which are caused by the intense a.c. electric field. In case the developments according to the present invention are repeated to superpose the toner images, the intensity of the a.c. component of the bias has to be set within such a proper range without deteriorating the retained toner images that a subsequent toner image can be completely retained.

Figure 39:
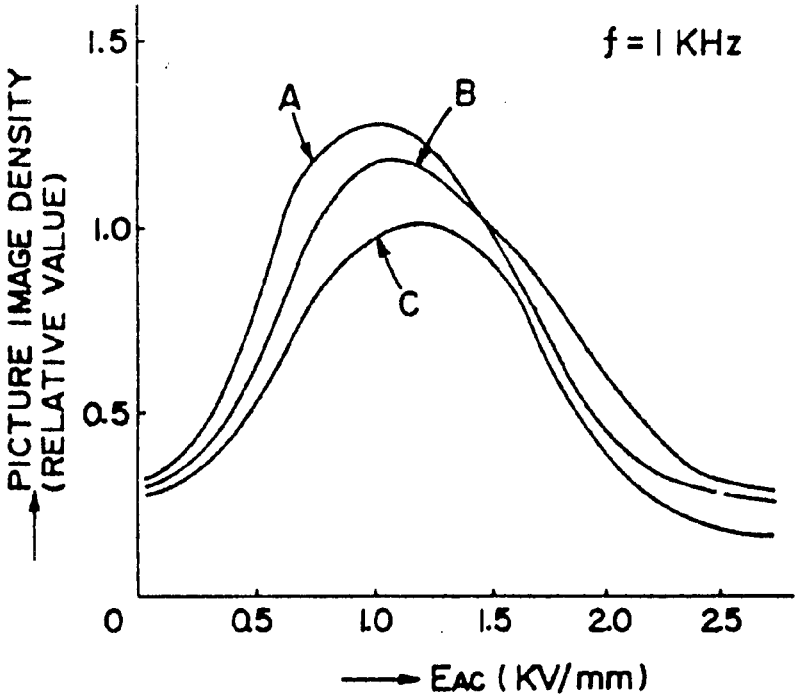
FIGS. 39 and 40 are diagrams showing changes in an image density when an a.c. voltage applied to the developing means is changed in a further embodiment of the present invention.

FIG. 39 shows the relationship between the amplitude of the a.c. component, when the gap d between the photosensitive drum 1 and the sleeve 31 is set at 0.7 mm; the thickness of the developer at 0.3 mm; the developing bias to be applied to the sleeve 31 has its d.c. component at 500 V and its a.c. component at a frequency of 1 kHz; and the charged potential of the photosensitive drum at 600 V, and the image density of a toner image which is formed by the reverse phenomenon on the exposed portion (at a potential of 0 V) of the photosensitive drum 1. The amplitude $E_{AC}$ of the intensity of the a.c. electric field takes a value which is made by dividing the a.c. voltage of the developing bias by the gap d. Curves A, B and C appearing in FIG. 39 are the results obtained in case the magnetic toners used are controlled to have average charges of 5 $\mu$c/g, 3 $\mu$c/g and 2 $\mu$c/g, respectively. It is observed from the three curves A, B and C that the effect of the a.c. component appears for the amplitude of the a.c. component of the electric field of 200 V/m or higher and 1.5 KV/mm or lower, and that the toner image retained in advance on the photosensitive drum is partially broken for the amplitude of 2,500 V/mm or larger.

Figure 40:
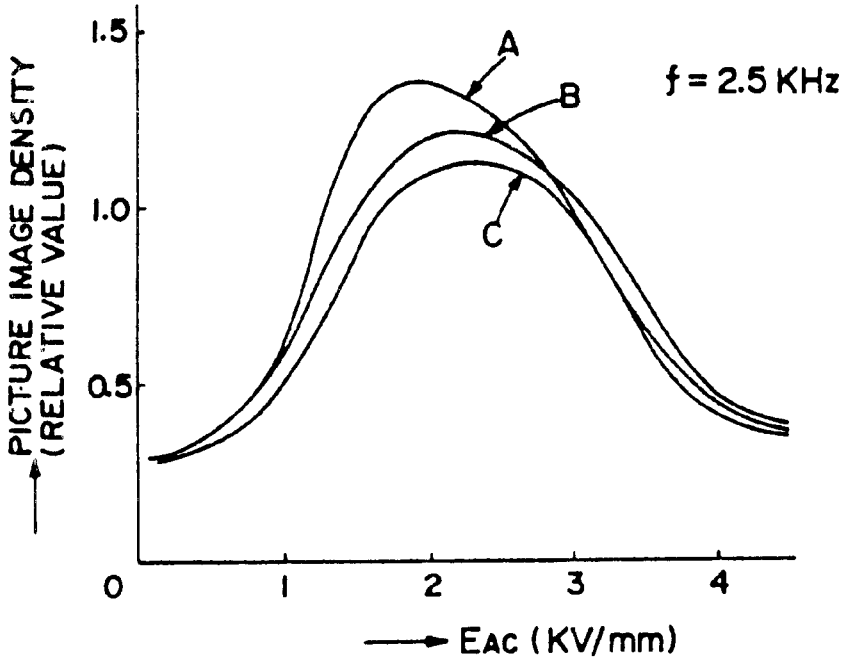

FIG. 40 depicts the changes in the image density when the frequency of the a.c. component of the developing bias is set at 2.5 kHz and when the a.c. field intensity is changed under the same conditions of those of the experiments of FIG. 32.

According to these experiments, the image density is high when the amplitude $E_{AC}$ of the a.c. field intensity is 500 V/mm or higher and 3.8 KV/mm or lower (although not shown in FIG. 39), and the toner image retained in advance on the photosensitive drum 1 is partially broken when that amplitude exceeds 3.2 KV/mm (although not shown in FIG. 39).

Incidentally, as being seen from the results of FIGS. 39 and 40, the image density highly changes across a certain amplitude, which has a value obtainable hardly in dependence upon the average charges of the toners, as seen from the curves A, B and C. The reason therefor can be thought, as follows. Specifically, it is predicted that the one-component developer has its charge quantities distributed widely across the positive and negative ranges because of the mutual frictions of the toner particles. As a result, the average quantities of the charges take a small value, but in fact toners having a large quantity of charges, e.g., 20 $\mu$c/g or larger exist at a predetermined ratio and are thought to be mainly developed. Even if the average charge quantity is controlled by the electrification controlling agent, the ratio occupied by the toners having that large charge quantity is not varied so much, so that it is thought that the change in the developing characteristics is not substantially observed.

Figure 41:
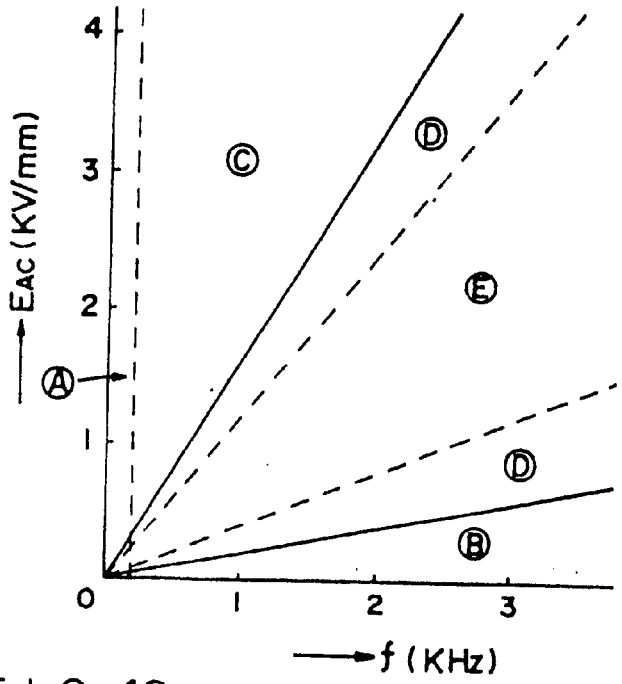
FIG. 41 is a diagram showing the density characteristics when a field intensity and a frequency are changed.

Now, experiments similar to those of FIGS. 39 and 40 were conducted under changing conditions to pigeon-hole the relationship between the amplitude $E_{AC}$ and frequency f of the a.c. field intensity so that the results shown in FIG. 41 could be obtained.

In FIG. 41: indicated at A is a region where a developing unevenness is liable to occur; indicated at B is a region where the effect of the a.c. component does not appear; indicated at C is a region where the toners are liable to return; and indicated at D and E are regions where the effect of the a.c. component appears so that no toner return occurs.

These results indicate that a proper region for the amplitude and frequency of the intensity of the a.c. electric field exists so that a next (or subsequent) toner image may be developed in a proper density without breaking the toner image which was retained previously (at the previous step) on the photosensitive drum 1. This is thought to be explained by the following reasons.

In the region where the image density has a tendency to increase for the amplitude $E_{AC}$ of the a.c. field intensity, e.g., for the density curve of FIG. 39, i.e., where the amplitude of $E_{AC}$ of the a.c. field intensity ranges from 0.2 to 1.0 KV/mm, the a.c. component of the developing bias acts to make it liable to jump a threshold value at which the toners fly from the sleeve. As a result, even the toner having a small quantity of charges is trapped by the photosensitive drum 1 so that it can be used for the development. As a result, the image density is increased to the higher level as the amplitude of the a.c. field intensity becomes the larger.

On the other hand, the reason, for which the image density is dropped in accordance with the increase in the amplitude of the a.c. electric field (e.g., the region in which the amplitude $E_{AC}$ of the a.c. field intensity is no less than 1 KV for the density curve A of FIG. 29), can be thought in several ways. The toners are the more intensely vibrated as the amplitude $E_{AC}$ of the a.c. field intensity becomes the larger, and the cluster formed as a result of the aggregation of the toners becomes liable to be broken so that only the toners having high charges are selectively applied to the photosensitive drum 1 whereas the toner particles having low charges become reluctant to be developed. Moreover, the toners having low charges are liable to be returned to the sleeve 31 by the a.c. bias because they have a weak image forming force even if they are once trapped by the photosensitive drum 1. Since the charges on the surface of the photosensitive drum 1 leak if the amplitude of the field intensity of the a.c. component is too large, still moreover, the phonomenon that the toners become reluctant to be developed become liable to occur. As a matter of fact that, it is thought that those causes are overlapped to make the image density constant for the increase in the a.c. component.

If the amplitude $E_{AC}$ of the a.c. field intensity is enlarged, as has been described hereinbefore, on the other hand, the toner image retained in advance on the photosensitive drum 1 is broken, and the degree of this breakage is the higher for the higher a.c. component. This is thought to be caused by the fact that the toners trapped by the photosensitive drum 1 are acted by a force for returning it to the sleeve 31 by the a.c. component. In case the development is conducted by consecutively superposing toner images on the photosensitive drum 1, it is a fatal problem that the toner image or images having already been retained are broken at a subsequent developing step.

As seen by comparing the results of FIGS. 39 and 40, on the other hand, the experiments conducted by changing the frequency of the a.c. component have revealed that the image density becomes the lower for the higher frequency. This is caused by the fact that the toner particles have their vibrating range narrowed, because they cannot follow the changes in the electric field, so that they become reluctant to be trapped by the photosensitive drum 1.

On the basis of the experimental results thus far described, the Inventors have attained a conclusion that a later development can be conducted in a proper density without disturbing the toner image already having been retained on the photosensitive drum 1, if each development is conducted under the conditions satisfying the following relationships when the amplitude of the a.c. component of the developing bias is designated at $V_{AC}$ (V); the frequency of the same at f (Hz); and the gap between the photosensitive drum 1 and the sleeve at d (mm):

$$0.2 \leqq V_{AC}/d \cdot f \leqq 1.6$$

In order to obtain a sufficient image density but not to disturb the toner images having been retained until the previous step, the following condition, i.e., the region of FIGS. 29 and 30, in which the image density has a tendency to increase for the a.c. electric field, is desirably satisfied:

$$0.4 \leqq V_{AC}/d \cdot f \leqq 1.2.$$

Of this region, it is preferable to satisfy the following region corresponding to a slightly lower electric field in which the image density takes its maximum:

$$0.6 \leqq V_{AC}/d \cdot f \leqq 1.0.$$

Moreover, it is further preferable to set the frequency f of the a.c. component at 200 Hz or higher so as to prevent the developing unevenness due to the a.c. component and to set the frequency of the a.c. component at 500 Hz or higher so as to eliminate the influences from the beats, which are caused by the a.c. component and by the rotations of the magnetic roll in case the rotating magnetic roll is used as the means for supplying the developer to the photosensitive drum 1.

On the other hand, not only the magnetic toner but also a non-magnetic toner can be used. As the developing method using the non-magnetic toner, there is known a method which is disclosed in Japanese Patent Laid-Open No. 30537/75 or 22926/77, for example. In order to easily transfer the visible image on the photosensitive drum 1 to the recording paper, moreover, the specific resistance of the toner is desired to be no less than $10^{13}\Omega$ cm. Incidentally, the resistivity is a value which can be obtained by reading out a current value when a load of 1 $Kg/cm^2$ is applied to the particles tapped in a container having an effective area of 0.5 $cm^2$ and when a voltage for establishing an electric field of 1,000 V/cm is applied between the load and the bottom electrodes.

Moreover, the materials composing the developer except the magnetic material are similar to those of the foregoing Examples.

These materials may be simply blended and pulverized, but the following additional devices are made, as the case may be:

1. An insulating material is added to the inside or surface of the toner.
2. The toner is prepared either by coating in advance the surfaces of magnetic powders with a surface active agent, an organic dye or a specified resin or by activating in advance the same surfaces to form cover films by polymerizations and by mixing the magnetic powders with a resin or the like. This device is intended to facilitate uniform dispersion into the resin and to improve the image quality in a high humidity.
3. The developing quality is improved to prevent the toner scatter, as the case may be, by selecting the magnetic characteristics of the magnetic powders such as the shape, the axial ratio or the retaining force of the same.
4. The fluidity is enhanced to improve the developing property by mixing magnetic toners which have different particle diameters, quantities of magnetic powders contained, magnetic characteristics and electric resistances.

On the other hand, most of the magnetic powders are black so that they can be used in place of the black pigment.

In addition, as the resin suitable for the pressure-sensitive toner, wax, polyorefines, ethylenevinyl acetate copolymer, polyurethan, rubber and so on are selected such that they are elastically deformed and adhered to the paper by a force of about 20 $Kg/cm^2$. Capsulated toners may also be used.

The particle diameters of those toners may preferably be no more than 50 microns on an average value in relation to the resolution. In the present invention, the toner particle diameters are not limited on principle but may be ordinally about 1 to 30 microns in relation to the resolution and the scattering and carriage of the toners.

Incidentally, the present invention can be further modified on the basis of the technical concept thereof. In the foregoing Examples, the description is restricted to the development of the color image. The present invention can also be applied to the case in which toners of the same color are developed in plural times. In this case, a toner image having an excellent gradation can be retained on the photosensitive drum.

Moreover, the present invention can be applied not only to the recording method for electrophotography but also the non-impact printer which makes use of the electrostatic reproducing method or the magnetic producing method.

Even both the step of retaining the latent image on the same image carrier and the step of developing the latent image with the one-component developer are repeated plural times, according to the Examples of the present invention, an image at a subsequent step can be retained on the image carrier without disturbing the image which has been retained at a previous step.

In other words, a clear image can be retained on the image carrier if the amplitude $V_{AC}$ and the frequency f of the a.c. component and the gap d between the developer carrier and the image carrier are so set as to satisfy the following relationship:

$$0.2 \leqq V_{AC}/d \cdot f \leqq 1.6.$$

Figure 42:
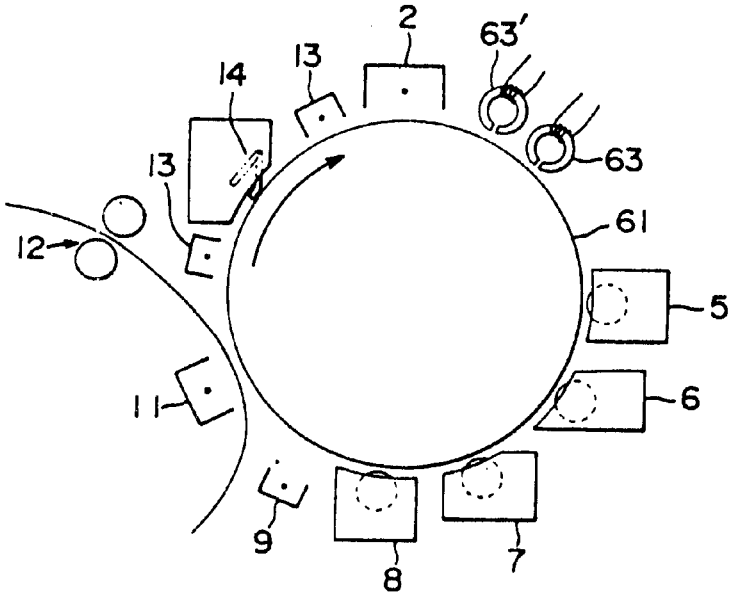
FIGS. 42 and 43 are schematic views showing other examples of the recording means which are used for practising the method of the present invention, respectively.

FIG. 42 shows a reproducing apparatus according to another embodiment of the present invention, in which: reference numeral 61 indicates an image retainer which is constructed of such a magnetic layer and an insulating layer as is prepared by evaporating or sputtering a magnetic material on a metal base or by applying a magnetic material dispersed in a binder to the metal base and which is placed on a drum rotating in the direction of arrow; numeral 63' indicates a magnetic erasing head; and numeral 63 indicates a magnetic recording head. The remaining portions are identical to the embodiment of FIG. 1.

The recording head 63 composed of one or more rows of recording heads for retaining a magnetic image on the magnetic layer of the image retainer 61. Magnetic force of the magnet 32 is arranged so as not to disturb a magnetic image on the retainer 61.

The bias conditions for practising the method of the present invention are preferred to satisfy the following inequalities:

For the two-component developer used:

$$0.2 \leqq V_{AC}/(d \cdot f); \text{ and}$$

$$\{(V_{AC}/d)-1500\}/f \leqq 1.0; \text{ and}$$

For the one-component developer used:

$$0.2 \leqq V_{AC}/d \cdot f \leqq 1.6.$$

In the above inequalities: $V_{AC}$ indicates the amplitude (V) (although not an effective value) of the a.c. component of the developing bias; f indicates the frequency (Hz); and d indicates the gap (mm) between the image retainer, e.g., the sleeve and the developer carrier.

Moreover, the order of the colored toners for image superpositions has to be determined to be the most proper for the object because it exerts influences upon the tone of the color image.

Figure 43:
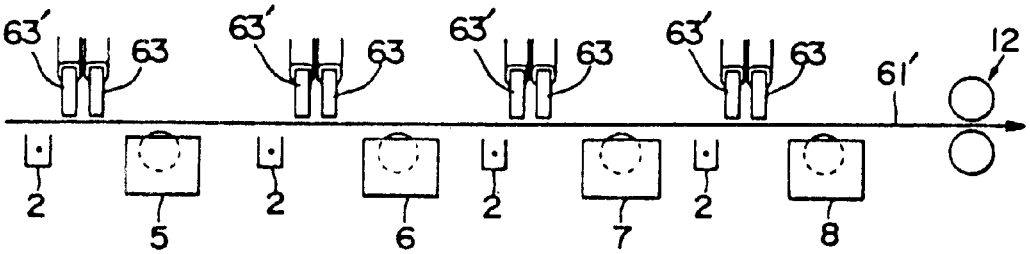

Although the foregoing description is directed to the reproducing apparatus of FIG. 42, the method of the present invention can also be practised by the reproducing apparatus shown in FIG. 43. In FIG. 43, parts having the same functions as those of FIG. 42 are indicated by the same reference numerals as those of FIG. 42.

Shown in FIG. 43 is the reproducing apparatus in which a series of recording members are prepared by placing a magnetic layer and a colorless insulating layer on the surface of a conductive base to provide an image retainer 61'. While this image retainer 61' is being fed straight, the retentions and developments of the magnetic images are repeated. Along the passage for the image retainer 61', more specifically, the pre-writing charger 2, the magnetic erasing head 63', the magnetic recording head 63 and developing means 5 to 8 are juxtaposed in a repeated manner, and the fixer 12 for fixing the color image on the image retainer 61' is disposed at the last position. This reproducing apparatus can reproduce a series of color images without any provision of the pre-transfer charger, the transfer means, the charge eliminating means and the cleaning means. In order that the image retainer 61' may not depend, it is necessary to increase the tension or to provide such a supporting roller midway, although not shown, as providing the toners trapped by the image retainer 61' from being offset.

In the recording apparatus shown in FIG. 42, too, the pre-transfer charger 9, the transfer means 11, the charge eliminating means 13 and the cleaning means 14 can be omitted if the image retainer 61 is constructed by winding on the drum an image retainer which is similar to the image retainer 61' used in the reproducing apparatus of FIG. 43. In order to hide the color of the magnetic layer, moreover, it is desired to provide a conductive layer or an insulating layer having a white or desirable color.

In order to [practise] *practice* the method of the present invention, it is preferable to use the image retainer having a highly insulating layer as the image retainer. Once the developer is trapped by the image retainer, generally speaking, it is remarkably difficult to remove, because not only the van der Waals' force but also the image forming force acts, to cause troubles such as the fog and the reduction in the transfer ratio. These phenomena can be prevented by suitably charging the image retainer in the same polarity as that of the charges of the toners. However, the ordinary magnetic image retainer constructed of a conductive base and a magnetic layer has such a low insulating property that it is difficult to charge. Despite of this fact, this ordinary image retainer can be charged by forming an insulating layer on the surface of the magnetic layer. By using the image retainer having the insulating layer on the surface of the magnetic member, the unnecessary trap of the toners can be prevented to enhance the transfer efficiency, and a charger is placed in front of the magnetic image writing operation to effect the charging operation so that the fog can be prevented. Moreover, the insulating layer is also effective for protecting the magnetic layer and for preventing the toner filming. If this toner filming occurs, there arises no practical problem if it takes place on the insulating layer. Moreover, the magnetic layer may also act as the conductive base if it is conductive. In case the thickness of the insulating layer is excessive, it drops the density and magnetization of the magnetic image recorded. Therefore, that thickness is preferred to be no more than 50 $\mu$m or, preferably, no more than 10 $\mu$m.

Incidentally, FIG. 42 shows an embodiment of the reproducing apparatus which uses an image retainer having the insulating layer, but the pre-writing charger 2 and the charge eliminating means 13 can be omitted in case an image retainer having no insulating layer is used.

In the embodiment of FIG. 42, the writing operation of the magnetic image is conducted by the reproducing method of parallel magnetization type using a ring head. However, a perpendicular magnetization type method can be likewise used as the magnetically writing means. In this case, the magnet 32 is fixed, and its opposed magnetic poles are made different from the magnetizing direction by the writing operation so that the toners may be reluctant to jump to the non-image portion but liable to jump to the image portion. In this case, it is needless to say that the magnetizing direction and the magnetization facilitating direction of the magnetic layer should be aligned.

On the other hand, the magnetic erasing head 63' and the magnetic recording head 63 may be disposed in front of, in front of and at the back of, or at the back of the pre-writing charger as shown in FIGS. 42 and 43.

The image reproducing process using the reproducing apparatus according to the method of the present invention will be described in the following with reference to FIGS. 44 to 46.

Figure 44:
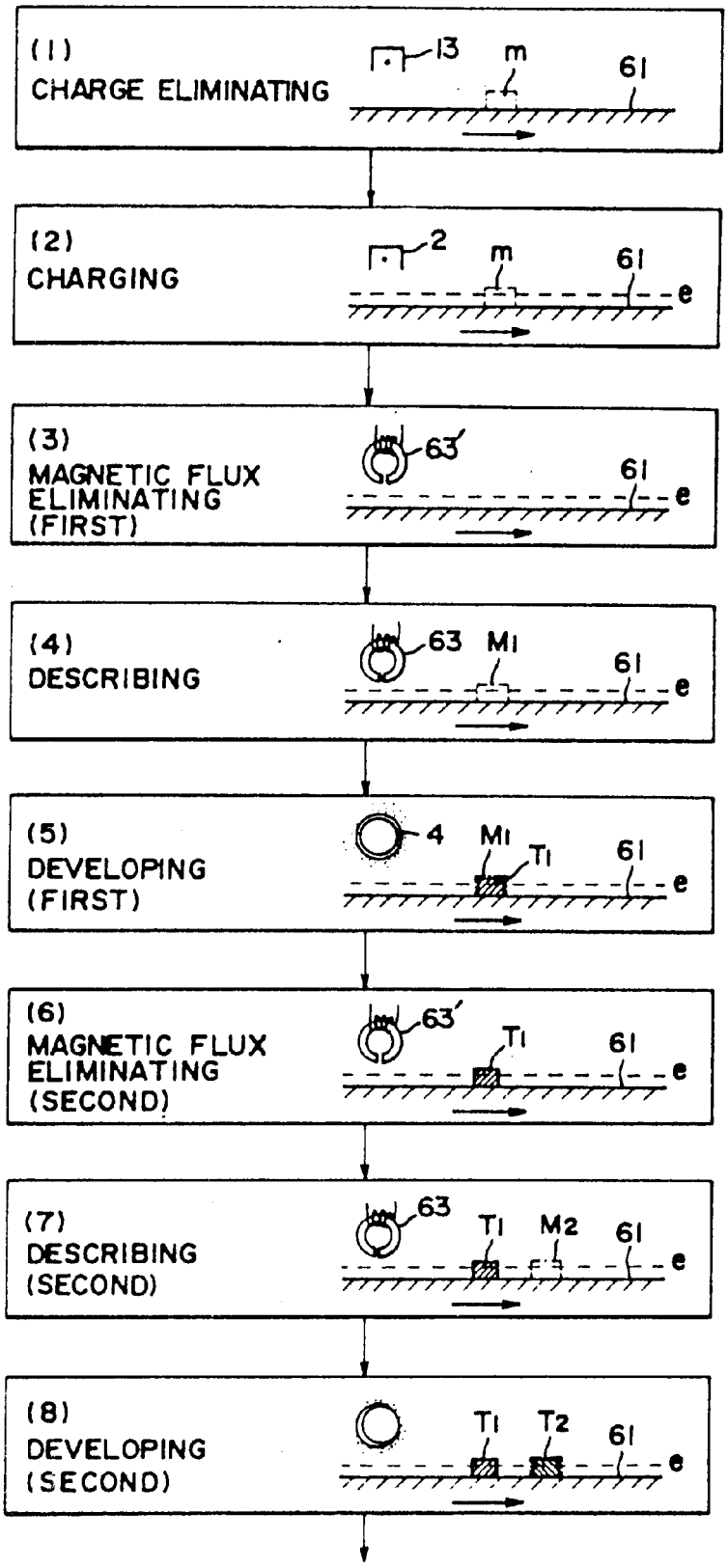
FIGS. 44 to 46 are flow charts for practising the method of the present invention, respectively.

In the embodiment of FIG. 44, by the reproducing apparatus of FIG. 42: (1) the surface of the image retainer 61 has its charges eliminated by the image eliminating means 13 and cleaned by the cleaning means 14; and the initial state, in which the surface of the image retainer 61' is charged to a suitable potential e (in which the broken lines indicate the presence of the charges) in the same polarity as that of the toners, is established by the pre-writing charger 2 so as to prevent the fog.

Next, after the residual magneticism m has been demagnetized by the demagnetizing head 63' (shown at (3)), that surface is subjected to a first writing operation by the recording head 63 to retain a magnetic image $M_1$ (shown at 4)) which is firstly developed by the developing means 5 to obtain a first image $T_1$ (shown at (5)). Moreover, the image retainer 1 enters its second rotation in the reproducing apparatus of FIG. 42 so that it is demagnetized by the erasing head 63' (shown at (6)) and is subjected to a second writing operation by the recording head 63 (shown at (7)). The magnetic image $M_2$ thus formed is secondly developed by the developing means 6 to provide a second image $T_2$ (shown at (8)). Then, third and fourth demagnetizing, writing operations and developments are likewise repeated so that a color image having its color toner images superposed is retained on the image retainer 61. The resultant color image is made liable to be transferred by the pre-transfer charger 9 in the reproducing apparatus of FIG. 42 so that it is fixed on the recording member P by the fixing means 12 after it has been transferred to the recording member P by the transfer means 11. In the reproducing apparatus of FIG. 43, on the other hand, that color image is fixed directly on the image retainer 61' by the fixing means 12. In the reproducing apparatus of FIG. 42, moreover, the surface of the image retainer 61 having the color image transferred thereto has its charges eliminated by the charge eliminating means 13 and is cleared of the residual toners by the cleaning means 14 until the one cycle of the color image reproduction is ended by further eliminating the charges, if necessary. In case the reproducing apparatus of FIG. 43 is used, too, the image retaining process is not changed except for the shape of the image retainer 61'.

Figure 45:
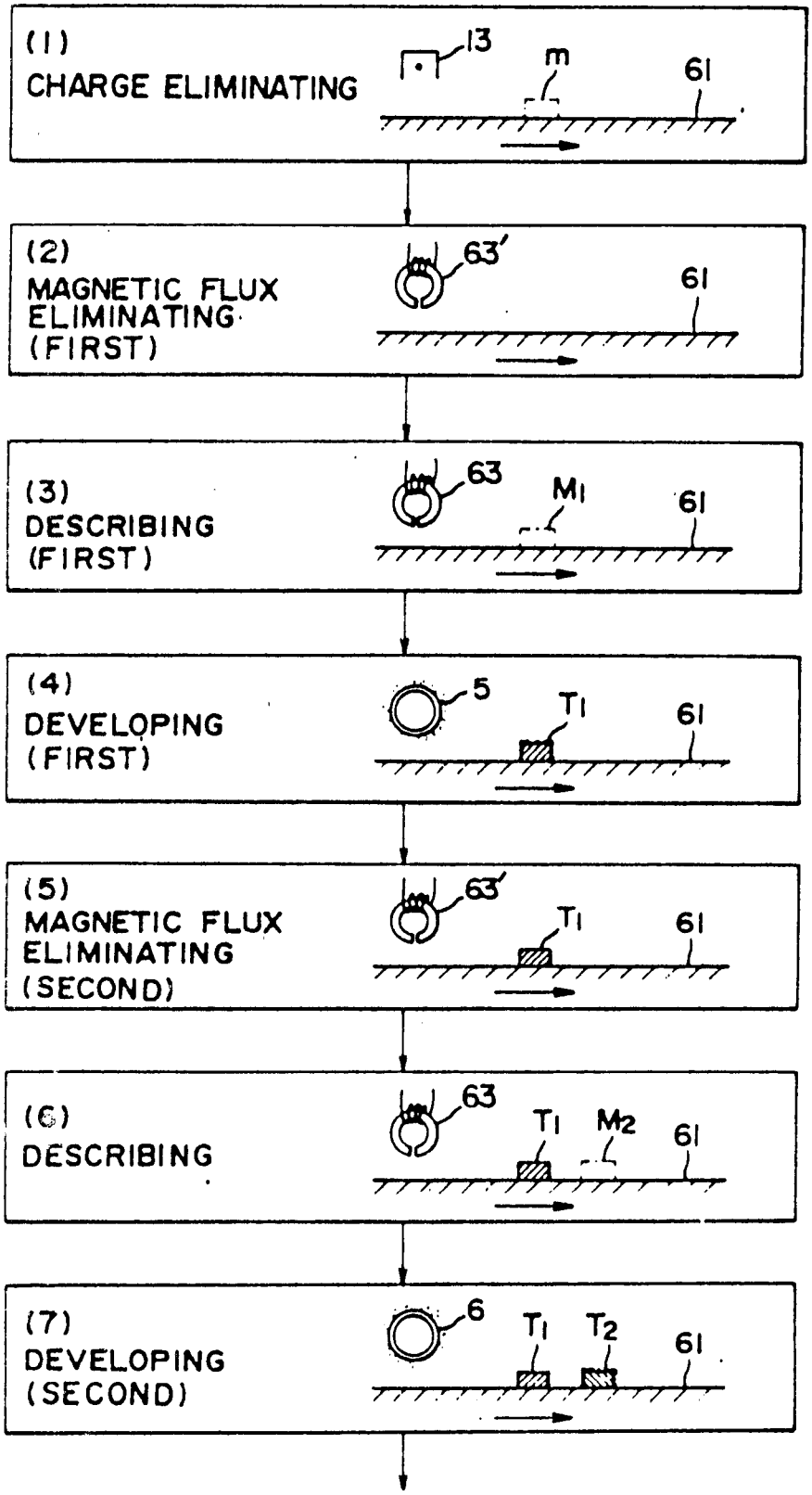
Figure 46:
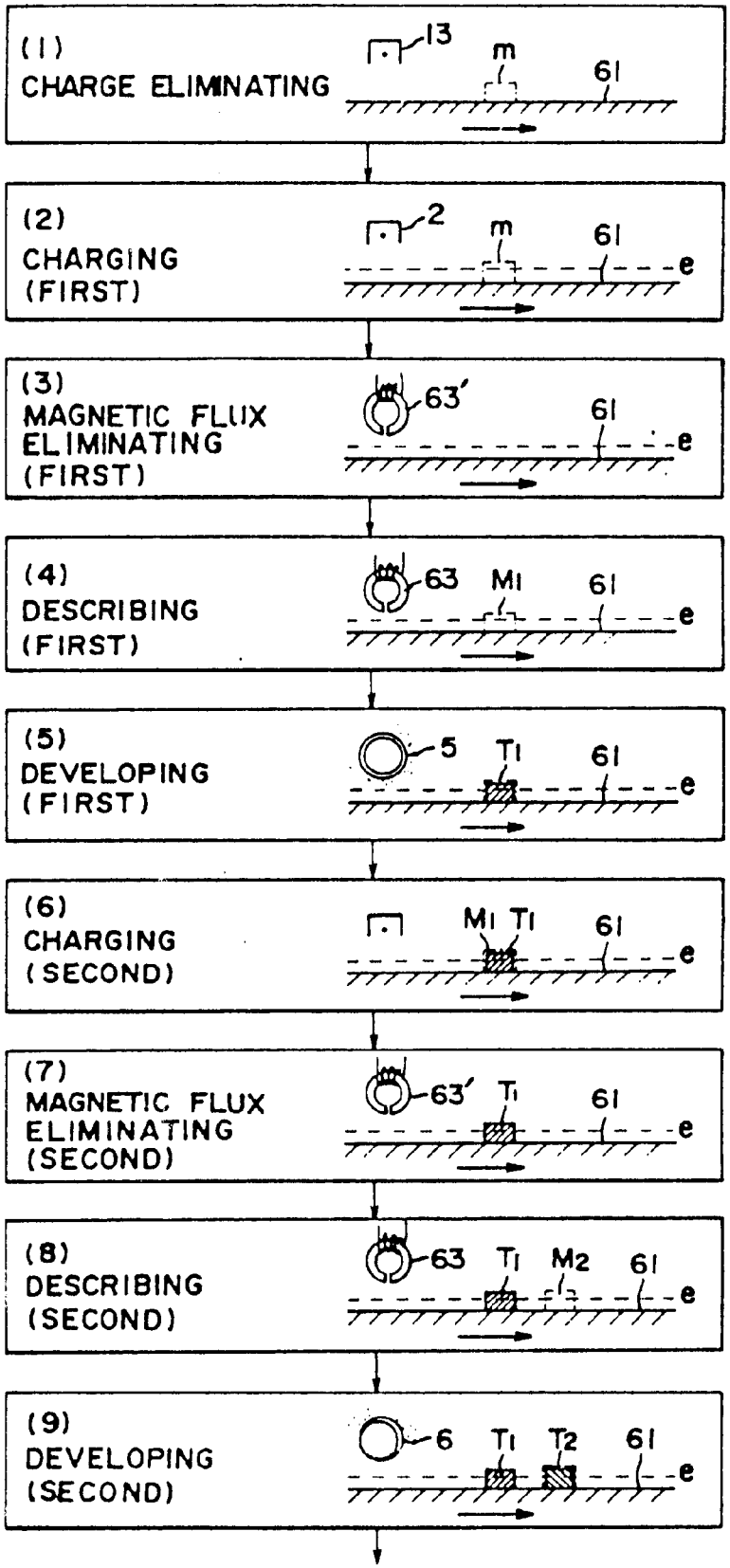

FIG. 45 shows a process which is simplified by omitting the uniformly charging step from the process of FIG. 44. FIG. 46 shows a process which is difference from that of FIG. 44 in that the charger 2 is operated to effect the uniform charging operation before each writing step. However, their basic operations are all common.

Incidentally, reference letters $T_1$ and $T_2$ indicate the toners of different colors, which are trapped by the image retainer 61 or 61'.

By conducting the developments under the non-contact jumping developing conditions, according to the method of the present invention, the developing means other than that conducting the development of each time can be easily held in an inoperative state, even if the developer layer is not removed from the developing sleeve 31, by disconnecting the developing sleeve 31 from the power supply 39 into a floating state, by grounding the same to the earth, or by positively applying a d.c. bias voltage having a polarity opposite to that of the charges of the toners to the developing sleeve 31. Of these means, it is preferable that the developing means are held inoperative by applying the bias voltage having a polarity opposite to that of the toners.

Next, the embodiments of FIGS. 44 to 46, which are practised by the reproducing apparatus of FIG. 42, will be described in more detail in the following in connection with Examples 29 to 31.

The reproducing apparatus shown in FIG. 42 was used. The image retainer 61 was prepared by forming a Co alloy having a thickness of 10 $\mu$m on an aluminum base by the electron beam heating operation and by forming the insulating layer having a thickness of 5 $\mu$m on the surface of the Co alloy and which had a circumference speed of 180 mm/sec. The surface of the image retainer 61 thus prepared was charged to +50 V by the pre-writing charger 2 using the scorotron corona discharger and was demagnetized by means of the magnetic erasing head which had its leading end spaced at a distance of about 30 $\mu$m from the surface of the image retainer 61. Next, a first image writing operation was conducted in a distribution density of 10 spots/mm by means of the recording head 63 which had a similar spacing. As a result, a first magnetic image was retained on the image retainer 61. This magnetic image was firstly developed by the developing means 6 shown in FIG. 3. This developing means 6 uses the developer, which was composed of: a carrier having 50 wt. % of magnetite dispersed contained in a resin and having an average particle diameter of 30 $\mu$m, a magnetization of 30 emu/g and a resistivity of $10^{14}\Omega$ cm or more; and a positive magnetic toner prepared by adding 25 wt. % of magnetite, 10 wt. % of copper phthalocyanine as the cyan pigment and an electrification controlling agent to a styreneacryl resin and having an average particle diameter of 10 $\mu$m, under the condition that the ratio of the toner to the carrier was 10 wt. %. Moreover, there were resorted to the non-contact jumping developing conditions under which: the developing sleeve 31 had an external diameter of 30 mm and a number of revolutions of 100 r.p.m.; the magnet 32 and its N and S magnetic poles having a magnetic flux density of 500 gausses and had a number of revolutions of 1,000 r.p.m.; the developer layer in the developing region had a thickness of 0.7 mm; the gap between the developing sleeve 31 and the image retainer 1 was 0.8 mm; and a bias voltage having a d.c. voltage component of −50 V and an a.c. voltage component of 1.5 kHz and 1,000 V was applied to the developing sleeve 31. In the following Examples, the a.c. component has a sine wave, and its exemplified values are effective ones.

The surface of the image retainer 61 having been subjected to the first development was subjected again to an erasure by the same magnetic erasing head 63' without operating the pre-transfer charger 9, the charge eliminating means 13 and 13, the cleaning means 14 and the pre-writing charger 2, and a second writing operation was conducted in the same spot density but with the spot position being shifted from that of the first writing operation by means of the recording head 63. Next, a second development was conducted by the developing means 6 which was under the same conditions as those of the developing means 5 except that it used as its toner a toner prepared by adding polytungstophosphate as the [Magenta] *magenta* pigment in place of the cyan pigment. Likewise, a demagnetization and a third writing operation were conducted. A third development was then conducted by the developing means 7 which was under the same conditions as those of the developing means 5 except that it used as its toner a toner prepared by adding a bendizine derivative as the yellow pigment. Moreover, demagnetization and a fourth writing operation were conducted. A fourth development was conducted by the developing means 8 which was under the same conditions as those of the developing 5 except that it used a toner prepared by adding [Carbon Black] *carbon black* as the black pigment. The color image thus retained on the image retainer 61 was transferred to and fixed on the recording member P, as has been described with reference to FIG. 42. Moreover, the surface of the image retainer 61 having the color image transferred thereto had its charged eliminated by the charge eliminating means 13 and was cleared of the residual toners by the cleaning means 14.

The reproduced image thus obtained had little color toner mixing and was a remarkably clear color image.

Incidentally, in the present Example, the spot position of a subsequent writing operation may be overlapped upon that of a previous writing operation. In the writing and developing operations, moreover, the recording current of the recording head 3, and the voltage value, frequency and time selecting period of the d.c. or a.c. component of the voltage to be applied to the developing sleeve may be so changed as to adjust the developed densities of the respective colors. If the writing spot positions are superposed, the color mixing becomes liable to occur to invite color vagueness but not to drop the resolution. In this case, moreover, especially the sequence of the colors to be developed is important. By adjusting the developing densities of the respective colors in the aforementioned manner, on the other hand, it is possible to attain a color image which has its tones changed.

EXAMPLE 30

The same reproducing apparatus as that of the Example 29 was used. The color image reproduction was conducted under the same conditions as those of the Example 29 except: that a magnetic image was for a background potential of 0 V by a first writing operation without any of the charging operation of the Example 29 by the pre-writing charger 2 before the first writing operation, after the charge elimination for demagnetization by the charge eliminating means 13; that a superposed voltage composed of a d.c. voltage of −50 V and an a.c. voltage of 3 kHz and 2,000 V was applied as the bias voltage before development to the developing sleeve 31; and that charge elimination and demagnetization were effected by the charge eliminating means 13 before second and later writing operations so that a magnetic image was retained for the background potential of 0 V even during the second and later writing operations.

The reproduced image which is excellent in clearness like that of the Example 29 was thus obtained.

EXAMPLE 31

The color image reproduction was conducted by the use of the same reproducing apparatus as that of the Example 29 and under the same conditions as those of the Example 29 except: that a charging operation is conducted to +300 V before a first writing operation by the pre-writing charger 2 so that a magnetic image was retained for the background potential of +300 V by the first writing operation after it had been demagnetized; that a superposed voltage composed of a d.c. voltage of +300 V and an a.c. voltage of 2 kHz and 1 KV was applied as the bias before the development to the developing sleeve 31; and that the pre-writing charger 2 was used before the demagnetization and the second and later writing operations. The reproduced image obtained was a color image which was excellent in cleaness like that of the Example 29.

According to the Examples of the present invention, there can be attained an excellent effect that the tone or the like of the color image can be easily changed thanks to the use of the image retaining means having its image retainability and toner image formability separated so that a color image having excellent clearness and a high tone can be reproduced while stabilizing the reproduction.

Incidentally, the present invention can be applied not only to an image retainer having a belt or sheet shape, but also to an image retainer such as electrofax paper, which is placed on a base so that the color image formed thereon by the toners is fixed without being transferred. In this case, the sequence of superposing the color toner images has to be taken into consideration, but the transfer means, the cleaning means and so on can be omitted. It is true, but the the charge eliminating means can be omitted, too, in case the toners are transferred with a predetermined polarity and a charge quantity. On the other hand, the transfer should not be limited to the corona type but may be exemplified by the bias roller type, the adhesion type, the direct pressure type or other means using an intermediate transfer member, and the fixture is not limited to the heat roller type.

In the foregoing embodiments of the present invention, moreover, the magnetic recording head is used as the writing means, but another means may be likewise used if the magnetic image is to be retained on the magnetic layer. More specifically, the present invention can be applied to the method, in which the magnetic image is retained by heating imagewise a demagnetized magnetic layer, while passing through a unidorm magnetic field, by the heating means such as a laser and by cooling the heated magnetic layer in a magnetic field.

Although the foregoing description has been directed only to the reproduction of the color image, furthermore, the method of the present invention can also be applied to the superposition of an image of identical colors. In addition, the electrophotographic image and the magnetic image can be reproduced in combination if an electrophotogtaphic photosensitive layer is provided on the magnetic layer.

What is claimed is:

[1. An apparatus for reproducing multiplex images comprising an image retainer having thereon an electrostatic image retaining layer, means for forming an electrostatic image on said image retainer, means for developing the electrostatic image formed on the image retainer to form a toner image, an oscillating electric field applied between the image retainer and a developer feeding carrier to develop said electrostatic images, means for superposing a plurality of toner images on the image retainer, and means for transferring the toner images onto a recording paper in one step.]

[2. The apparatus for reproducing multiplex images according to claim 1 wherein the surface of a developer layer on a developer feeding carrier does not contact with the surface of the toner image on the image retainer.]

[3. The apparatus for reproducing multiplex images according to claim 2 comprising means for superposing at least one portion of a spot distribution exposure of the preceding image exposure and at least one portion of a spot distribution exposure of the following image exposure.]

[4. The apparatus for reproducing multiplex images according to claim 3 wherein the spots of the preceding image exposure and the following image exposure are varied in size.]

[5. In an apparatus for reproducing multiplex images comprising an electrostatic image formed on an image retainer, means for developing the electrostatic image formed on the image retainer by using a developer consisting of a plurality of components, means for superposing a plurality of toner images on the image retainer, the improvement characterized in that said developing means operates under a condition mentioned below:

$$0.2 \leqq V_{AC}/(d \cdot f)$$

$$[(V_{AC}/d)-1500]/f \leqq 1.0$$

where $V_{AC}$ is an amplitude (V) of AC component of developed bias, f is a frequency (Hz), and d is a gap (mm) between the image retainer and a developer feeding carrier for a feeding developer.]

[6. The apparatus for reproducing multiplex images according to claim 5 wherein the gap between the image retainer and the developer feeding carrier is larger than the thickness of the developer layer formed on the developer feeding carrier during developing.]

[7. The apparatus for reproducing multiplex images according to claim 5 comprising multiplex images formed by using developers in order from the developer having a smaller absolute value of mean charge quantity.]

[8. The apparatus for reproducing multiplex images according to claim 3 comprising multiplex images formed by reducing successively the amplitude of the AC component of electrical field applied between the image retainer and the developer feeding carrier during development.]

[9. The apparatus for reproducing multiplex images according to claim 5 comprising multiplex images formed by increasing successively the frequency of the AC component of electric field applied between the image retainer and the developer feeding carrier during development.]

[10. In an apparatus for reproducing multiplex images comprising an electrostatic image formed on an image retainer, means for developing the electrostatic image formed on the image retainer by using a one-component developer, and means for superposing a plurality of toner images on the image retainer, the improvement characterized in that said developing means operates under the following condition:

$$0.2 \leqq V_{AC}/(d \cdot f) \leqq 1.6$$

where $V_{AC}$ is an amplitude (V) of AC component of developing bias, f is a frequency (Hz), and d is a gap (mm) between the image retainer and a developer feeding carrier for a feeding developer.]

[11. The apparatus for reproducing multiplex images according to claim 10 wherein the gap between the image retainer and the developer feeding carrier is larger than the thickness of a developer layer formed on the developer feeding carrier during development.]

[12. The apparatus for reproducing multiplex images according to claim 10 comprising multiplex images formed by using developers in order from the developer having a smaller absolute value of mean charge quantity.]

[13. The apparatus for reproducing multiplex images according to claim 10 comprising multiplex images formed by reducing successively the amplitude of the AC component of electric field applied between the image retainer and the developer feeding carrier during development.]

[14. The apparatus for reproducing multiplex images according to claim 10 comprising multiplex images formed by increasing successively the frequency of the AC component of electric field applied between the image retainer and the developer feeding carrier during development.]

[15. The apparatus for reproducing multiplex images according to claim 10 wherein the electrostatic image retaining member of the image retainer consists of a photosensitive member.]

[16. The apparatus for reproducing multiplex images according to claim 2 wherein the electrostatic image retaining member of the image retainer consists of a dielectric member.]

[17. An apparatus for reproducing multiplex images comprising an image retainer having thereon an electrostatic image retaining layer, means for forming an electrostatic image on said image retainer, means for superposing a plurality of toner images on the image retainer, transfer means for transferring the toner images on a recording paper by one step, and means for developing the electrostatic image formed on the image retainer to form a toner image wherein the surface of a developer layer on a developer feeding carrier does no contact with the surface of the toner image on the toner retainer other than during the first time development.]

[18. In an apparatus for reproducing multiplex images comprising an electrostatic image formed on an image retainer, means for developing the electrostatic image formed on the image retainer by using a developer consisting of a plurality of components, and means for superposing a plurality of toner images on the image retainer, the improvement characterized in that said developing means operates under a condition mentioned below:

$$0.2 \leqq V_{AC}/(d \cdot f)$$

$$[(V_{AC}/d)-1500]/f \leqq 1.0$$

where $V_{AC}$ is an amplitude (V) of AC component of developing bias, f is a frequency (Hz), and d is a gap (mm) between the image retainer and a developer feeding carrier for feeding developer; the gap between the image retainer and the developer feeding carrier is larger than the thickness of a developer layer formed on the developer feeding carrier during development; multiplex images formed by reducing successively the amplitude of AC component of electric field applied between the image retainer and the developer feeding carrier during development, and multiplex images formed by increasing successively the frequency of AC component of electric field applied between the image retainer and the developer feeding carrier during development.]

[19. In an apparatus for reproducing multiplex images comprising an electrostatic image formed on an image retainer, means for developing the electrostatic image formed on the image retainer by using a one-component developer, and means for superposing a plurality of toner images on the image retainer, the improvement characterized in that said developing means operates under a condition mentioned below:

$$0.2 \leqq V_{AC}/(d \cdot f) \leqq 1.6$$

where $V_{AC}$ is an amplitude (V) of AC component of developing bias, f is a frequency (Hz), and d is a gap (mm) between the image retainer and a developer feeding carrier for feeding developer; the gap between the image retainer and the developer feeding carrier is larger than the thickness of a developer layer formed on the developer feeding carrier during development; multiplex images formed by reducing successively the amplitude of AC component of electric field applied between the image retainer and the developer feeding carrier during development; and multiplex images formed by increasing successively the frequency of AC component of electric field applied between the image retainer and the developer feeding carrier during development.]

[20. An apparatus for reproducing multiplex images comprising an image retainer having thereon an electrostatic image retaining layer, means for forming an electrostatic image on said image retainer, means for developing the electrostatic image formed on the image retainer to form a toner image, means for eliminating residual electric charges, means for superposing a plurality of toner images on the image retainer, and transfer means for transferring the toner images on a recording paper by one step.]

[21. The apparatus for reproducing multiplex images according to claim 2 comprising a two-component developer having a toner and an insulating carrier.]

[22. The apparatus for reproducing multiplex images according to claim 2 comprising a one-component developer consisting of an insulating toner.]

[23. The apparatus for reproducing multiplex images according to claim 2 wherein the image retainer consists of a photosensitive image retainer having a photoconductive photosensitive layer and a transparent insulating layer, in that order, laminated on an electroconductive supporting member, and means for forming an electrostatic image by primary charging, secondary charging, image exposure simultaneous with the secondary charging and sequential uniform exposure, said primary charging dropping a potential of the electrostatic images substantially to zero.]

[24. The apparatus for reproducing multiplex images according to claim 2 wherein the image retainer consists of a photosensitive image retainer having a photoconductive photosensitive layer and a transparent insulating layer laminated on an electroconductive supporting member, in that order, means for forming the electrostatic image of a first toner image by primary charging, secondary charging and sequential image exposure, said primary charging dropping a potential of the electrostatic images substantially to zero, and means for forming the electrostatic image of a second toner image by primary charging, secondary charging, and sequential image exposure, said primary charging dropping a potential of the electrostatic images substantially to zero.]

[25. The method of reproducing multiplex images according to claim 2 wherein the image retainer consists of a photosensitive image retainer having a photoconductive photosensitive layer and a transparent insulating layer laminated on an electroconductive supporting member, in that order, means for forming the electrostatic image of a first toner image by primary charging, secondary charging, image exposure simultaneous with the secondary charging and sequential uniform exposure, said primary charging dropping a potential of the electrostatic images substantially to zero, and means for forming the electrostatic image of a second toner image by primary charging, secondary charging, image exposure simultaneous with the secondary charging and sequential uniform exposure, said primary charging dropping a potential of the electrostatic images substantially to zero.]

[26. The apparatus for reproducing multiplex images according to claim 2 wherein the image retainer consists of a photosensitive image retainer having a photoconductive photosensitive layer and a transparent insulating layer, in that order, laminated on an electroconductive supporting member, and means for forming the electrostatic image of a toner image by uniform primary charging on said photosensitive image retainer in the first developing, uniform secondary charging in a plurality reversed to said primary charging and sequential image exposure, said primary charging dropping a potential of the electrostatic images substantially to zero.]

[27. In a color image forming apparatus comprising an image retainer, means for forming a color image on said image retainer, transfer means for transferring on a transfer member the color image formed on said image retainer by said color image forming means, and fixing means for fixing on said transfer member the color image transferred on said transfer member by said transfer means, the improvement characterized in that said color image forming means comprises only one latent image forming means, and a plurality of developing means for visualizing a latent image formed on said image retainer by said latent image forming means, said one latent image forming means being used repeatedly in one cycle of a reproduced image forming step.]

[28. The color image forming apparatus according to claim 27, wherein said latent image forming means comprises means for applying an electric charge, a light source, a deflector for deflecting a light irradiated from the light source, and a scanning optical system arranged between said light source and said image retainer.]

[29. The color image forming apparatus according to claim 28 wherein said electric charge applying means comprises a primary charger and a secondary charger.]

[30. The color image forming apparatus according to claim 28 wherein said light source in said scanning optical system is a laser light source.]

[31. The color image forming apparatus according to claim 30 wherein said deflector in said scanning optical system is a rotary polygon mirror.]

[32. The color image forming apparatus according to claim 27, wherein said developing means is arranged in the vicinity of said image retainer in non-contact fashion.]

[33. The color image forming apparatus according to claim 27 wherein an alternating electric field is applied between said image retainer and said developing means.]

[34. The color image forming apparatus according to claim 27 comprising electrical charge eliminating means for eliminating a residual electric charge on said image retainer each time at which said latent image forming means is used, said charge eliminating means being arranged in the vicinity of said transfer means.]

[35. The apparatus for reproducing multiplex images according to claim 17 consisting of a single means for forming an electrostatic image on said image retainer, and at least two of said means for developing said electrostatic image formed on the image.]

*36. An apparatus for reproducing multiplex images comprising an image retainer having thereon an electrostatic image retaining layer, means for charging said image retainer, means for forming an electrostatic image on said image retainer, means for developing the electrostatic image formed on the image retainer to form a toner image, an oscillating electric field applied between the image retainer and a developer feeding carrier to develop said electrostatic images, means for superposing a plurality of toner images on the image retainer, means for transferring the toner image onto a recording paper in one step, and*

*means for superposing at least one portion of a dot exposure of the preceding image exposure and at least one portion of a dot exposure of the following image exposure wherein the surface of a developer layer on a developer feeding carrier does not contact the surface of the toner image on the image retainer.*

*37. The apparatus for reproducing multiplex images according to claim 36 wherein each multiplex image is developed by repeated use of said means for developing in which an amplitude of an AC component of electric field applied between said image retainer and a developer feeding carrier for feeding developer is reduced with each of said repeated use of said means for developing.*

*38. The apparatus of claim 36 wherein the electrostatic image retaining member of the image retainer consists of a dielectric member.*

*39. The apparatus of claim 36 wherein said developer layer comprises a one-component developer consisting of an insulating toner.*

*40. The apparatus for reproducing multiplex images according to claim 36 wherein the image retainer consists of a photosensitive image retainer having a photoconductive photosensitive layer and a transparent insulating layer, in that order, laminated on an electroconductive supporting member, and means for forming an electrostatic image by primary charging, secondary charging, image exposure simultaneous with the secondary charging and sequential uniform exposure, said primary charging dropping a potential of the electrostatic images substantially to zero.*

*41. The apparatus for reproducing multiplex images according to claim 36 wherein the image retainer consists of a photosensitive image retainer having a photoconductive photosensitive layer and a transparent insulating layer*

*laminated on an electroconductive supporting member, in that order, means for forming the electrostatic image of a first toner image by primary charging, secondary charging and sequential image exposure, said primary charging dropping a potential of the electrostatic images substantially to zero, and means for forming the electrostatic image of a second toner image by primary charging, secondary charging, and sequential image exposure, said primary charging dropping a potential of the electrostatic image substantially to zero.*

*42. The apparatus for reproducing multiplex images according to claim 36 wherein the image retainer consists of a photosensitive image retainer having a photoconductive photosensitive layer and a transparent insulating layer laminated on an electroconductive supporting member, in that order, means for forming the electrostatic image of a first toner image by primary charging, secondary charging, image exposure simultaneous with the secondary charging and sequential uniform exposure, said primary charging dropping a potential of the electrostatic images substantially to zero, and means for forming the electrostatic image of a second toner image by primary charging, secondary charging, image exposure simultaneous with the secondary charging and sequential uniform exposure, said primary charging dropping a potential of the electrostatic images substantially to zero.*

*43. The apparatus for reproducing multiplex images according to claim 36 wherein the image retainer consists of a photosensitive image retainer having a photoconductive photosensitive layer and a transparent insulating layer, in that order, laminated on an electroconductive supporting member, and means for forming the electrostatic image of a toner image by uniform primary charging on said photosensitive image retainer in the first developing, uniform secondary charging in a plurality reversed to said primary charging and sequential image exposure, said primary charging dropping a potential of the electrostatic images substantially to zero.*

*44. The apparatus of claim 36 wherein said dot exposure of the preceding image exposure and said dot exposure of the following image exposure are varied in size.*

*45. The apparatus of claim 36 wherein said developer layer comprises a two-component developer having a toner and an insulating carrier, said insulating carrier having a resistivity of at least $10^8$ Ω-cm when a voltage for generating an electric field of 1,000 V/cm is applied.*

*46. An apparatus for reproducing multiplex images comprising an image retainer having thereon an electrostatic image retaining layer, means for forming an electrostatic image on said image retainer, means for superposing a plurality of toner images on the image retainer, transfer means for transferring the toner images to a recording paper in one step, and means for developing the electrostatic image formed on the image retainer to form a toner image wherein, in the formation of each multiplex image, the surface of a developer layer on a developer feeding carrier does not contact the surface of the toner image on the image retainer other than during the development of the first toner image, wherein the image retainer consists of a photosensitive image retainer having a photoconductive photosensitive layer and a transparent insulating layer, in that order, laminated on an electroconductive supporting member, and said electrostatic image forming means comprises a primary charging means, a secondary charging means which exposes said image retainer to an image light simultaneously with the secondary charging and sequential uniform exposure means, said primary charging means dropping a potential of the electrostatic images substantially to zero.*

*47. An apparatus for reproducing multiplex images comprising an image retainer having thereon an electrostatic image retaining layer, means for forming an electrostatic image on said image retainer, means for superposing a plurality of toner images on the image retainer, transfer means for transferring the toner images to a recording paper in one step, and means for developing the electrostatic image formed on the image retainer to form a toner image wherein the surface of a developer layer on a developer feeding carrier does not contact the surface of the toner image on the image retainer other than during the first development wherein the image retainer consists of a photosensitive image retainer having a photoconductive photosensitive layer and a transparent insulating layer laminated on an electroconductive supporting member, in that order, and said electrostatic image forming means comprises a primary charging means, a secondary charging means and sequential image exposure means, said primary charging means dropping a potential of the electrostatic images substantially to zero.*

*48. An apparatus for reproducing multiplex images comprising an image retainer having thereon an electrostatic image retaining layer, means for forming an electrostatic image on said image retainer, means for superposing a plurality of toner images on the image retainer, transfer means for transferring the toner images to a recording paper in one step, and means for developing the electrostatic image formed on the image retainer to form a toner image wherein the surface of a developer layer on a developer feeding carrier does not contact the surface of the toner image on the image retainer other than during the first development wherein the image retainer consists of a photosensitive image retainer having a photoconductive photosensitive layer and a transparent insulating layer laminated on an electroconductive supporting member, in that order, means for forming the electrostatic image of a first toner image by primary charging, secondary charging, and image exposure simultaneous with the secondary charging and sequential uniform exposure, said primary charging dropping a potential of the electrostatic images substantially to zero, and means for forming the electrostatic image of a second toner image by primary charging, secondary charging, and image exposure simultaneous with the secondary charging and sequential uniform exposure, said primary charging dropping a potential of the electrostatic images substantially to zero.*

*49. An apparatus for reproducing multiplex images comprising an image retainer having thereon an electrostatic image retaining layer, means for forming an electrostatic image on said image retainer, means for superposing a plurality of toner images on the image retainer, transfer means for transferring the toner images onto a recording paper in one step, and means for developing the electrostatic image formed on the image retainer to form a toner image wherein, in the formation of each multiplex image the surface of a developer layer on a developer feeding carrier does not contact the surface of the toner image on the image retainer other than during the development of the first toner image, wherein said developer comprises a two-component developer having a toner and an insulating carrier, said insulating carrier having a resistivity of at least $10^8$ Ω-cm when a voltage for generating an electric field of 1,000 V/cm is applied, means for generating an oscillating field between said image retainer and said developer feeding carrier.*

* * * * *